(12) United States Patent
Iwamura

(10) Patent No.: US 6,513,118 B1
(45) Date of Patent: Jan. 28, 2003

(54) ELECTRONIC WATERMARKING METHOD, ELECTRONIC INFORMATION DISTRIBUTION SYSTEM, IMAGE FILING APPARATUS AND STORAGE MEDIUM THEREFOR

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/234,317

(22) Filed: Jan. 21, 1999

(30) Foreign Application Priority Data

| Jan. 27, 1998 | (JP) | 10-013935 |
| Jan. 27, 1998 | (JP) | 10-013954 |
| Jan. 27, 1998 | (JP) | 10-013955 |

(51) Int. Cl.$^7$ .............................. H04L 9/30; H04L 9/32
(52) U.S. Cl. ...................... 713/176; 713/155; 713/156; 713/170; 705/64; 705/75
(58) Field of Search ................................ 713/155, 156, 713/162, 163, 168, 169, 170, 176; 705/64, 71, 75, 76

(56) References Cited

U.S. PATENT DOCUMENTS

| 5,613,004 A | 3/1997 | Cooperman et al. .......... 380/28 |
| 5,687,236 A | 11/1997 | Moskowitz et al. .......... 380/28 |
| 5,828,752 A | 10/1998 | Iwamura et al. .............. 380/46 |
| 5,943,422 A | * 8/1999 | Van Wie et al. ................. 380/9 |
| 5,966,449 A | 10/1999 | Iwamura et al. .............. 380/21 |
| 6,002,772 A | * 12/1999 | Saito ............................ 380/49 |

FOREIGN PATENT DOCUMENTS

EP    0651554    5/1995    ............ H04N/1/21

OTHER PUBLICATIONS

I.J. Box et al., "Secure Spread Spectrum Watermarking for Multimedia," NEC Institute Technical Report, 95–10.
Shimizu et al., "Hiding of Static Picture Data Using Pixel Blocks," 53$^{rd}$ Information Processing Institute National Assembly, IN–11 (Sep. 1996).

* cited by examiner

Primary Examiner—Justin T. Darrow
(74) Attorney, Agent, or Firm—Fitzpatrick, Cella, Harper & Scinto

(57) ABSTRACT

An electronic information distribution system that exchanges data across a network at the least comprises a first entity, including first encryption means, for performing a first encryption process for the original data, a second entity, including management distribution means for, at the least, either managing or distributing the data that are provided by the first encryption process, and including electronic watermark embedding means for embedding an electronic watermark in the data, and a third entity, including second encryption means for performing a second encryption of the data in which an electronic watermark is embedded.

29 Claims, 24 Drawing Sheets

· HIERARCHICAL NETWORK (1)

· HIERARCHICAL NETWORK (2)

FIG. 10

| IMAGE HEADER PORTION | IMAGE FORMAT IDENTIFIER |
| --- | --- |
| | FILE SIZE |
| | THE NUMBER OF X-DIRECTIONAL PIXELS (WIDTH) |
| | THE NUMBER OF Y-DIRECTIONAL PIXELS (HEIGHT) |
| | DEPTH DIRECTIONAL SIZE |
| | COMPRESSION OR NO |
| | RESOLUTION |
| | OFFSET OF BIT-MAP |
| | COLOR PALETTE SIZE |
| | |
| IMAGE DATA PORTION | BIT-MAP |

FIG. 13

| PROPERTY NAME | ID CODE | TYPE |
|---|---|---|
| THE NUMBER OF IMAGE DATA LAYERS | 0x01000000 | VT_UI4 |
| WIDTH OF IMAGE WITH MAXIMUM RESOLUTION | 0x01000002 | VT_UI4 |
| HEIGHT OF IMAGE WITH MAXIMUM RESOLUTION | 0x01000003 | VT_UI4 |
| HEIGHT OF INITIAL DISPLAY | 0x01000004 | VT_R4 |
| WIDTH OF INITIAL DISPLAY | 0x01000005 | VT_R4 |

| PROPERTY NAME | ID CODE | TYPE |
|---|---|---|
| WIDTH OF IMAGE WITH EACH RESOLUTION | 0x02ii0000 | VT_UI4 |
| HEIGHT OF IMAGE WITH EACH RESOLUTION | 0x02ii0001 | VT_UI4 |
| COLOR OF IMAGE WITH EACH RESOLUTION | 0x02ii0002 | VT_BLOB |
| FORMAT EXPRESSING IMAGE WITH EACH RESOLUTION NUMERICALLY | 0x02ii0003 | VT_UI4 \| VT_VECTOR |

| PROPERTY NAME | ID CODE | TYPE |
|---|---|---|
| JPEG TABLE | 0x03ii0001 | VT_BLOB |
| INDEX OF MAXIMUM JPEG TABLE | 0x03000002 | VT_UI4 |

| FIELD NAME | LENGTH | BYTE |
|---|---|---|
| WIDTH OF IMAGE | 4 | 4-7 |
| HEIGHT OF IMAGE | 4 | 8-11 |
| TOTAL NUMBER OF TILES | 4 | 12-15 |
| WIDTH OF TILE | 4 | 16-19 |
| HEIGHT OF TILE | 4 | 20-23 |

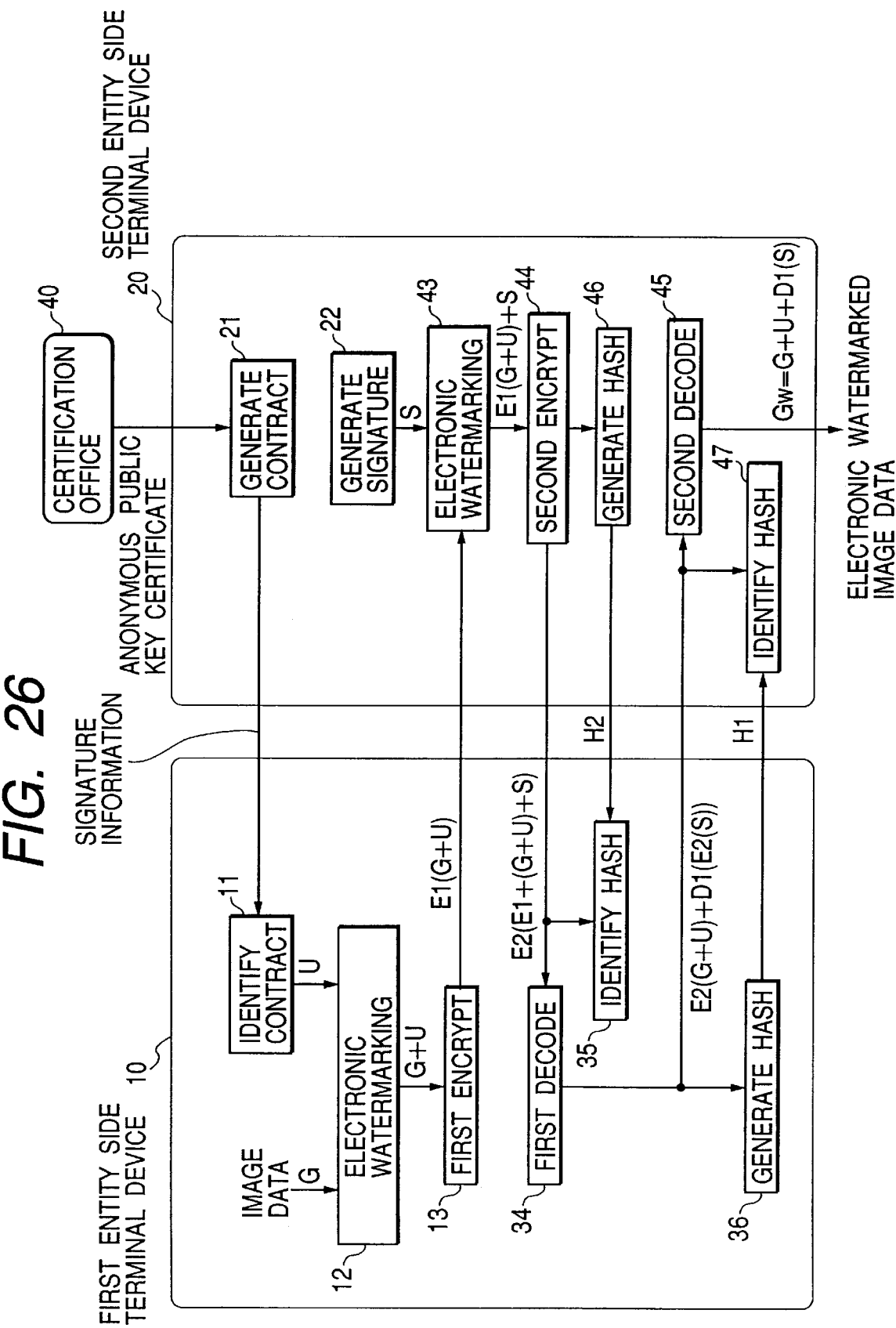

ELECTRONIC WATERMARKING METHOD, ELECTRONIC INFORMATION DISTRIBUTION SYSTEM, IMAGE FILING APPARATUS AND STORAGE MEDIUM THEREFOR

BACKGROUND OF THE INVENTION

1. Field of the Invention

The present invention relates to an electronic watermarking method, an electronic information distribution system, an image filing apparatus, and a storage medium on which the steps for performing the electronic watermarking method are stored so that they can be read by a computer. In particular, the present invention pertains to an electronic watermarking method for protecting copyrights for digital information, such as moving image data, static image data, audio data, computer data and computer programs, an electronic information distribution system, such as a multimedia network system, for distributing digital information by using the electronic watermarking method, an image filing apparatus that employs the electronic watermarking method, and a storage medium on which steps for performing the electronic watermarking method are stored so that they can be read by a computer.

2. Related Background Art

As a consequence of recent developments concerning computer networks and the availability of inexpensive high-performance computers, electronic transactions for trading in products across a network have become popular. Products for such transactions can be digital data, to include pictures, for example.

However, since a large number of complete copies of digital data can easily be prepared, a user who purchases digital data would be able to illegally prepare copies having the same quality as the original, and could then distribute the copied data. As a result, a warrantable price would not be paid to the owner of the copyright for the digital data or to a person (hereinafter referred to as a "seller") by whom sale of the digital data is authorized by the copyright owner, and an infringement of the copyright would occur.

Once a copyright holder or a seller (hereinafter a person who legally distributes digital data is generally called a "server") has transmitted digital data to a user, full protection against the illegal copying of the data is not possible.

Therefore, an electronic watermark technique has been proposed for use instead of a method for the direct prevention of illegal copying. According to the electronic watermark technique, a specific process is performed for the original digital data and copyright information concerning the digital data, or user information, is embedded in the digital data. Thus, when an illegal copy of the digital data is discovered, the person who distributed the copied data can be identified.

In a conventional electronic watermark system, a server is assumed to be fully trustworthy. Therefore, if a server in a conventional system is not trustworthy and should engage in some sort of illegal distribution activity, a user who has committed no crime could be falsely accused of illegally copying data.

This occurs because in a conventional electronic watermark system, as is shown in FIG. 1, when a server embeds user information d1 for identifying a user in digital data g (in the following explanation image data are employed as the digital data), which is distributed to the user, and thereafter, without the permission of the user, makes a further distribution of the data containing the user's identification data, there is no way the user can refute an accusation by the server, even though in this instance it is the server that performed an illegal act.

As a countermeasure, a system (FIG. 2) using a public key encryption method has been proposed.

According to the public key encryption method, an encryption key and a decryption key differ, with the encryption key being used as a public key while the decryption key is used as a secret key. RSA encryption and ElGamal encryption are typical, well known public key encryption system examples.

An explanation will be given for (a) features of a public key encryption system and (b) protocols for secret communications and authenticated communications.

(a) Features of Public Key Encryption (1) Since an encryption key and a decryption key differ, and since the encryption key can be published, a secret delivery process is not required for the encryption key and its distribution is easy.

(2) Since the encryption keys of users are published, users need only provide for the secret storage of their decryption keys.

(3) An authentication function can be provided with which a recipient can verify that the sender of a message is not perpetrating a fraud and that the received message has not been altered.

(b) Protocols for Public Key Encryption

For example, when E (kp, M) denotes an encryption operation for a message M that uses a public encryption key kp, and D (ks, M) denotes a decryption operation for a message M that uses a secret decryption key ks, the public key encryption algorithm satisfies the following two conditions.

(1) The calculations for the encryption E (kp, M) can be performed easily using the encryption key kp that is provided, and the calculations for the decryption D (ks, M) can also be performed easily using the decryption key ks that is provided.

(2) So long as a user does not know the decryption key ks, even if the user knows the encryption key kp and the calculation procedures for the encryption of E (kp, M), and that the encrypted message C=E (kp, M), the user can not ascertain what is contained in the message M because a large number of calculations are required.

When, in addition to the conditions (1) and (2), the following condition (3) is established, the secret communication function can be implemented.

(3) The encryption E (kp, M) can be defined for all the messages (plain text) M, and $$D(ks, E(kp, M))=M$$

is established. That is, anyone can perform the calculations for the encryption E (kp, M) using the public encryption key kp, but only a user who has the secret decryption key ks can perform the calculations for the decryption process D (ks, E (kp, M)) to obtain the contents of message M.

When, in addition to the above conditions (1) and (2), the following condition (4) is established the authenticated communication function can be implemented.

(4) The decryption process D (ks, M) can be defined for all the (plain text) messages M, and $$E(kp, D(ks, M))=M$$

is established. That is, only a user who has the secret decryption key ks can perform the calculations for the decryption process D (ks, M). Even if another user attempts to calculate D (ks', M) using a bogus secret decryption key ks', and performs the calculations as would a user who has the secret decryption key ks, the result obtained is $$E(kp, D(ks', M) \neq M,$$

and a recipient would understand that the received information was illegally prepared.

When the value D (ks, M) is altered, the result obtained is $$E(kp, D(ks, M)') \neq M,$$

and a recipient would understand that the received information was illegally prepared.

In the above described encryption method, operation E ( ), for which the public encryption key (hereinafter also referred to as a public key) kp is used, is called "encryption," and operation D ( ), for which the secret decryption key (hereinafter also referred to as a secret key) ks is used, is called "decryption."

Therefore, for a secret communication a sender performs the encryption and a recipient performs the decryption, while for an authenticated communication, a sender performs the decryption and a recipient performs the encryption.

The protocols shown below are for a secret communication, an authenticated communication, and a secret communication for a recipient B bearing a signature affixed by a sender A using the public key encryption system.

The secret key of the sender A is ksA and the public key is kpA, and the secret key of the recipient B is ksB and the public key is kpB.

[Secret Communication]

The following procedures are performed for the secret transmission of a (plain text) message M by the sender A to the recipient B.

Step 1: The sender A transmits to the recipient B a message C that is obtained by employing the public key kpB of the recipient B to encrypt the message M as follows:

$$C=E(kpB, M).$$

Step 2: To obtain the original plain text message M, the recipient employs his or her secret key ksB to decrypt the received message C as follows:

$$M=D(ksB, C).$$

Since the public key kpB of the recipient B is openly available to many, unspecified people, users other than the sender A can also transmit secret communications to the recipient B.

[Authenticated Communication]

For the authenticated transmission of a (plain text) message M by the sender A to the recipient B, the following procedures are performed.

Step 1: The sender A transmits to the recipient B a message S that he or she created by employing his or her secret key as follows:

$$S=D(ksA, M).$$

This message S is called a signed message, and the operation employed to prepare the signed message S is called "signing."

Step 2: To obtain the original plain text message M, the recipient B employs the public key KpA of the sender A to convert the signed message S as follows:

$$M=E(kpA, S).$$

If the recipient B ascertains that the message M makes sense, he or she verifies that the message M was transmitted by the sender A. And since the public key kpA of the sender A is available to many, unspecified persons, users other than the recipient B can also authenticate the signed message S transmitted by the sender A. This authentication is called "digital signing."

[Secret Communication with Signature]

The following procedures are performed for the secret transmission to the recipient B by the sender A of a (plain text) message M for which a signature has been provided.

Step 1: The sender A prepares a signed message S by employing his or her secret key ksA to sign the message M as follows:

$$S=D(ksA, M).$$

Thereafter, to prepare an encrypted message C that is subsequently transmitted to the recipient B, the sender A employs the public key kpB of the recipient B to encrypt the signed message S as follows:

$$C=E(kpB, S).$$

Step 2: To obtain the signed message S the recipient B employs his or her secret key ksB to decrypt the encrypted message C as follows:

$$S=D(ksB, C).$$

And then, to obtain the original plain text message M, the recipient B employs the public key kpA of the sender A to convert the signed message S as follows:

$$M=E(kpA, S).$$

When the recipient has ascertained that the message M makes sense, he or she verifies that the message M was transmitted by the sender A.

For a secret communication for which a signature has been provided, the order in which the calculating functions are performed at the individual steps may be inverted. In other words, in the above procedures, Step 1: C=E (kpB, D (ksA, M))
Step 2: M=E (kpA, D (ksB, C))

are performed in this order. However, for such a secret communication, the following order may be employed:

Step 1: C=D (ksA, E (kpB, M))
Step 2: M=D (ksB, E (kpA, C)).

An explanation will now be given for the operating procedures for a conventional electronic watermark system employing the above described public key encryption method.

1) First, a contract d2 concerning the exchange of image data g is prepared by a server and a user.
2) Next, the user generates a random number ID to identify himself or herself, and employs this ID to generate a unidirectional function f.

The unidirectional function is one that when used for a function y=f(x), calculating y from x is easy, but calculating x from y is difficult. For example, a unique factorization or a discrete logarithm for an integer having a number of digits is frequently employed as a unidirectional function.

3) Then, the user prepares signature information d3 using his or her secret key ksU, and transmits it with the contract d2 and the unidirectional function f to the server.
4) Following this, the server verifies the signature information d3 and the contract d2 using the public key kpU of the user.

5) After the verification has been completed, the server embeds in the image data g a current data distribution record d4 and the random number ID prepared by the user, and generates image data which includes an electronic watermark (g+d4+ID).
6) Finally, the server transmits to the user the image data that includes the electronic watermark (g+d4+ID).

When an illegal copy of data is found, embedded information is extracted from the illegal image data, and a specific user is identified using the ID included therein. At this time, a claim by the server that it did not distribute the illegal copy without permission is based on the following grounds.

Since the ID used to specify a user is generated by the user, and since by using that ID the signature of the user is provided for the unidirectional function f, the server can not generate such an ID for an arbitrary user.

However, since a user who has officially concluded a contract with the server must transmit his or her ID to the server, only users who have not made contracts with the server can not be accused of committing a crime, whereas a user who has officially concluded a contract can be so accused.

Therefore, a system (FIG. 3) has been proposed for neutralizing an accusation that a crime has been committed by a user who has officially concluded a contract.

This system is implemented by dividing the server into an original image server and an embedding server. According to this system, the embedded electronic watermark is not destroyed during encryption and decryption.

The operating procedures for the system in FIG. 3 will now be described.
1) First, to obtain desired image data a user issues a request bearing his or her signature d5 to an original image server.
2) The original image server employs the user's signature d5 to verify the contents of the request, and subsequently encrypts the requested image data g and transmits the encrypted data to an embedding server.

At this time, the original image server transmits to the embedding server the image data g accompanied by a signature for a user name u and for consignment contents d6. The original image server also transmits to the user a decryption function f' that is related to the encryption.
3) The embedding server verifies the received encrypted image data g' and the signature (u+d6), employs the user name u and the consignment contents d6 to prepare and embed user information d7 for specifically identifying a user, and thereby creates encrypted data (g'+d7) having an electronic watermark. Then, the embedding server transmits to the user the encrypted image data (g'+d7) that includes the electronic watermark.
4) The user employs the decryption function f', which was received from the original image server, to decrypt the encrypted image data that includes an electronic watermark, (g'+d7), and to obtain the image data provided with the electronic watermark, (g+d7).

When an illegal copy is found later, the original image server encrypts the illegal image data and extracts the embedded information, and transmits it to the embedding server. The embedding server specifically identifies a user from the embedded information.

In this system, since an original image server does not embed in the image data g the user information d7 specifically identifying a user, and since the embedding server does not know the decryption function f (and can not retrieve the original image), the individual server can not illegally distribute to officially contracted servers image data in which is embedded the user information d7.

However, neither the collusion of the original image server and the embedding server, nor the collusion of the embedding server and a user is taken into account in the system in FIG. 3. Since the embedding server holds the encrypted image data g' for the image data g, which are the original image data, and the user holds the decryption function f', when the original image server is in collusion with the embedding server, the servers, as in the system in FIG. 2, can perform an illegal act. And when the embedding server is in collusion with the user, the original image (image data g) can be illegally obtained.

The original image server transmits the decryption function f' to the user; however, if the user does not provide adequate management control for the decryption function f', the carelessness of the user will result in the embedding server obtaining knowledge of the decryption function f', even though the embedding server is not in collusion with the user.

Furthermore, in the system in FIG. 3 the original image server does not include embedding means, nor can it correctly perform embedding. However, since the embedded information is extracted by the original image server, the original image server could correctly perform the embedding by analyzing the embedded information.

For this reason, since the embedding server does not embed its own signature, the correspondence between the embedded information and the user information constitutes the only embedding server secret. However, the correspondence between the embedded information and the user information is not a random correspondence involving the use of a database. If the embedded information is prepared from the user information according to specific rules, there is a good probability that analyzation of the embedded information will be possible.

In this case, as in the system in FIG. 2, the performance of an illegal act is possible.

Furthermore, as is described above, while a system comprising a user and a server has been proposed, though still incomplete, the security available with a system wherein servers are provided hierarchically is not guaranteed.

The reason is as follows. For example, for a system (hierarchial network 1) shown in FIG. 4 wherein a plurality of sales agencies 1 to m are located under a server, and users 11 to 1n and users m1 to mn are located under the individual sales agencies, or for a system (hierarchial network 2) shown in FIG. 5 wherein one of a plurality of authors 1 to m requests that a sales agency that represents him or her sell his or her image data and the sales agency sells image data authored by the pertinent author to many users 1 to n, the participating constituents associated with the trade in data increase from a server and a user, to a server (or an author), an agency and a user, so that the collusion that may occur in the system wherein there are three participating constituents is more complex than is that in the system wherein there are two participating constituents.

The system shown in FIG. 3 could be regarded as a system comprising a server, an agency and a user. However, the conventional system is not based on a hierarchial system, and servers are provided separately in order to prevent an illegal act that may be performed by a single server. As is described above, that collusion may occur is not taken into account.

SUMMARY OF THE INVENTION

In order to resolve the above shortcomings, it is one objective of the present invention to provide an electronic watermarking method that accurately prevents the illegal distribution of data, even if components that perform the trading of data are arranged hierarchically, an electronic information distribution system, an image filing apparatus, and a storage medium.

To achieve the above objective, according to one aspect of the present invention, an electronic watermarking method comprises:

a first step at which a first entity performs a first encryption process for the original data;

a second step at which a second entity, at the least, either manages or distributes the data that are provided by the first encryption and embeds an electronic watermark in the data; and a third step at which a third entity performs a second encryption process for the data in which the electronic watermark has been embedded.

According to one more aspect of the present invention, an electronic information distribution system that exchanges data across a network at the least comprises:

a first entity, including first encryption means, for performing a first encryption process for the original data;

a second entity, including management distribution means for, at the least, either managing or distributing the data that are provided by the first encryption process, and including electronic watermark embedding means for embedding an electronic watermark in the data; and a third entity, including second encryption means for performing a second encryption of the data in which an electronic watermark is embedded.

According to another aspect of the present invention, an electronic watermarking method comprises the steps of:

employing a plurality of means or entities to perform distributed processing for the encryption and for the embedding of an electronic watermark; and employing additional means or entities to examine the legality of, at the least, either the encryption processing or the processing for embedding an electronic watermark that is performed by the plurality of means or entities.

These means or entities may, at the least, consist of three types of means or of entities.

According to an additional aspect of the present invention, an electronic information distribution system, which exchanges digital data across a network system constituted by a plurality of entities, comprises:

a first entity, including first data encryption means;

a second entity, including electronic watermark embedding means, for managing and distributing data received from the first entity;

a third entity, including second encryption means, for employing data in which an electronic watermark has been embedded; and a fourth entity for examining the legality of, at the least, either the encryption processing or the electronic watermark embedding process performed by the first to the third entities.

According to a further aspect of the present invention, an electronic information distribution system, which exchanges digital data across a network system constituted by a plurality of entities, comprises:

a first entity, including first data encryption means;

a second entity, including electronic watermark embedding means, for managing and distributing data received from the first entity;

a third entity, including electronic watermark embedding means and second encryption means, for employing data in which an electronic watermark has been embedded; and a fourth entity for examining the legality of, at the least, either the encryption processing or the electronic watermark embedding process performed by the first to the third entities.

According to one further aspect of the present invention, an electronic information distribution system, which exchanges digital data across a network system constituted by a plurality of entities, comprises:

a first entity, including electronic watermark embedding means and first data encryption means;

a second entity, including electronic watermark embedding means, for managing and distributing data received from the first entity;

a third entity, including second encryption means, for employing data in which an electronic watermark has been embedded; and a fourth entity for examining the legality of, at the least, either the encryption processing or the electronic watermark embedding process performed by, the first to the third entities.

According to yet one more aspect of the present invention, an electronic information distribution system, which exchanges digital data across a network system constituted by a plurality of entities, comprises:

a first entity, including electronic watermark embedding means and first data encryption means;

a second entity, including, at the least, one of electronic watermark embedding means, a first encryption means and a second encryption means, for managing and distributing data received from the first entity;

a third entity, including electronic watermark embedding means and second encryption means, for employing data in which an electronic watermark has been embedded; and a fourth entity for examining the legality of, at the least, either the encryption processing or the electronic watermark embedding process performed by the first to the third entities.

According to yet another aspect of the present invention, an electronic watermark superimposition method comprises the steps of:

encrypting electronic information and exchanging the resultant electronic information;

embedding electronic watermark information in the electronic watermark during the encryption process; and repeating a plurality of times the processing for transmitting the electronic information accompanying an electronic watermark, whereby the electronic information on which the electronic watermark information is superimposed is transmitted by a first entity and delivered via a second entity to a third entity.

According to yet an additional aspect of the present invention, an electronic information distribution system comprises:

a first entity in which original electronic information is held, including encryption means for encrypting the original electronic information and embedding means for embedding an electronic watermark in the electronic information provided by the encryption process;

a second entity, including encryption means for managing and distributing electronic information received from the first entity and for encrypting the electronic information, and including embedding means for embedding electronic watermark information in the electronic information; and a third entity, including encryption means for encrypting electronic information received from the second entity, for employing the resultant electronic information.

According to yet a further aspect of the present invention, provided is an electronic watermark superimposition method, whereby, for the transmission of electronic information to a reception entity by a transmission entity, the transmission entity repeats the electronic watermark processing performed for electronic information that has been encrypted by the reception entity, so that electronic information on which an electronic watermark has been superimposed is, at the least, transmitted by a first entity via a second entity to a third entity.

According to yet one further aspect of the present invention, an electronic watermark superimposition method comprises the steps of:

a transmission entity performing a first encryption process for electronic information;

a reception entity performing for the resultant electronic information a second encryption process that differs from the first encryption process, and returning the obtained electronic information to the transmission entity; and the transmission entity decrypting the electronic information for which the first encryption process has been performed, and embedding electronic watermark information in the electronic information that is decrypted, whereby by repeating the steps, the electronic information on which the electronic watermark information has been superimposed is, at the least, transmitted by a first entity via a second entity to a third entity.

According to still one more aspect of the present invention, an electronic information distribution system comprises:

a first entity, whereat original electronic information is held;

a second entity, for managing and distributing electronic information received from the first entity; and a third entity, for employing the electronic information received from the second entity, wherein for transmission of electronic information by a transmission entity to a reception entity, the transmission entity repeats the processing for embedding an electronic watermark in electronic information, so that electronic information in which electronic watermark information is embedded is, at the least, is transmitted by the first entity via the second entity to the third entity.

According to still another aspect of the present invention, an electronic information distribution system comprises:

a first entity, whereat original electronic information is held;

a second entity, for managing and distributing electronic information received from the first entity; and a third entity, for employing the electronic information received from the second entity, wherein a reception entity performs a second encryption process for electronic information for which a transmission entity has performed a first encryption process that differs from the second encryption process, and returns the resultant electronic information to the transmission entity, wherein the transmission entity decrypts electronic information for which the first encryption process has been performed, and embeds the electronic watermark information in the resultant electronic information, and wherein by repeating the processing, electronic information on which electronic watermark information is superimposed is, at the least, transmitted by the first entity via the second entity to the third entity.

BRIEF DESCRIPTION OF THE DRAWINGS

FIG. 10 is a diagram for explaining a general image format;

FIG. 13 is a diagram for explaining attributes that describe a method for storing image data;

FIG. 26 is a block diagram for explaining the twelfth embodiment.

DETAILED DESCRIPTION OF THE PREFERRED EMBODIMENTS

The preferred embodiments of the present invention will now be described while referring to the accompanying drawings.

(First Embodiment)

Figure 4:
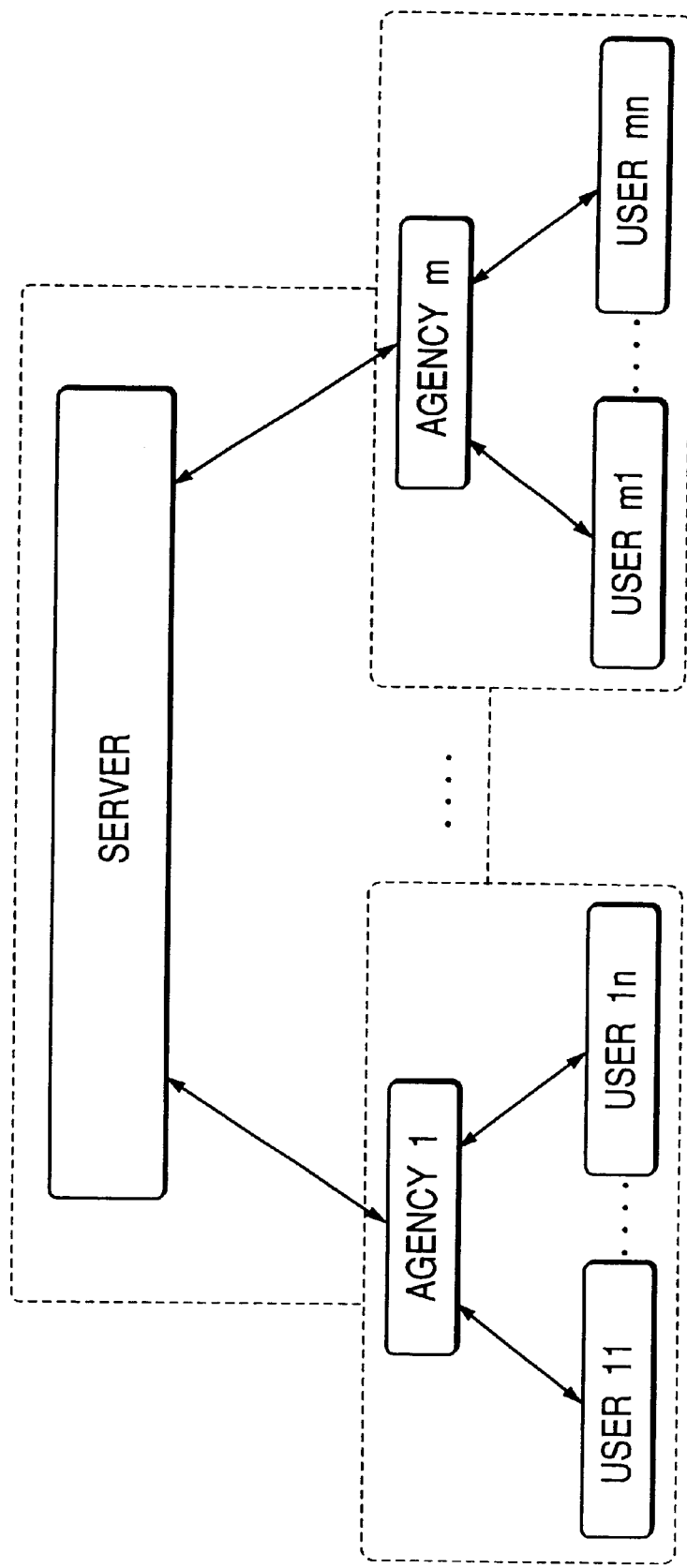
FIG. 4 is a diagram for explaining a hierarchial system (including a server, agencies and users) employing a conventional electronic watermarking method.

The present invention is applied, for example, for a hierarchial system (a system including multiple agencies) shown in FIG. 4.

Figure 6:
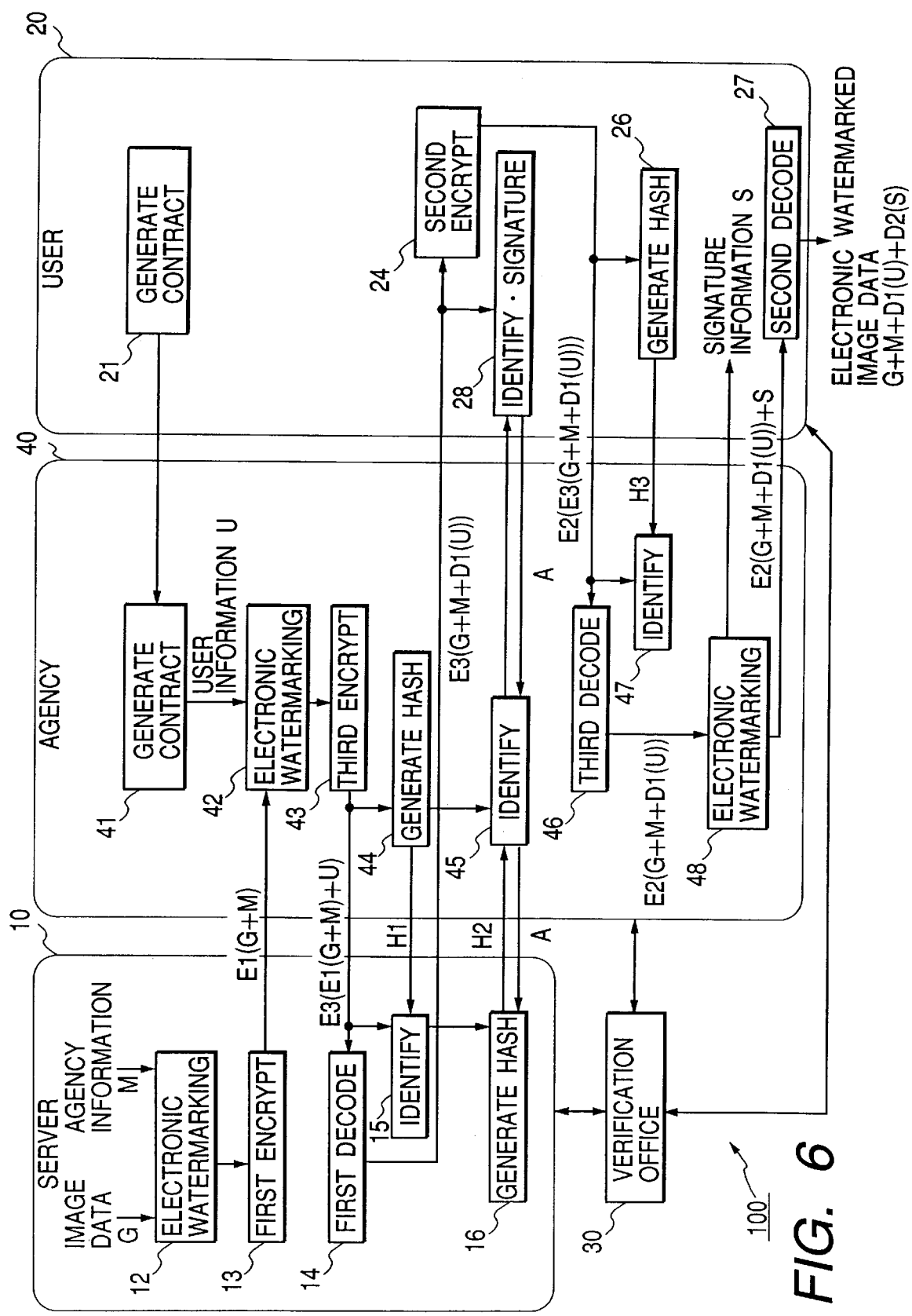
FIG. 6 is a block diagram illustrating the arrangement of a system according to a first embodiment of the present invention.
Figure 7:
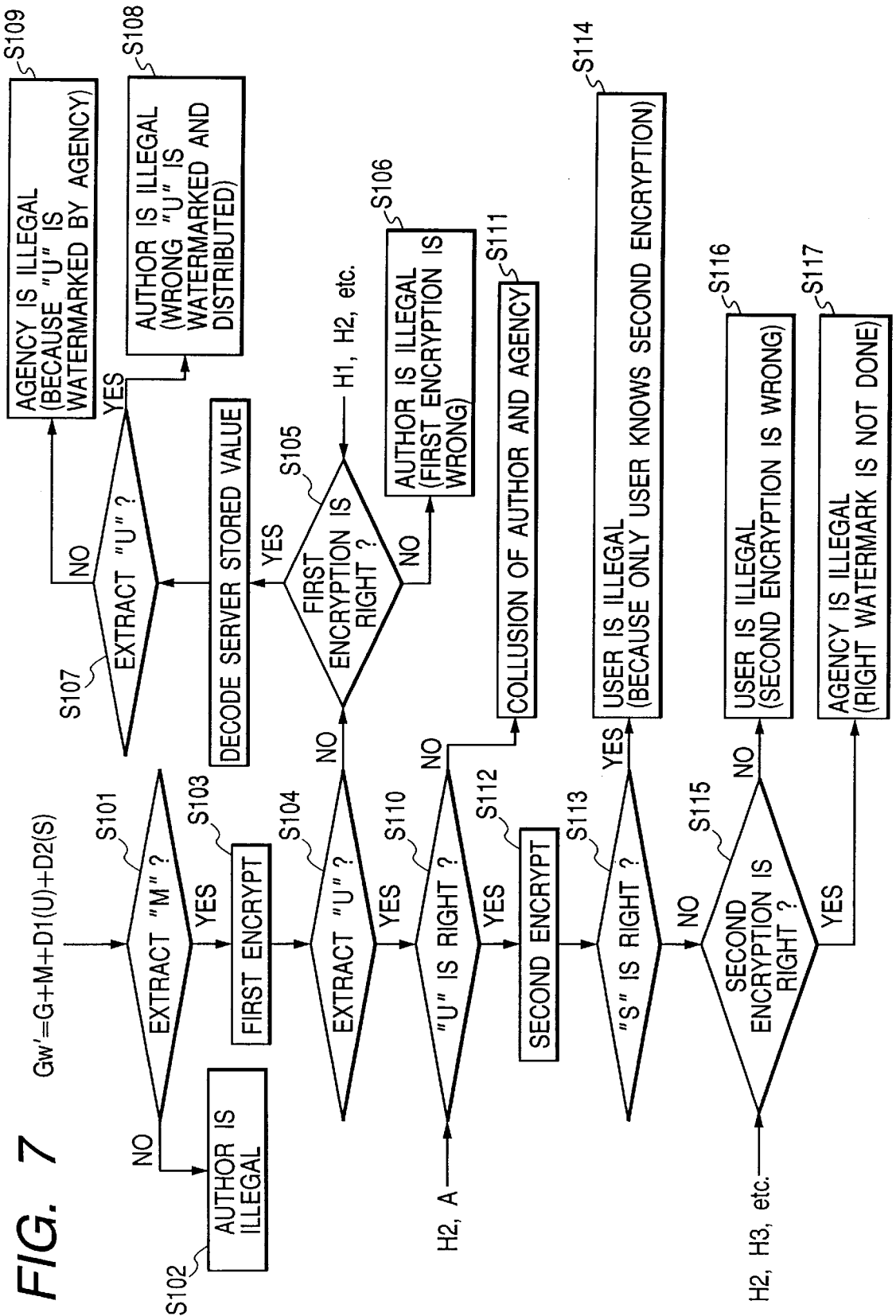
FIG. 7 is a flowchart for explaining verification processing performed by the system.

FIG. 6 is a schematic diagram illustrating the arrangement, for the system in FIG. 4, of a server, one of a plurality of agencies, and one of the users that belong to the agency.

A system 100 will be specifically explained while referring to FIG. 6.

The system 100 is a network system, which is constituted by multiple entities (not shown) that include a terminal 10 at the server side (a server terminal), a terminal 40 at the agency side (an agency terminal), and a terminal 20 at the user side (a user terminal). The individual entities exchange digital data across the network.

The server terminal 10 comprises: a contract identification unit 11, for receiving data from the user terminal 20; an electronic watermark embedding unit 12, for receiving, for example, image data (digital data) G and agency information M; a first encryption unit 13, for receiving the output of the electronic watermark embedding unit 12; a first decryption unit 14, for receiving data from the agency terminal 40; an identification unit 15, for receiving data from the agency terminal 40; and a hash generator 16, for receiving the output of the first decryption unit 14.

The outputs of the first encryption unit 13 and the hash generator 16 are transmitted to the agency terminal 40, and the output of the first decryption unit 14 is transmitted, via the agency terminal 40, both to the hash generator 16 and to the user terminal 20.

The agency terminal 40 comprises: a contract generator 41, for receiving data from the user terminal 20; an electronic watermark embedding unit 42, for receiving the outputs of the contract generator 41 and the first encryption unit 13 of the server terminal 10; a third encryption unit 43, for receiving the output of the electronic watermark embedding unit 42; a hash generator 44, for receiving the output of the third encryption unit 43; an identification unit 45, for receiving the output of the hash generator 44; a third decryption unit 46 and an identification unit 47, for receiving data from the user terminal 20; and an electronic watermark embedding unit 48, for receiving the output of the third decryption unit 46.

The data output by the third encryption unit 43 are transmitted to the hash generator 44, and also to the first decryption unit 14 and the identification unit 15 of the server terminal 10. The data output by the hash generator 16 of the server terminal 10 are also transmitted to the identification unit 45, and the data output by the identification unit 45 are also transmitted to the user terminal 20. Further, data from the user terminal 20 are transmitted to the electronic watermark embedding unit 48, and the data output by the electronic watermark embedding unit 48 are transmitted to the user terminal 20.

The user terminal 20 comprises: a contract generator 21, for transmitting data to the contract identification unit 41 of the agency terminal 40; a second encryption unit 24 and an identification/signature generation unit 28, for receiving data, via the agency terminal 40, from the first decryption unit 14 of the server terminal 10; and a hash generator 26, for receiving data from the second encryption unit 24; and a second decryption unit 27, for receiving the output of the electronic watermark embedding unit 48 of the agency terminal 40.

The data produced by the secondary decryption unit 24 are transmitted to the hash generator 26, and to the third decryption unit 46 and the identification unit 47 of the agency terminal 40. The data produced by the hash generator 26 are also output to the identification unit 47 of the agency terminal. The data produced by the identification unit 45 of the agency terminal 40 are transmitted to the identification/signature generation unit 28.

In the above system 100, information concerning the first encryption process, such as the method used and a secret key, is only that which is available to the server; information concerning the second encryption process is only that which is available to the user; and information concerning the third encryption process is only that which is available to the agency.

It should be noted, however, that a property of these encryption processes is that regardless of whichever encryption process is performed first, a message can be deciphered by employing the decryption process.

Hereinafter, the encryption process is represented by "Ei( )," the decryption process is represented by "Di( )" and the embedding process concerning an electronic watermark is represented by "+."

Thus, the electronic watermark embedding processing performed by the system 100 will be explained first.

[Embedding Process]

1) First, to obtain desired image data, the user terminal 20 issues to the agency a request bearing the user's signature. The requested data is information (user's signature information) that is generated by the contract generator 21 and that is hereinafter called contract information.

The agency terminal 40 receives contract information from the user, identifies it and requests that the server provide the image data.

2) The electronic watermark embedding unit 12 of the server terminal 10 embeds agency information M in the image data G that are requested from the agency.

The first encryption unit 13 performs a first encryption process E( ) for image data (G+M) in which the agency information M is embedded by the electronic watermark embedding unit 12, and transmits the resultant image data to the agency.

In this fashion, the agency terminal 40 receives the first encrypted image data E1(G+M).

3) The contract generator 41 of the agency terminal 40 generates user information U using the contract information for the user.

The electronic watermark embedding unit 42 embeds the user information U generated by the contract generator 41 in the first encrypted image data E1(G+M) received from the server.

The third encryption unit 43 performs a third encryption process E3( ) for the first encrypted image data E1(G+M)+

U, in which the user information U is embedded by the electronic watermark embedding unit 42, and transmits the obtained image data (third encrypted image data) E3(E1(G+M)+U) to the server.

At the same time, the hash generator 44 generates a hash value H1 for the transmission data (third encrypted image data) E3(E1(G+M)+U)), signs it, and transmits the obtained hash value H1 to the server terminal 10.

As a result, the server terminal 10 receives the third encrypted image data E3(E1(G+M)+U and the hash value H1, with its signature.

The hash value is a value obtained by calculating the hash function ho, and the hash function is a compression function that seldom causes a collision. A collision in this case would mean that for the different values x1 and x2, $h(x1)=h(x2)$. The compression function is a function for converting a bit string having a specific bit length into a bit string having a different bit length. Therefore, the hash function is a function $h(\ )$ by which a bit string having a specific bit length is converted into a bit string having a different bit length, and for which values x1 and x2 that satisfy $h(x1)=h(x2)$ are not easily found. Since a value x that satisfies $y=h(x)$ is not easily obtained from an arbitrary value y, accordingly, the hash function is a unidirectional function. Specific examples for the hash function are an MD (Message Digest) 5 or an SHA (Secure Hash Algorithm).

4) The identification unit 15 of the server terminal 10 identifies the signature for the hash value H1 received from the agency terminal 40, and confirms that the hash value HI matches a hash value that is generated using the transmission data (third encrypted image data E3(E1(G+M)+U)). After the confirmation process is completed, the identification unit 15 stores the received data.

The first decryption unit 14 decrypts the first encrypted portion of the third encrypted image data E3(E1(G+M)+U) received from the agency terminal 40, and. transmits the obtained image data to the user terminal 20.

At the same time, the hash generator 16 generates a hash value H2 for the transmission data (E3(G+M+D1(U)), signs it, and transmits the data to the agency terminal 40.

Thus, the agency terminal 40 receives data E3(G+M+D1(U)) and the hash value H2, with its signature.

5) The identification unit 45 of the agency terminal 40 identifies the signature for the hash value H2 received from the server terminal 10, and confirms that the hash value H2 matches the hash value for the transmission data E3(G+M+D1(U)). After the confirmation process is completed, the identification unit 45 stores the received data.

In addition, the identification unit 45 transmits the data received from the server to the user unchanged.

Therefore, the user terminal 20 receives the data E3(G+M+D1(U)) and the hash value H2, with its signature.

6) The identification/signature generation unit 28 identifies the signature for the hash value H2 received from the agency terminal 40, and confirms that the hash value H2 matches the hash value for the transmission data E3(G+M+D1(U)). After the confirmation process is completed, the received data are stored.

In addition, the identification/signature generation unit 28 generates its own signature A for the hash value H2, and transmits the hash value H2, with the signature, to the server via the agency.

The identification unit 45 of the agency terminal 40 and the hash generator 16 of the server terminal 10 identify the signature A transmitted by the user, and then store it.

7) The second encryption unit 24 of the user terminal 20 performs a second encryption process $E(\ )$ for the data E3(G+M+D1(U)) received from the agency, and transmits the obtained data to the agency.

At the same time, the hash generator 26 generates a hash value H3 for the transmission data E2(E3(G+M+D1(U)), signs it, and transmits the hash value H3, with the signature, to the agency. In addition, the hash generator 26 generates its own certification data S and transmits it to the agency.

As a result, the agency terminal 40 receives the data E2(E3(G+M+D1(U)), the hash value H3, with its signature, and the certification information S.

8) The identification unit 47 of the agency terminal 40 identifies the signature for the hash value H3 received from the user, and confirms that the hash value H3 matches the hash value for the transmission data E2(E3(G+M+D1(U))). After the confirmation process is completed, the received data are stored.

The third decryption unit 46 decrypts the third encrypted portion of the data E2(E3(G+M+D1(U))) received from the user.

The electronic watermark embedding unit 48 embeds the certification information S in the data E2(G+M+D1(U)) that are obtained by the third decryption unit 46, and transmits the resultant data E2(G+M+D1(U))+S to the user.

The hash generator 49 generates a hash value H4 for the data E2(G+M+D1(U)), and signs it, and transmits the resultant hash value H4 to the user.

In this fashion, the user terminal 20 receives the data E2(G+M+D1(U))+S.

9) The identification unit 29 of the user terminal 20 identifies the signature for the hash value H4 received from the agency, and confirms that the hash value H4 matches the hash value for the transmission data E2(G+M+D1(U)). After the confirmation process is completed, the received data are stored. The second decryption unit 27 decrypts the second encrypted portion of the data E2(G+M+D1(U))+S, and extracts and outputs, with an electronic watermark, image data $G_w$.

The image data $G_w$ is represented as $$G_w = G+M+D1(U)+D2(S).$$

This indicates that the agency information M, the first encrypted user information (electronic watermark information) U and the second encrypted signature information S are embedded in the original image data.

As is described above, since the agency is in charge of embedding the signature information S for the user, basically the user can not perform an illegal act. While the agency embeds the user information U and the signature information S for the user, the user information U is affected by the first encryption, which only the server knows, and the signature information is affected by the second encryption, which only the user knows. Therefore, the agency can not embed D1(U+D2(S)) directly in the original image data G.

Figure 1:
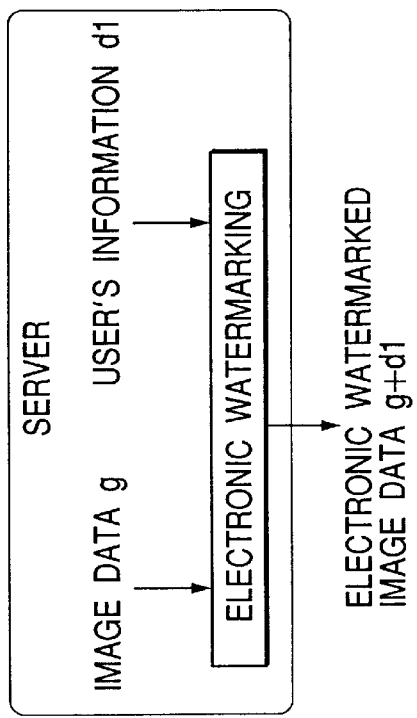
FIG. 1 is a diagram for explaining a conventional electronic watermark system.
Figure 2:
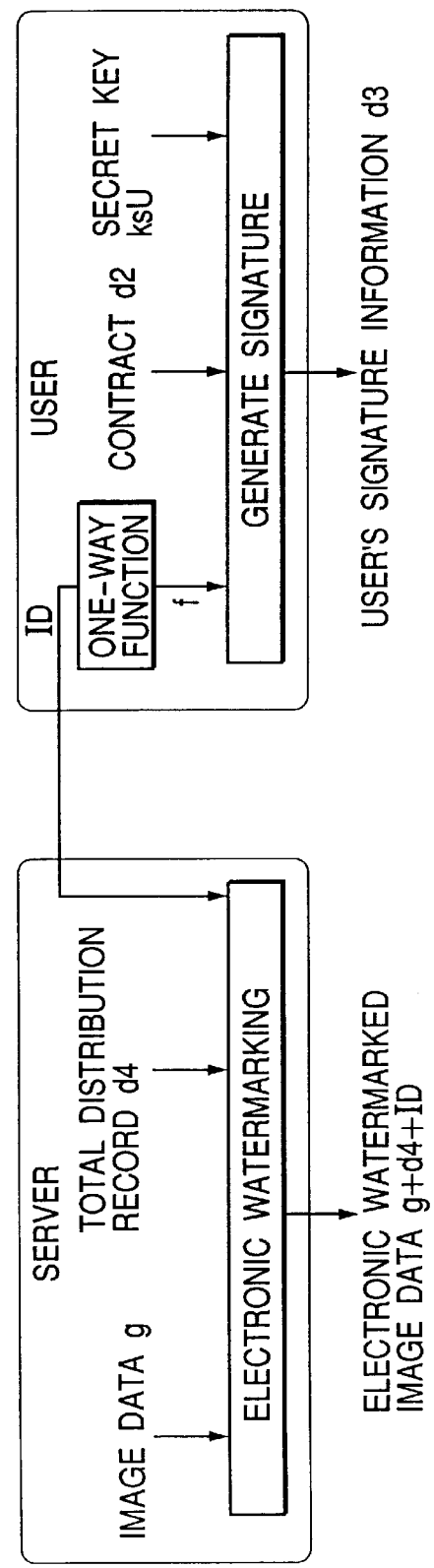
FIG. 2 is a diagram for explaining a conventional electronic watermark system (1) obtained by improving the system in FIG. 1.
Figure 3:
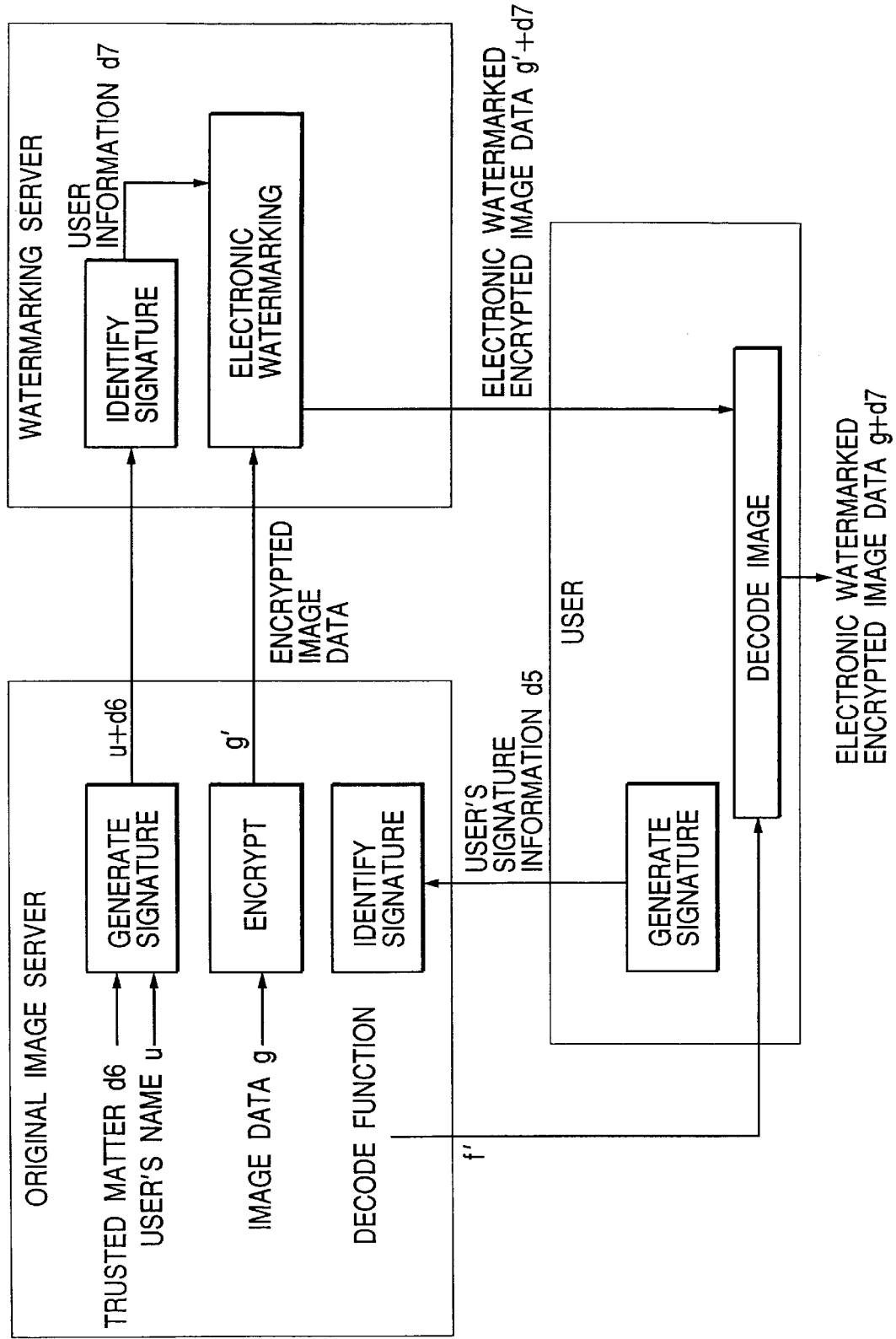
FIG. 3 is a diagram for explaining a conventional electronic watermark system (2) obtained by improving the system in FIG. 1.

When illegal copy (an illegal image) is found, an illegal user is specified by performing the processing shown in FIG. 2 (hereinafter this process is referred to as a verification process). In this embodiment, however, it is noted that image data are not affected by the modification or the deletion of electronic watermark information.

[Verification Process]

1) First, the server terminal 10 extracts agency information M' from the illegal image $G_w'$ that was found (step S101).

When the agency information M' is not extracted, it is ascertained that the server (or the author) has committed an illegal act (step S102). This is so because the server side embedded the agency information M' in the image data.

2) When at 1) the correct agency information M is extracted (M'=M), the server submits to the verification office 30 the illegal image data $G_w'$ and the first encryption key, and requests the first encryption of the illegal image data $G_w'$ (step S103) and the extraction of the user information U' (step S104).

When the correct user information U' is extracted (U'=U), program control advances to 8) which will be described later.

3) When at 2) the correct user information is not extracted, the verification office 30 requests from the server the stored data E3(E1(G+M)+U), and the hash value H1, with its signature. The verification office then identifies the hash value H1 and the signature. Thereafter, the verification office 30 decrypts the first encrypted portion of the data E3(E1(G+M)+U), generates its hash value, and confirms that the hash value matches the hash value H2 stored by the agency. At the same time, the verification office 30 examines the signature provided for the hash value H2 (step S105).

4) When at 3) the hash value generated by the verification office 30 does not match the hash value H2 stored by the agency, the verification office 30 ascertains that the server committed an illegal act (step S106).

This means that the first encryption key submitted by the server is not correct.

5) When at 3) the hash value generated by the verification office 30 matches the hash value H2 stored by the agency, the verification office 30 requests that the agency submit the third encryption key, decrypts the third encrypted portion of the data E3(E1(G+M)+U) stored by the server, and from the obtained data extracts the user information U' (step S107).

6) When at 5) the correct user information U' is extracted (U'=U), the verification office 30 ascertains that the server committed an illegal act (step S108).

This indicates that the user information U' has been correctly embedded in the image data. In addition, since through the verification process as performed up to 5) it is determined that the first encrypted portion for the illegal image data $G_w'$ is correct and the user information U' is illegal, it is apparent that only the server that knows the first encryption key could generate the illegal image data $G_w'$.

7) When at 5) the correct user information U' is not extracted, the verification information 30 ascertains that the agency committed an illegal act (step S109).

This indicates, that the correct user information U' was not embedded in the image data during the embedding process, and the agency was in charge of embedding the user information.

8) When at 2) the correct user information U' is extracted (U'=U), the verification office 30 requests that the server and the agency submit the stored hash value H2 and a signature A' provided by the user for the hash value H2, and identifies the signature A' (step S110).

9) When at 8) the correct signature A' is not identified (not submitted), the verification office 30 ascertains that the server and the agency colluded in an illegal act (step S111).

This indicates that the server and the agency colluded in the counterfeiting of data G+M+D1(U'), which represents an arbitrary user (user information U').

10) When at 8) the correct signature A' is identified (A'=A), the verification office 30 requests that the user submit the second encryption key, and performs the second encryption for the illegal image data $G_w'$ (step S112). Then, the signature information S' is extracted (step S113).

11) When at 10) the correct signature information S' is extracted (S'=S), the verification office 20 ascertains that an illegal act was committed by the user (step S114).

This is because the process for performing the second encryption process and for extracting the signature information S' can be preformed only by the user.

12) When at 10) the correct signature information S' is not extracted, the verification office 30 requests that the user submit the stored image E3(G+M+D1(U)), the hash value H3, with its signature, and identifies the hash value H3 and the signature. Then, the verification office 30 performs the second encryption process for the data E3(G+M+D1(U)), and generates a hash value for the data in order to ascertain whether it matches the hash value H3. At the same time, the verification office 30 also examines the signature for the hash value H3 (step S115).

13) When at 12) the hash value generated by the verification office 30 does not match the hash value H3 stored by the user, the verification office 30 ascertains an illegal act was committed by the user (step S116).

This is because the second encryption key submitted by the user is not correct.

14) When at 12) the hash value generated by the verification office 30 matches the hash value H3 stored by the user, the verification office 30 ascertains an illegal act was committed by the agency (step S117).

This is because the agency did not embed the correct signature information S in the image data during the embedding process.

As is described above, according to the first embodiment, the verification office is not necessary until an illegal image is found, and any illegal act can not be determined to have been performed before an illegal image is found. In addition, so long as the above described verification processing is well known, and the server, the agency and the user monitor the results of that processing, an illegal act by them can be specified in accordance with the situation, even without the verification office 30 being involved.

(Second Embodiment)

Figure 5:
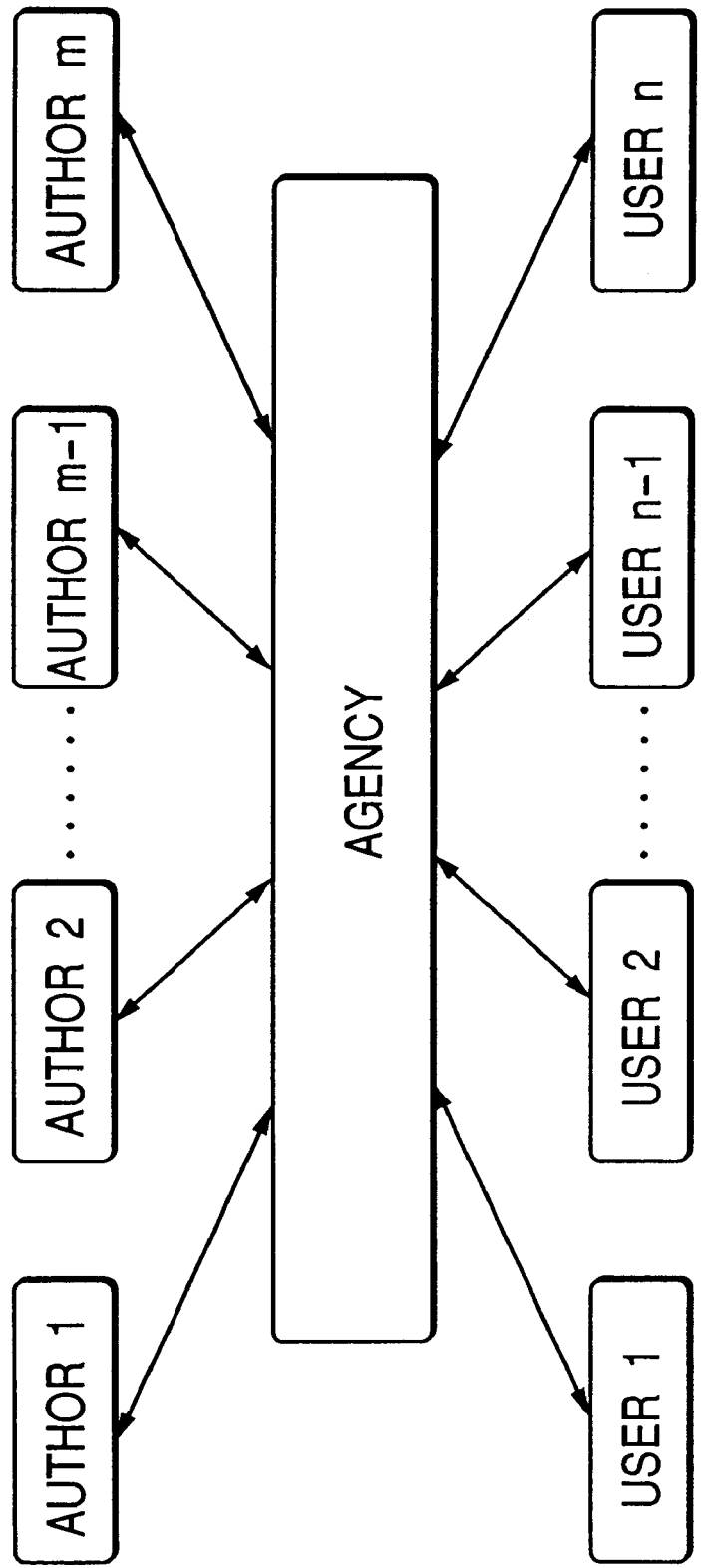
FIG. 5 is a diagram for explaining a hierarchial system (including authors, agency and users) employing a conventional electronic watermarking method.

The present invention is, for example, applied for a hierarchial system (a system including one agency) shown in FIG. 5.

Figure 8:
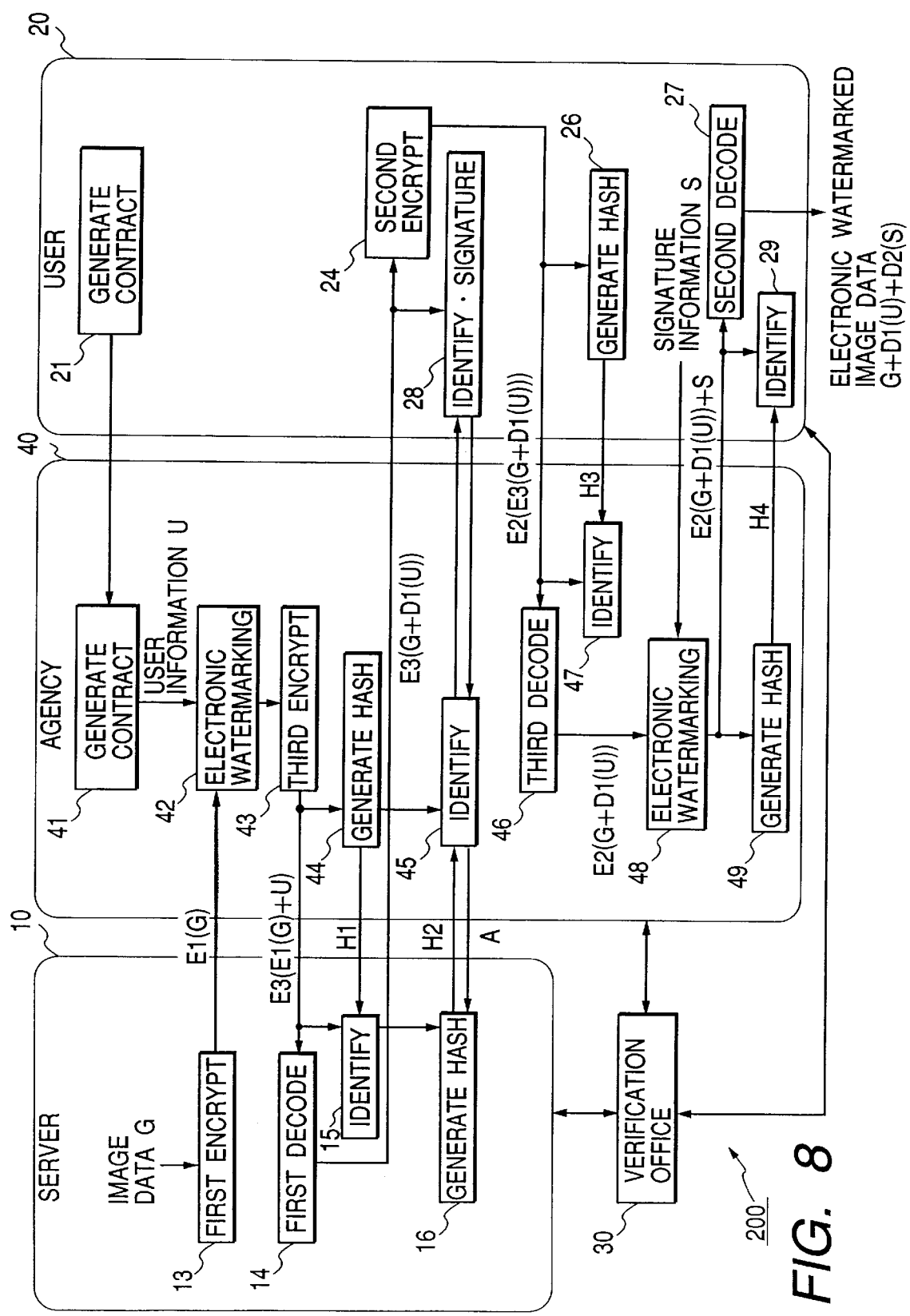
FIG. 8 is a block diagram illustrating the arrangement of a system according to a second embodiment of the present invention.

FIG. 8 is a schematic diagram illustrating the arrangement, for the system in FIG. 5, of one of a plurality of authors (or servers), an agency, and an arbitrary user, one of a plurality of users.

A system 200 will be specifically explained while referring to FIG. 8.

The system 200 has the same structure as the system 100 in FIG. 6, except for the following.

1) An electronic watermark embedding unit 12 is not provided in a server terminal 10, and only image data G are transmitted to a first encryption unit 13.

2) A hash generator 49 for receiving the output of an electronic watermark embedding unit 48 is further provided for an agency terminal 40. The data produced by the hash generator 49 are transmitted to a user terminal 20.

3) An identification unit 29 is additionally provided for the user terminal 20 and receives the outputs of the electronic watermark embedding unit 48 and the hash generator in the agency terminal 40.

As is described above, the system 200 is so designed that the embedding of agency information M representing an agency is omitted.

First, an explanation will be given for the electronic watermark embedding processing performed by the system 200.

The same reference numerals as are used for the system 100 in FIG. 6 are also used to denote corresponding components in the system 200 in FIG. 8, and no detailed explanation for them will be given.

[Embedding Process]

1) First, to obtain image data (contract information), the user terminal 20 issues to the agency a request bearing the user's signature.

The agency terminal 40 receives contract information from the user, identifies it and requests that the server provide the image data.

2) In the server terminal 10, the first encryption unit 13 performs a first encryption process E1 for image data G, and transmits the resultant image data to the agency.

In this fashion, the agency terminal 40 receives the first encrypted image data E1(G).

3) The contract generator 41 of the agency terminal 40 generates user information U using the contract information for the user.

The electronic watermark embedding unit 42 embeds the user information U generated by the contract generator 41 in the first encrypted image data E1(G) received from the server.

The third encryption unit 43 performs a third encryption process E3 for the first encrypted image data E1(G)+U, in which the user information U is embedded by the electronic watermark embedding unit 42, and transmits the obtained image data (third encrypted image data) E3(E1(G)+U) to the server.

At the same time, the hash generator 44 generates a hash value H1 for the transmission data (third encrypted image data) E3(E1(G)+U)), signs it, and transmits the obtained hash value H1 to the server terminal 10.

As a result, the server terminal 10 receives the third encrypted image data E3(E1(G)+U) and the hash value H1, with its signature.

4) The identification unit 15 of the server terminal 10 identifies the signature for the hash value H1 received from the agency terminal 40, and confirms that the hash value H1 matches a hash value that is generated using the transmission data (third encrypted image data E3(E1(G)+U)). After the confirmation process is completed, the identification unit 15 stores the received data.

The first decryption unit 14 decrypts the first encrypted portion of the third encrypted image data E3(E1(G)+U) received from the agency terminal 40, and transmits the obtained image data to the user terminal 20.

At the same time, the hash generator 16 generates a hash value H2 for the transmission data (E3(G+D1(U)), signs it, and transmits the data to the agency terminal 40.

Thus, the agency terminal 40 receives data E3(G+D1(U)) and the hash value H2, with its signature.

5) The identification unit 45 of the agency terminal 40 identifies the signature for the hash value H2 received from the server terminal 10, and confirms that the hash value H2 matches the hash value for the transmission data E3(G+D1(U)). After the confirmation process is completed, the identification unit 45 stores the received data.

In addition, the identification unit 45 transmits the data received from the server to the user unchanged.

Therefore, the user terminal 20 receives the data E3(G+D1(U)) and the hash value H2, with its signature.

6) The identification/signature generation unit 28 identifies the signature for the hash value H2 received from the agency terminal 40, and confirms that the hash value H2 matches the hash value for the transmission data E3(G+D1(U)). After the confirmation process is completed, the received data are stored.

In addition, the identification/signature generation unit 28 generates its own signature A for the hash value H2, and transmits the hash value H2, with the signature, to the server via the agency.

The identification unit 45 of the agency terminal 40 and the hash generator 16 of the server terminal 10 identify the signature A transmitted by the user, and then store it.

7) The second encryption unit 24 of the user terminal 20 performs a second encryption process E( ) for the data E3(G+D1(U)) received from the agency, and transmits the obtained data to the agency.

At the same time, the hash generator 26 generates a hash value H3 for the transmission data E2(E3(G+D1(U)), signs it, and transmits the hash value H3, with the signature, to the agency. In addition, the hash generator 26 generates its own certification data S and transmits it to the agency.

As a result, the agency terminal 40 receives the data E2(E3(G+D1(U)), the hash value H3, with its signature, and the certification information S.

8) The identification unit 47 of the agency terminal 40 identifies the signature for the hash value H3 received from the user, and confirms that the hash value H3 matches the hash value for the transmission data E2(E3(G+D1(U))). After the confirmation process is completed, the received data are stored.

The third decryption unit 46 decrypts the third encrypted portion of the data E2(E3(G+D1(U))) received from the user.

The electronic watermark embedding unit 48 embeds the certification information S in the data E2(G+D1(U)) that are obtained by the third decryption unit 46, and transmits the resultant data E2(G+D1(U))+S to the user.

In this fashion, the user terminal 20 receives the data E2(G+D1(U))+S.

9) In the user terminal 20, the second decryption unit 27 decrypts the second encrypted portion of the data E2(G+D1(U))+S, and extracts and outputs, with an electronic watermark, image data $G_w$.

The image data $G_w$ is represented as $$G_w = G + D1(U) + D2(S).$$

This indicates that the first encrypted user information (electronic watermark information) U and the second encrypted signature information S are embedded in the original image data.

As is described above, since the agency is in charge of embedding the signature information S for the user, basically the user can not perform an illegal act. While the agency embeds the user information U and the signature information S for the user, the user information U is affected by the first encryption, which only the server knows, and the signature information is affected by the second encryption, which only the user knows. Therefore, the agency can not embed D1(U+D2(S)) directly in the original image data G.

When an illegal copy (illegal image) is found, an agency that committed an illegal act can be specified by performing the following verification processing, without using the above described agency information M. It should be noted that image data are not affected by the modification and the deletion of an electronic watermark.

[Verification Process]

1) First, the server submits to the verification office 30 a first encryption key that is obtained from illegal image data $G_w'$ that have been discovered, and requests a first encryption of the illegal image data $G_w'$ and the extraction of user information U'.

When the correct user information U' is extracted (U'=U), program control advances to 7) which will be discussed later.

2) When at 1) the correct user information is not extracted, the verification office 30 requests from the server the stored data E3(E1(G)+U), and the hash value H1, with its signature. The verification office 30 then identifies the hash value H1 and the signature. Thereafter, the verification office 30 decrypts the first encrypted portion of the data E3(E1(G)+U), generates its hash value, and confirms that the hash value matches the hash value H2 stored by the agency. At the same time, the verification office 30 examines the signature provided for the hash value H2.

3) When at 2) the hash value generated by the verification office 30 does not match the hash value H2 stored by the agency, the verification office 30 ascertains that the server committed an illegal act.

This means that the first encryption key submitted by the server is not correct.

4) When at 2) the hash value generated by the verification office 30 matches the hash value H2 stored by the agency, the verification office 30 requests that the agency submit the third encryption key, decrypts the third encrypted portion of the data E3(E1(G)+U) stored by the server, and from the obtained data extracts the user information U'.

5) When at 4) the correct user information U' is extracted (U'=U), the verification office 30 ascertains that the server committed an illegal act.

This indicates that the user information U' has been correctly embedded in the image data. In addition, since through the verification process as performed up to 4) it is determined that the first encrypted portion for the illegal image data $G_w'$ is correct and the user information U' is illegal, it is apparent that only the server that knows the first encryption key could generate the illegal image data $G_w'$.

6) When at 4) the correct user information U' is not extracted, the verification information 30 ascertains that the agency committed an illegal act.

This indicates, that the correct user information U' was not embedded in the image data during the embedding process, and the agency was in charge of embedding the user information.

7) When at 1) the correct user information U' is extracted (U'=U), the verification office 30 requests that the server and the agency submit the stored hash value H2 and a signature A' provided by the user for the hash value H2, and identifies the signature A'.

8) When at 7) the correct signature A' is not identified (not submitted), the verification office 30 ascertains that the server and the agency colluded in an illegal act.

This indicates that the server and the agency colluded in the counterfeiting of data G+D1(U'), which represents an arbitrary user (user information U').

9) When at 7) the correct signature A' is identified (A'=A), the verification office 30 requests that the user submit the second encryption key, and performs the second encryption for the illegal image data $G_w'$. Then, the signature information S' is extracted.

10) When at 9) the correct signature information S' is extracted (S'=S), the verification office 20 ascertains that an illegal act was committed by the user.

This is because the process for performing the second encryption process and for extracting the signature information S' can be performed only by the user.

11) When at 9) the correct signature information S' is not extracted, the verification office 30 requests that the user submit the stored image E3(G+D1(U)), the hash value H3, with its signature, and identifies the hash value H3 and the signature. Then, the verification office 30 performs the second encryption process for the data E3(G+D1(U)), and generates a hash value for the data in order to ascertain whether it matches the hash value H3. At the same time, the verification office 30 also examines the signature for the hash value H3.

12) When at 11) the hash value generated by the verification office 30 does not match the hash value H3 stored by the user, the verification office 30 ascertains an illegal act was committed by the user.

This is because the second encryption key submitted by the user is not correct.

13) When at 11) the hash value generated by the verification office 30 matches the hash value H3 stored by the user, the verification office 30 ascertains an illegal act was committed by the agency.

This is because the agency did not embed the correct signature information S in the image data during the embedding process.

As is described above, according to the second embodiment, the verification office is not necessary until an illegal image is found, and any illegal act can not be determined to have been performed before an illegal image is found. In addition, so long as the above described verification processing is well known, and the server, the agency and the user monitor the results of that processing, an illegal act by them can be specified in accordance with the situation, even without the verification office 30 being involved.

(Third Embodiment)

Recently, the transfer of money across networks, a fund transfer procedure that is called electronic cash, has come to be employed. Since as with a regular cash payment, the name of the owner of an electronic cash transfer is not identified, anonymity is attained. If the attainment of anonymity were not possible, a seller of a product could obtain from an electronic cash transfer information concerning a purchaser and the use of its product, and the privacy of a user would not be protected. Therefore, the protection of the privacy of a user is as important as is the protection provided for a copyright granted to a creator who uses an electronic watermark.

In a third embodiment, therefore, the anonymity of a user is provided for a purchaser, and when an illegal act, such as the illegal distribution of images, is discovered, it is possible to identify an unauthorized distributor, which is the original purpose of an electronic watermark. This is achieved by employing, for example, a system 300 shown in FIG. 9.

The system 300 has the same structure as has the system 200 in FIG. 8, while an anonymous public key certificate, which is issued by a certification office 50, is provided for a user terminal 20.

Generally, in order to authenticate signature information, a certificate issued by an organization called a certification office is added to a public key that is used when examining the signature information.

A certification office is an organization that issues certificates for public keys assigned to users to provide public key authentication that is consonant with the requirements of the public key encryption system. That is, a certification office employs its own secret key to provide a signature for a user's public key, or for data concerning the user, and for this purpose prepares and issues a certificate. When a user receives from another user a signature that is accompanied by a certificate, the user examines the certificate using the public key of the certification office to verify the authentication provided by the user who transmitted the public key (or, at the least, the fact that authentication has been provided the user by the certification office). Both VeriSign and CyberTrust are well known organizations that operate such certification offices.

When at procedure 1) of the embedding process in the second embodiment an agency examines a signature to verify the contract information submitted for a user, the agency can employ the public key with a signature issued by a certification office.

However, since the name of the owner of the public key is generally written in the certificate, user anonymity is not provided at the time data are purchased.

On the other hand, if the certification office keeps secret the correspondence of public keys and their owners, the name of an owner may not be written in a certificate issued for a public key. A public key for which such a certificate is provided is called an "anonymous public key with a certificate."

In procedure 1) of the above described embedding process, when a user transmits to a server not only contract information but also a signature for the contract information and an anonymous public key, accompanied by a certificate, to enable the examination of the signature information S, the user can remain anonymous when purchasing digital data. Therefore, the anonymous public key, accompanied by the certificate, is transmitted to the agency as information to be used for user verification. And when an illegal transaction is discovered and the user must be identified, the anonymous public key, accompanied by the certificate, is transmitted to the certification office 50 with a request for the user name which corresponds to that of the owner of the public key.

Therefore, when procedure 1) in the embedding process and procedure 7) in the verification process in the second embodiment are performed as follows, the anonymity of a user when purchasing digital data can be maintained, but when an illegal transaction is discovered, the user responsible for the perpetration of the transaction can be identified.

Figure 9:
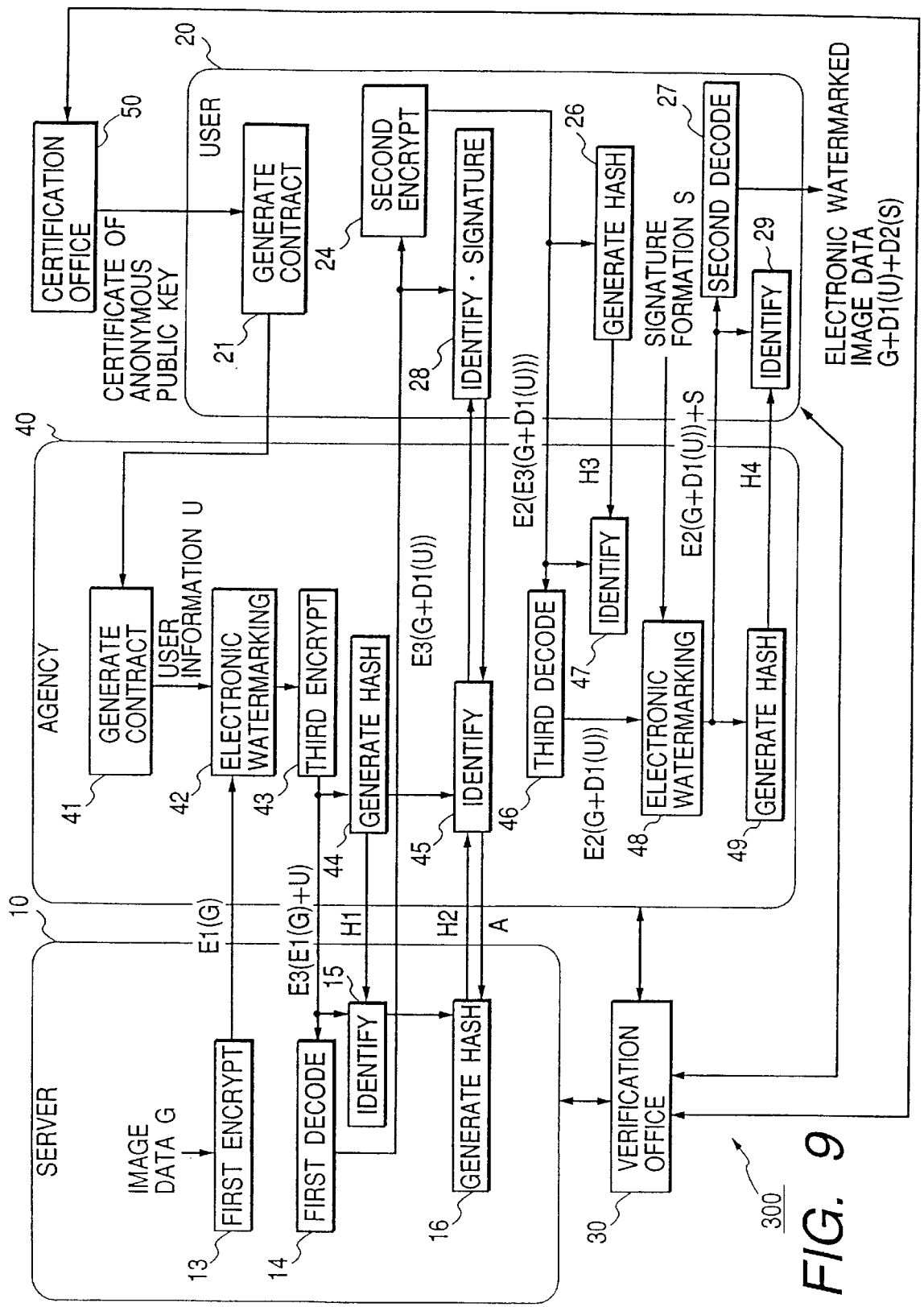
FIG. 9 is a block diagram illustrating the arrangement of a system according to a third embodiment of the present invention.

The embedding process and the verification process performed by the system 300 in FIG. 9 will be specifically described.

The same reference numerals as are used in the system 200 in FIG. 8 are also used to denote corresponding components of the system 300 in FIG. 9, and no detailed explanation for them will be given. Only the differing portions will be specifically explained.

Since the procedures, other than procedure 1) in the embedding process and procedure 1) in the verification process, are the same as those in the second embodiment, no detailed explanation of them will be given.

[Embedding Process]

1') First, in the user terminal 20, a contract generator 21 provides, for contract information for requesting desired image data, a signature that corresponds to an anonymous public key, accompanied by a certificate issued by the certification office 50. Together with the anonymous public key, accompanied by the certificate, contract information is transmitted to the agency by the user.

The agency terminal 40 identifies the received contract information by using the anonymous public key, accompanied by the certificate, and issues a request for the image data to the server.

Hereinafter, procedures 2) to 9) of the embedding process in the second embodiment are preformed.

In this case, the user basically can not perform any illegal act, and the agency can not embed D1(U+D2(S)) directly in the original image data.

When an illegal copy (illegal image) is found, the following verification process is performed.

[Verification Process]

1) to 6) First, procedures 1) to 6) of the verification process in the second embodiment are performed. 7') When in procedure 1) correct user information U' is extracted (U'=U), a verification office 30 submits to the certification office 50 the user information U' and the anonymous public key, accompanied by the certificate that is extracted from the contract information. The verification office 30 requests from the certification office 50 the identity of the user whose name corresponds to that of the owner of the anonymous public key. The verification office 30 also requests that the server and the agency submit a stored hash value H2 and a signature A', for the hash value H2 provided by the user, and identifies the signature A'.

Hereinafter, procedures 8) to 13) in the verification process in the second embodiment are performed.

As is described above, according to the third embodiment, as well as the second embodiment, there is no need for the verification office 30 until an illegal image has been discovered, and no illegal act can be performed until an illegal image is discovered. In addition, so long as the above described verification processing is well known, and the server, the agency and the user monitor the results of that processing, an illegal act committed by any of them can be identified in accordance with the situation, even without the intercession of the verification office 30.

In the third embodiment, a certification office 50 is additionally provided for the system 200 in the second embodiment. However, the modification of the system arrangement is not thus limited, and a certification office 50 may be provided for the system 100 in the first embodiment. In this case, procedure 1) in the embedding process in the first embodiment corresponds to procedure 1') for the third embodiment, and procedure 8) in the verification process in the first embodiment corresponds to procedure 7') for the third embodiment.

Various data, to include image data in the first to the third embodiments and hash values obtained during the embedding process for electronic watermark information, can be stored using the following image format.

According to the following general image format, for example, image data that are transmitted at individual steps can be stored in an image data portion, and a corresponding hash value and its signature can be stored in an image header portion. Furthermore, a hash value and its accompanying signature, which the user must retain, and the second encryption key can be stored in the image header portion, while image data having an electronic watermark can be stored in the image data portion.

According to the following FlashPix™ file format, the general image format, which includes the hash value and the signature, can be stored as data in each layer. And the hash value and the signature may be stored as attribute information in a property set.

[Explanation For General Image Format]

According to the general image format, an image file is divided into an image header portion and an image data portion, as is shown in FIG. 10.

Generally, stored in the image header portion are information that is required for reading image data from an image file, and additional information for explaining the contents of an image. In the example in FIG. 10 are stored an image format identifier describing the name of an image format, a file size, the width, height and depth of an image, information as to whether data are compressed or not, a resolution, an offset to an image data storage location, the size of a color palette, etc. Image data are sequentially stored in the image data portion.

Typical examples of such image formats are Microsoft's BMP format and CompuServe's GIF format.

[Explanation of File Format]

According to the following file format, attribute information stored in the image header portion, and the image data stored in the image data portion are rearranged to more closely correspond to a structure and are stored in the file. A structured image file is shown in FIGS. 11 and 12.

The individual properties and the data in the file are accessed as storage areas and streams that correspond to the directories and files of MS-DOS.

Figure 11:
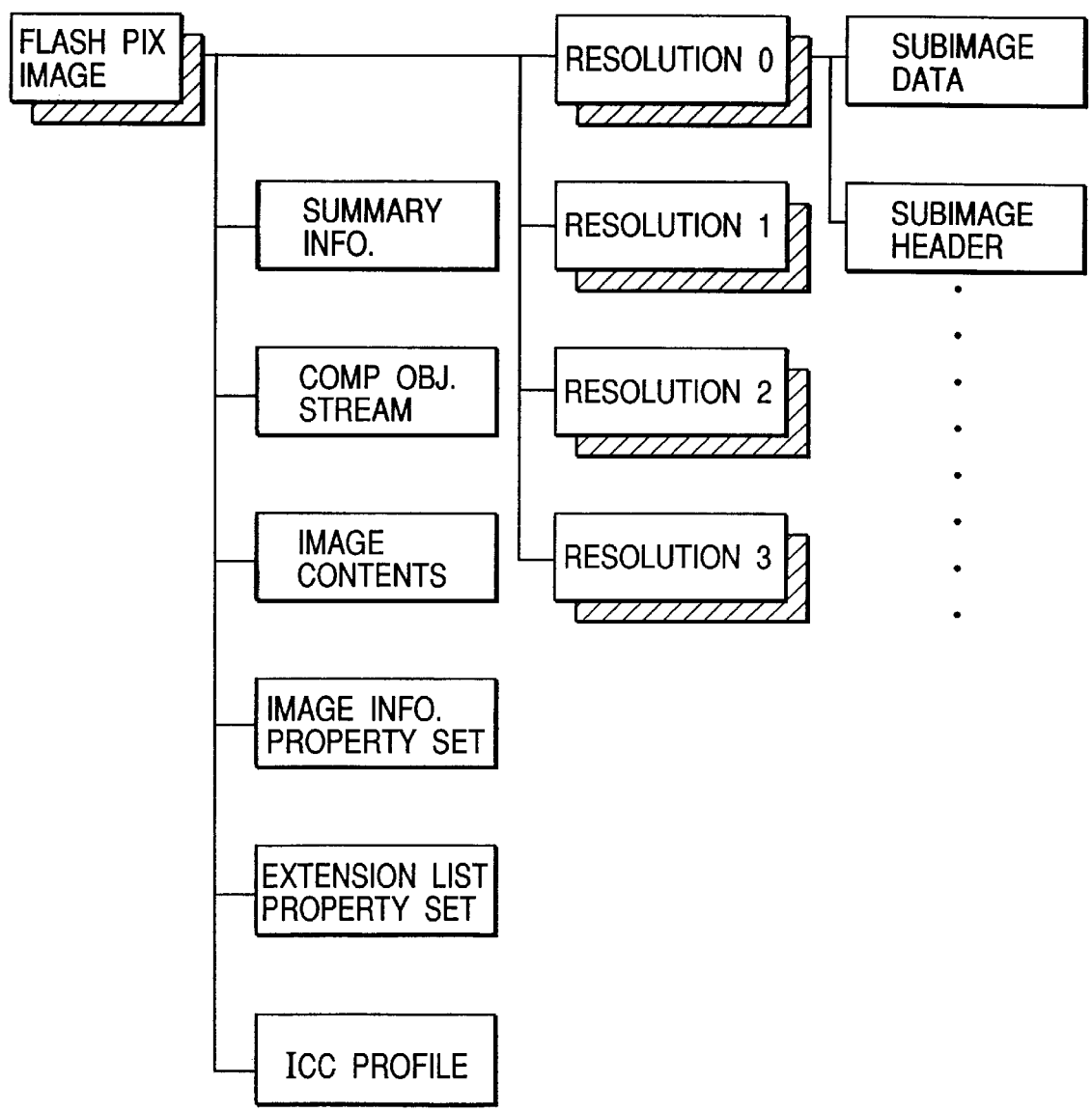
FIG. 11 is a diagram for explaining image file structure (I)
Figure 12:
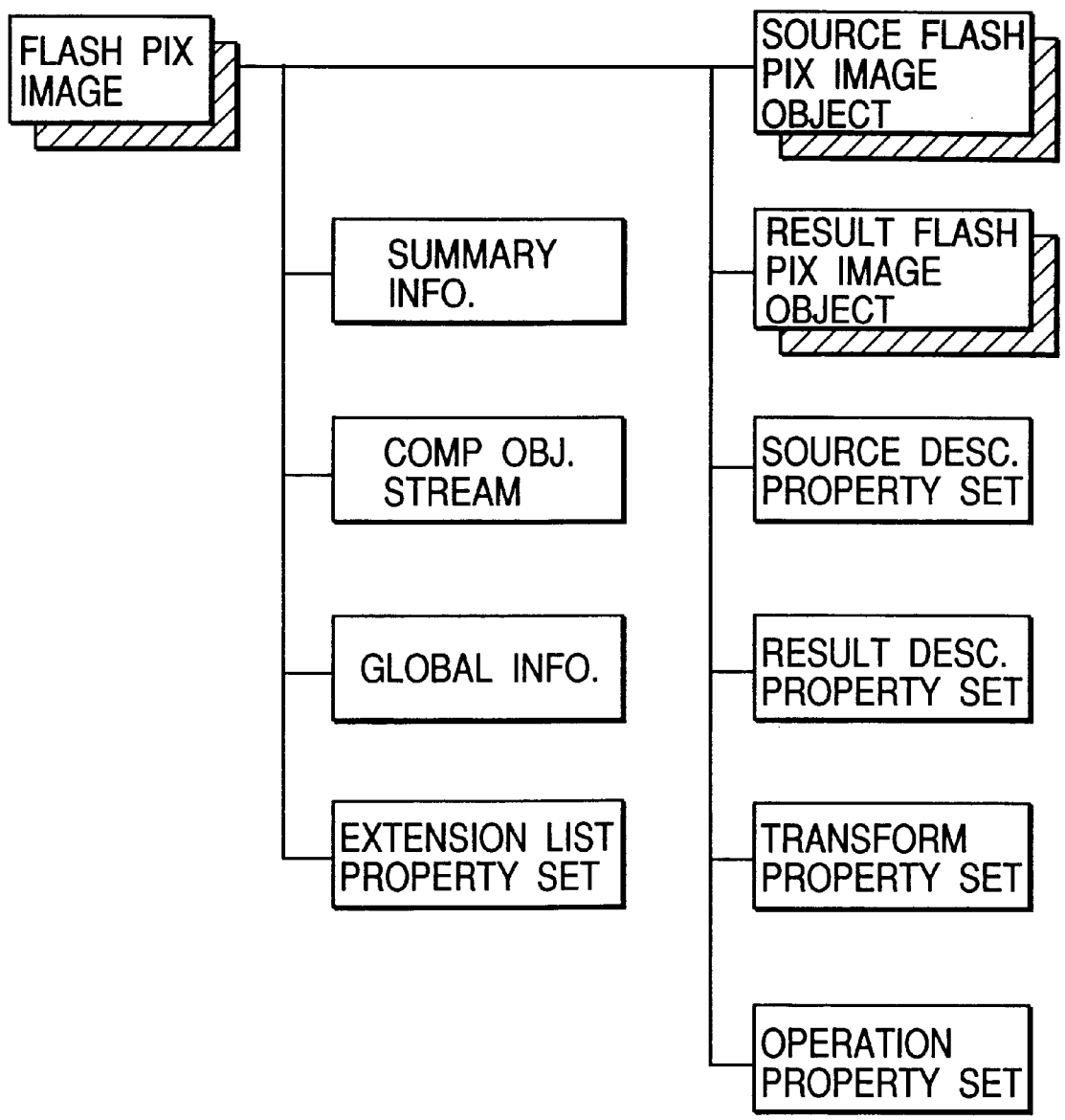
FIG. 12 is a diagram for explaining image file structure (II)

In FIGS. 11 and 12, the shaded portions are storage areas and the unshaded portions are streams. Image data and image attribute information are stored in the streams.

In FIG. 11, the image data are arranged hierarchically in accordance with their differing resolutions, with one image for each resolution being called a Subimage and being represented by a Resolution 0, 1, . . . , or n. For one image for each resolution, the information that is required for reading the image data is stored in a Subimage Header area, and the image data are stored in a Subimage data area.

The property sets, which are composed of attribute information that is defined by sorting it in consonance with the purpose of its use and with its contents, comprise Summary Info. Property Sets, Image Info. Property Sets, Image Content Property Sets and Extension List Property Sets.

[Explanation for Each Property Set]

A Summary Info. Property Set is not an inherent part of this file format, but is required for the storage of the title, the name, an the author of a file, and a thumb-nail image.

General information concerning a storage unit (Storage) is stored in the Com Obj. Stream.

An Image Content Property Set is an attribute for describing a storage method used for image data (see FIG. 13). For this attribute there are provided the count of the layers of image data, the width and height of an image at its maximum resolution, the width, the height and the color of an image at each resolution, and the definition of a quantization table or a Huffman table used for JPEG compression.

An Extension List Property Set is an area used to add information that is not included in the basic specification for the above file format.

In an ICC Profile area is described a specified ICC (International Color Consortium) conversion profile for spatial color conversion.

In an Image Info. Property Set are stored various types of information that can be utilized to employ image data. For example, the following types of information describe how an image is fetched and how it can be used:

information concerning a fetching method or a generation method for digital data;

information concerning a copyright;

information concerning the contents of an image (a person or the scenery in an image);

information concerning a camera used to take a photograph;

information concerning the setup used for a camera (exposure, shutter speed, focal distance, whether a flash was used, etc.);

information concerning a resolution unique to a digital camera and a mosaic filter;

information concerning the name of the maker of the film, and the name and the type (negative/positive, or color/monochrome) of the film;

information concerning the type and the size when the original is a book or other printed matter; and information concerning a scanner and a software application that was used to scan an image, and the operator.

In FIG. 12 is shown an image file in which a viewing parameter, which is used for displaying an image, and image data are stored together. The viewing parameter is a set of coefficients that are stored for use when adjusting the rotation, the enlargement/reduction, the shifting, the color conversion and the filtering processing for an image when it is displayed.

In FIG. 12, in a Global Info. Property Set area, is written a list of locked attributes, for example, an index for a maximum image an index for the most altered item, and information concerning the person who made the last correction.

Furthermore, a Source/Result FlashPix Image Object constitutes the substance of the image data, but whereas a Source FlashPix Image Object is required, a Result FlashPix Image Object is optional. Original image data are stored in the Source FlashPix Image Object area, and image data obtained by image processing using the viewing parameter are stored in the Result FlashPix Image Object area.

Source/Result Desc. Property Set is a property set used to identify the above image data. An image ID, a property set for which changes are inhibited, and the date and the time of the last update are stored in this area.

In a Transform Property Set area are stored an affine conversion coefficient used for the rotation, the enlargement/reduction and the shifting of an image, a color conversion matrix, a contrast adjustment value, and a filtering coefficient.

[Explanation of How to Handle Image Data]

Employed for this explanation is an image format that includes a plurality of images having different resolutions that are obtained by dividing an image into a plurality of tiles.

Figure 14:
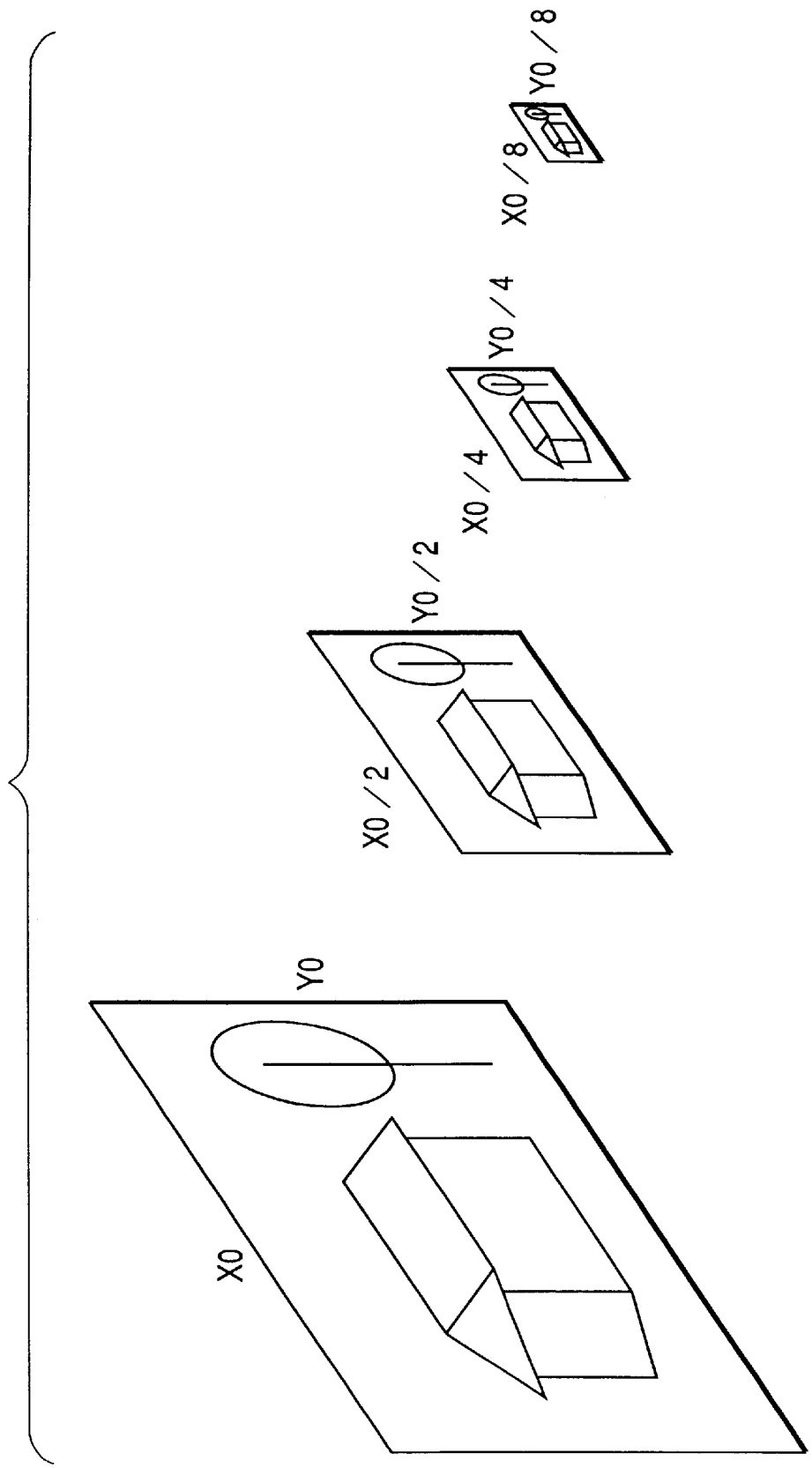
FIG. 14 is a diagram for explaining an example image file that is constituted by a plurality of images having different resolutions.

In FIG. 14 is shown an example image file that is constituted by a plurality of images having different resolutions. In FIG. 14, an image having the highest resolution consists of X0 columns×Y0 rows, and an image having the next highest resolution consists of X0/2 columns×Y0/2 rows. The number of columns and the number of rows are sequentially reduced by ½ until the columns and rows are equal to or smaller than 64 pixels, or until the columns and the rows are equal.

As a result of the layering of image data, the number of layers in one image file is required image attribute information, and the header information and the image data, which have been explained for the general image format, are also required for an image at each layer (see FIG. 10). The number of layers in one image file, the width and the height of an image at its maximum resolution, the width, the height and the color of an image having an individual resolution, and a compression method are stored in the Image Content Property Set area (see FIG. 13).

Figures 15, 16:
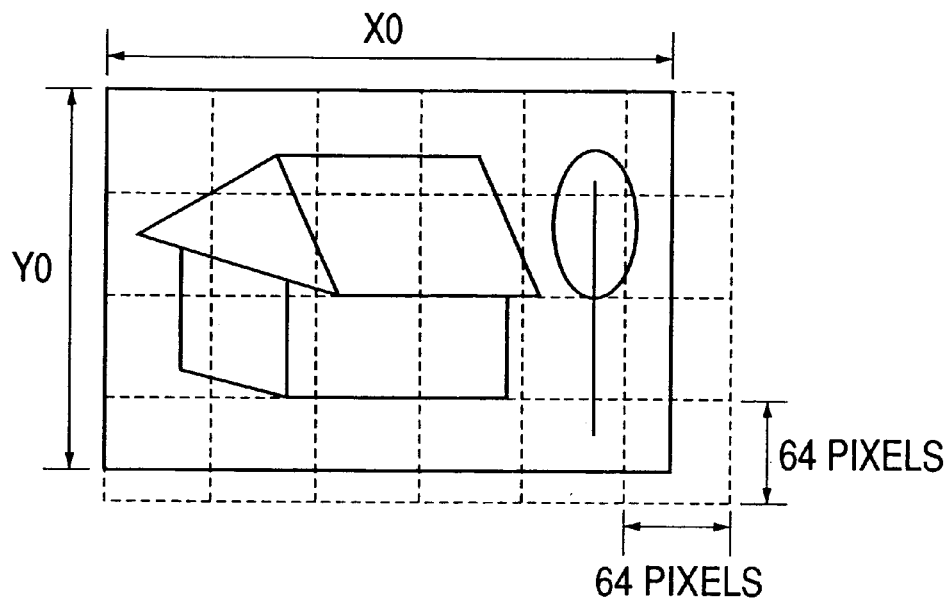
FIG. 15 is a diagram for explaining images on layers having different resolutions.
FIG. 16 is a diagram for explaining tile data for individual image data.

The image at a layer at each resolution is divided into tiles, each of which is 64×64 pixels, as is shown in FIG. 15. When an image is divided beginning at the left upper portion into tiles of 64×64 pixels, a blank space may occur in one part of a tile at the right edge or the lower edge. In this case, the rightmost image or the lowermost image is repeatedly inserted to construct a 64×64 pixel tile.

In this FlashPix™ format, image data for the individual tiles are stored using either JPEG compression, or the single color or a non-compressed method. JPEG compression is the image compression technique internationally standardized by ISO/IEC JTC1/SC29, and thus an explanation of this technique will not be given. The single color method is a technique whereby when one tile is constructed entirely of pixels having the same color, the tile is expressed as a single color, with no individual pixel values being recorded. This method is especially effective for images that are generated using computer graphics.

The image data that are thus divided into tiles are stored, for example, in the Subimage data stream in FIG. 11, and the total number of tiles, the sizes of the individual tiles, the location at which data begin, and the data compression method are stored in the Subimage Header area (see FIG. 16).

In the first to the third embodiments, electronic watermark information can be embedded using various methods.

Further, the first encryption to the third encryption can also be implemented by employing various methods, such as an encryption system for altering the bit arrangement in consonance with an encryption key.

In addition, a hash value and its signature can be provided for all data that are to be transmitted.

In these embodiments, the first encryption to the third encryption are performed during the electronic watermark information embedding process in order to prevent a third party from acquiring the information stored at the server, the user and the agency. However, DES (Data Encryption Standard) cryptography or a hash function may be employed to prevent wiretapping and the alteration of data across a communication path by a third party.

Furthermore, in the first to the third embodiments, the server (or the author) is in charge of the detection of illegal data distribution. However, so long as electronic watermark extraction means is provided, any user can detect an illegal data distribution and user information that has been illegally distributed, even though he or she does not know the secret key for the first encryption or the second encryption. When an incidence of illegal data distribution is detected, the user need only notify the server for the verification process to be begun. Therefore, the process of detecting illegal distributions is not limited to the server.

The server can embed in the image data not only the user information U but also other, needed information, such as copyright information and information concerning an image data distribution condition. In addition, to embed secret information, the server or the agency need only perform the embedding process following the first encryption, so that in addition to the signature information, information that is affected by the first encryption can be embedded in the image data. The user information U is not always embedded before the first encryption, and may be embedded after the first encryption (in this case, the detection of the user information U can be performed only by the server, the agency, or a person who knows the secret key used for the first encryption).

When a user is a second entity that shares a printer or a terminal, the user's signature information and the second encryption may include the signature information and the encryption system for the printer or terminal that is used in common.

The first encrypted information from the server (or the author) may be widely distributed across a network or by using a CD-ROM, even without its distribution being requested by the user based on the contract information.

The signature information S for the user is not necessarily generated by the public key encryption method, but may be information (e.g., a code number) that is defined by the user based on the contract information.

In the United States, to employ encryption for 40 bits or more, a key management office is required to manage an encryption key in order to prevent the unauthorized use of the cryptograph. The verification office 30, therefore, can also serve as a key management office. And when the verification office 30 provides advance management of the secondary encryption key, the verification office 30 can by itself perform the verification processes 1) to 3) by performing the monitoring for an illegal image. The first encryption key of the server may be managed either by the same verification office, or by another key management office. And the keys of the server and the user may be generated and distributed by the key management office.

In addition, instead of a single agency, a plurality of agencies may be provided hierarchically. In this case, a specific agency in charge of the hierarchical structure may perform the processing that the agency is in charge of, or the individual agencies may perform the protocol to specify an agency to be in charge.

Further, in these embodiments, upon receiving a request, the server (or the author) has been responsible for transmitting to the agency the first encrypted data E1(G) or E1(G+M) of the original data. However, the server may transmit the data E1(G) or E1(G+M) to the agency in advance.

The third encryption performed by the agency does not affect the image data $G_w$ that is finally obtained. However, the image data $G_w$ may be affected by the third encryption through the process whereby the user information U is embedded after the third encryption, or whereby the signature information S is embedded after the third encryption.

The objectives of the present invention can be achieved when a storage medium on which are stored, as software program code, the steps for implementing the functions of the host and the terminals in the first to the third embodiments is supplied to a system, or to the apparatus of the server, the agency or the user, and when the computer (or a CPU or an MPU) in the system or the apparatus can perform the steps by reading the program code stored on the storage medium.

In this case, the program code read from the storage medium is used to implement the functions of the above described embodiments. The storage medium on which the program code is stored constitutes the present invention.

A storage medium for supplying such program code can be, for example, a ROM, a floppy disk, a hard disk, an optical disk, a magneto optical disk, a CD-ROM, a CD-R, a magnetic tape, or a nonvolatile memory card.

In addition, the scope of the present invention includes not only a case wherein the functions of the first to the third embodiments can be implemented when the program code is read and executed by the computer, but also a case wherein, in accordance with an instruction included in the program code, the functions of the above embodiments are implemented when an OS that is running on the computer performs one part, or all of the actual processing.

Furthermore, the present invention includes a case wherein program code, read from a memory medium, is written into a memory that is mounted on a function expansion board that is inserted into a computer, or on a function expansion unit that is connected to a computer, and in consonance with the program code instructions, a CPU mounted on the function expansion board, or on the function expansion unit, performs one part, or all of the actual processing in order to implement the functions included in the first to the third embodiments.

As is described above, according to the first to the third embodiments, information concerning the third entity (user) can be embedded by the second entity (agency). In this case, the third entity can not perform an illegal act. Further, the second entity can not directly embed in the original data information (user information U or signature information S)

concerning the third entity, because this information is affected by a cryptograph (the first encryption and the cryptography used by the first encryption means) that only the first entity (the server or the author) knows, or a cryptograph (the second encryption and the cryptography used by the second encryption) that only the third entity knows.

Therefore, an illegal data distribution can be prevented in a hierarchial network, and a safe system can be provided. Furthermore, the anonymity of the user can be easily implemented.

(Fourth Embodiment)

A fourth embodiment of the present invention will now be described while referring to FIG. 17.

Figure 17:
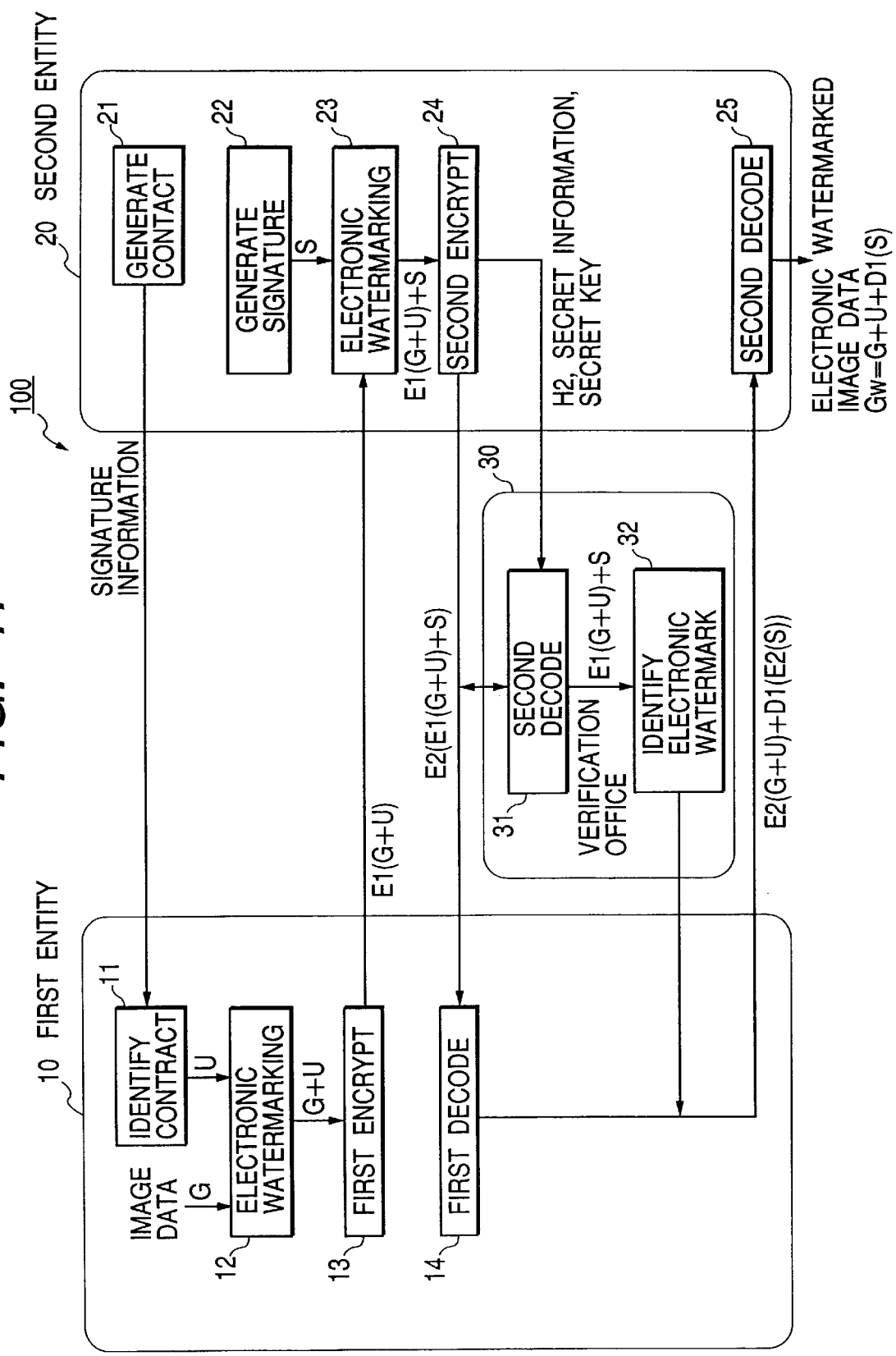
FIG. 17 is a diagram for explaining an electronic watermark system according to a fourth embodiment of the present invention.

An electronic watermark method according to the present invention is performed by, for example, a system 100 shown in FIG. 17, to which an electronic information distribution system according to the present invention has been applied.

Specifically, the system 100 is a network system, which is constituted by multiple entities (not shown) that include a terminal 10 at a first entity side (hereinafter referred to as a first terminal), a terminal 20 at a second entity side (hereinafter referred to as a second terminal), and a terminal 30 at a verification office side (hereinafter referred to as a verification terminal). The individual entities exchange digital data across the network.

The first terminal 10 comprises: a contract identification unit 11, for receiving data from the second terminal 20; an electronic watermark embedding unit 12, for receiving, for example, the output of the contract identification unit 11 and image data (digital data); a first encryption unit 13, for receiving the output of the electronic watermark embedding unit 12; and a first decryption unit 14, for receiving data from the second terminal 20. The data for the first encryption unit 13 and the first decryption unit 14 are transmitted to the second terminal 20.

The second terminal 20 comprises: a contract generator 21, for transmitting data to the contract identification unit 11 of the first terminal 10; a signature generator 22; an electronic watermark embedding unit 23, for receiving data from the signature generator 22 and the first encryption unit 13 of the first terminal 10; a second encryption unit 24, for receiving data from the electronic watermark embedding unit 23; and a second decryption unit 25, for receiving the data from the first decryption unit 14 of the first terminal 10. The data from the second decryption unit 25 are output as image data with an electronic watermark. The data from the second encryption unit 24 are transmitted to the first decryption unit 14 of the first terminal 10 and to the verification terminal 30.

The verification terminal 30 comprises: a second decryption unit 31, for receiving data from the second encryption unit 24 of the second terminal 20; and an electronic watermark identification unit 32, for receiving data from the second decryption unit 31. The data from the electronic watermark identification unit 32 are transmitted to the first terminal 10 and the second terminal 20, and the data from the second decryption unit 31 are transmitted to the first decryption unit 14 of the first terminal 10.

In the thus arranged electronic information distribution system according to this embodiment, the embedding processing is sorted into a first embedding process for transmitting digital data from the servers or the authors to the agency shown in FIG. 4 or 5, and a second embedding process for transmitting digital data from the agency to the users. In this embodiment, the following protocol is the same as the one employed for the first and the second embedding processes. As a whole, the first embedding process is performed first, and then the second embedding process is performed.

In the following explanation, for the first embedding process the first entity means a server or an author and the second entity means an agency. For the second embedding process the first entity means the agency and the second entity means a user. Therefore, at least the terminal used by the agency includes all the processors provided for the first terminal 10 and the second terminal 20 in FIG. 17.

A specific protocol for performing the first and the second embedding processes will now be described while referring to FIG. 17. According to this protocol, information concerning the first encryption, such as the method and a secret key, is available only to the first entity, and information concerning the second encryption is available only to the second entity. It should be noted, however, that for these encryption processes a property exists that regardless of which encryption process is performed first, the encrypted data can be decrypted. Hereinafter, the encryption process is represented by "Ei( ), " the decryption process is represented by "Di( )" and the embedding process concerning an electronic watermark is represented by "+."

The processing performed by the thus arranged system 100 will now be described. An explanation will be given first for the electronic watermark embedding processing.

[Embedding Process]

1) First, the second entity of the second terminal 20 requests from the first terminal 10 (first entity) desired image data bearing its signature. The requested data is signature information that is generated by the contract generator 21 and that is hereinafter called contract information.

2) In the first entity of the first terminal 10, the contract identification unit 11 employs the signature of the second entity to identify the received contract information, and then prepares user information U using the contract information. The electronic watermark embedding unit 12 embeds in the requested image data G the user information U that is prepared by the contract identification unit 11. The first encryption unit 13 performs the first encryption E1( ) for image data (G+U) in which the user information U has been embedded by the electronic watermark embedding unit 12, and transmits the obtained data to the second terminal 20. The second terminal 20, therefore, receives the first encrypted image data E1(G+U).

3) In the second terminal 20, the signature generator 22 generates signature information S using the secret key of the second entity. The electronic watermark embedding unit 23 embeds the signature information S, generated by the signature generator 22, in the first encrypted image data E1(G+U) that have been transmitted (distributed) by the first terminal 10. The second encryption unit 24 performs the second encryption for the first encrypted image data E1(G+U)+S, in which the signature information S is embedded by the electronic watermark embedding unit 23. The obtained image data are then transmitted to the verification terminal 30. The verification terminal 30, therefore, receives the second encrypted image data E2(E1(G+U)+S).

The second encryption unit 24 generates a hash value H2 for the second encrypted image data E2(E1(G+U)+S), which are to be transmitted to the verification terminal 30. The second encryption unit 24 then provides a signature for the hash value H2, and except for the signature information S and the second encryption secret key, transmits it to the verification terminal 30 accompanied by secret information concerning the electronic watermark. The secret information constitutes information that concerns the embedding position and the strength required to detect an electronic watermark, and that is encrypted using another encryption method which is shared with the verification terminal 30.

The hash value is a value obtained by calculating the hash function h( ), and the hash function is a compression function that seldom causes a collision. A collision in this case would mean that for the different values x1 and x2, h(x1)=h(x2). The compression function is a function for converting a bit string having a specific bit length into a bit string having a different bit length. Therefore, the hash function is a function h( ) by which a bit string having a specific bit length is converted into a bit string having a different bit length, and for which values x1 and x2 that satisfy h(x1)=h(x2) are not easily found. Since a value x that satisfies y=h(x) is not easily obtained from an arbitrary value y, accordingly, the hash function is a unidirectional function. Specific examples for the hash function are an MD (Message Digest) 5 or an SHA (Secure Hash Algorithm).

4) The verification terminal 30 identifies the signature accompanying the hash value H2 received from the second terminal 20, and confirms that the hash value H2 matches the hash value for the transmission data. After confirming the match, the second decryption unit 31 decrypts the second encrypted image data E2(E1(G+U)+S) received from the second terminal 20, and extracts the signature information S therefrom. The electronic watermark identification unit 32 examines the signature information S, and if the signature information S is correct, the verification information is prepared using the signature for the verification terminal 30. Finally, the verification terminal 30 transmits, to the first terminal 10, the second encrypted image data E2(E1(G+U)+S) and the hash value H2 and its accompanying signature, all of which are received from the second terminal 20, and the verification information for them and its signature.

5) In the first terminal 10, the first entity identifies the verification information and its accompanying signature received from the verification terminal 30, and also the second encrypted image data E2(E1(G+U)+S), and the hash value H2 and its accompanying signature. After this confirmation process has been completed, the first decryption unit 14 decrypts the first encrypted portion of the second encrypted image data E2(E1(G+U)+S) to obtain image data E2(G+U)+D1(E2(S)), which is in turn transmitted to the second terminal 20.

6) in the second terminal 20, the second decryption unit 25 decrypts the second encrypted portion of the image data E2(G+U+D1(E2(S)) received from the first terminal 10, and extracts image data $G_w$ in which is embedded an electronic watermark. Therefore, the image data $G_w$ that includes the electronic watermark is represented as $G_w$=G+U+D1(S). This means that the user information U and the signature information S for the second entity that are affected by the first decryption are embedded as electronic information in the original image data.

If in procedure 4) the verification terminal 30 does not verify the electronic watermark information because either the first or the second entity committed an illegal act, notifications to that effect are transmitted to the first and the second terminals 10 and 20. Thus, when the trading is halted at this time, even though the first entity can not acquire the price of the data, at the same time it can prevent the image data from being illegally obtained by the second entity; or even though the second entity can not obtain the image data, at the same time it does not have to pay the price of the data to the first entity. Therefore, since neither the first nor the second entity experiences a profit or a loss, the commission of an illegal act is senseless.

Specifically, when the electronic watermark embedding process is performed, in the first embedding process the agency that constitutes the second entity can obtain image data $G_w$, which includes an electronic watermark, that is prepared by embedding its own signature information S in the original data G output by the server or by the author that constitutes the first entity. It should noted that when the user information and the signature information for the first embedding process are U1 and S1, the image data $G_w$, which includes an electronic watermark, that the agency obtains is $G_w$=G+U1+D1(S1).

Following this, the second embedding process is performed in the same manner (the agency is the first entity), while the image data $G_w$, which includes an electronic watermark, that is obtained by the agency is employed as the original image. Then, the user who serves as the second entity can obtain the image data, which includes an electronic watermark, $G_w$=G+U1+D1(S1)+U2+D3(S2). The user information and signature information in the second embedding process are U2 and S2, and the encryption performed by the agency is represented as E3( ), while the decryption is represented as D3( ).

When an illegal copy (illegal image) is discovered, the party that committed the illegal act can be easily identified by performing the following simple verification process. This verification process is broken down into a first verification process, which corresponds to the first embedding process and which is performed by the server or the author and the agency, and a second verification process, which corresponds to the second embedding process and which is performed by the agency and the user. The first verification process is performed first, and then the second verification process is performed.

In the first verification process the user information and the signature information are U1 and S1, and the encryption and decryption performed by the agency are E3( ) and D3( ). In the second verification process the user information and signature information are U2 and S2. The image data are not affected by the modification and the deletion of electronic watermark information.

[Verification Process]

1) In the first verification process, the first entity of the first terminal 10 extracts user information U' from the illegal image data $G_w$'=G+U'+D1(S1) that was discovered. Further, the first entity performs the first encryption for the illegal image data $G_w$' and extracts signature information S1. When the user information U' is not extracted, it is ascertained that the first entity committed the illegal act.

2) When the correct signature information S' is extracted in the first verification process (S'=S), the second verification process is initiated. The same procedure is performed in the second verification process. When the correct signature information is found, it is ascertained that the second entity committed the illegal act. This is because only the second entity could prepare the correct signature information as the first entity could have no knowledge of the correct signature information.

3) When the correct signature information is not extracted (S'≠S), it is ascertained that the first entity committed the illegal act.

According to the electronic watermark method according to the fourth embodiment, the encryption of digital data and the embedding process for an electronic watermark are performed by the first and the second terminals 10 and 20, and the encryption and the identification of correct electronic watermark information are performed by the verification terminal 30. Therefore, even when the first entity or the second entity individually prepares an illegal copy, the illegal act an be easily detected, and in addition, the perpetrator of the illegal act can be easily identified.

Furthermore, according to this method, since the verification office examines the results of the first embedding process and of the second embedding process, collusion is not effective, so that the collusion of the server or the author with the agency and the user would not occur. Even if such a collusion should occur, an illegal act can be easily detected. The safety of this process is established based on the premise that the verification office is trustworthy.

(Fifth Embodiment)

Recently, the transfer of money across networks, a fund transfer procedure that is called electronic cash, has come to be employed. Since as with a regular cash payment, the name of the owner of an electronic cash transfer is not identified, anonymity is attained. If the attainment of anonymity were not possible, a seller of a product could obtain from an electronic cash transfer information concerning a purchaser and the use of its product, and the privacy of a user would not be protected. Therefore, the protection of the privacy of a user is as important as is the protection provided for a copyright granted to a creator who uses an electronic watermark.

In a fifth embodiment, therefore, the anonymity of a user is provided for a purchaser, and when an illegal act, such as the illegal distribution of images, is discovered, it is possible to identify an unauthorized distributor, which is the original purpose of an electronic watermark. This is achieved by employing, for example, a system 200 shown in FIG. 18.

The system 200 has the same structure as has the system 100 for the fourth embodiment, while an anonymous public key certificate, which is issued by a certification office 40, is provided for a second terminal 20.

Generally, in order to authenticate signature information, a certificate issued by an organization called a certification office is added to a public key that is used when examining the signature information.

A certification office is an organization that issues certificates for public keys assigned to users to provide public key authentication that is consonant with the requirements of the public key encryption system. That is, a certification office employs its own secret key to provide a signature for a user's public key, or for data concerning the user, and for this purpose prepares and issues a certificate. When a user receives from another user a signature that is accompanied by a certificate, the user examines the certificate using the public key of the certification office to verify the authentication provided by the user who transmitted the public key (or, at the least, the fact that authentication has been provided the user by the certification office). Both VeriSign and CyberTrust are well known organizations that operate such certification offices.

Figure 18:
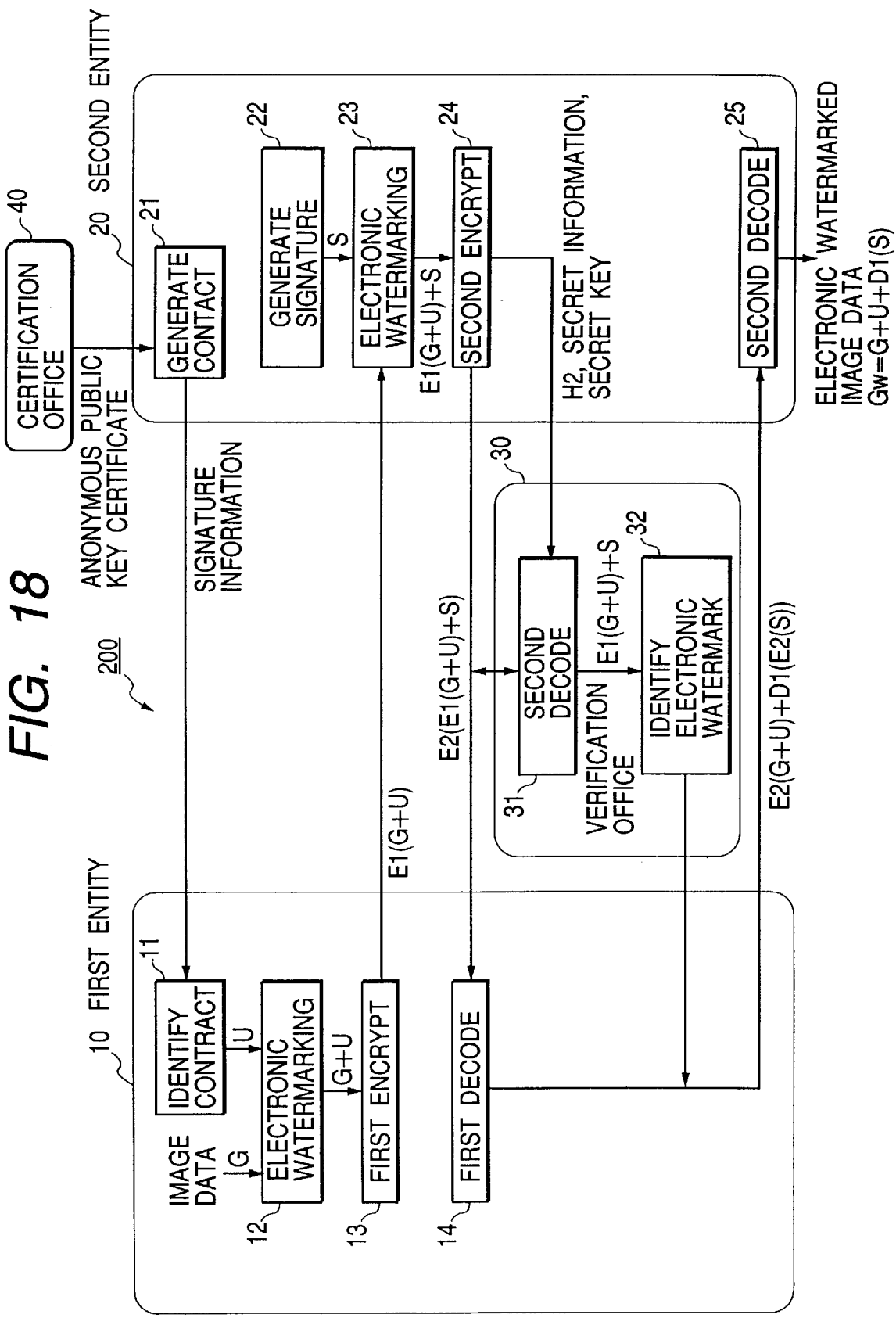
FIG. 18 is a diagram for explaining an electronic watermark system according to a fifth embodiment of the present invention.

When at procedure 2) of the second embedding process in. the fourth embodiment an agency examines a signature to verify the contract information submitted for a user, the agency can employ the public key with a signature issued by the certification office 40 in FIG. 18. However, since the name of the owner of the public key is generally written in the certificate, user anonymity is not provided at the time data are purchased.

On the other hand, if the certification office 40 keeps secret the correspondence of public keys and their owners, the name of an owner may not be written in a certificate issued for a public key. An anonymous certificate for a public key is hereinafter called an "anonymous public key certificate," and a public key for which such a certificate is provided is called an "anonymous public key with a certificate." In procedure 1) of the above described second embedding process, when a user transmits to a server not only contract information but also a signature for the contract information and an anonymous public key, accompanied by a certificate, to enable the examination of the signature information S, the user can remain anonymous when purchasing digital data.

Therefore, the anonymous public key, accompanied by the certificate, is transmitted to the agency as information to be used for user verification. And when an illegal transaction is discovered and the user must be identified, the anonymous public key, accompanied by the certificate, is transmitted to the certification office 40 with a request for the user name which corresponds to that of the owner of the public key. Therefore, when procedures 1) and 2) in the second embedding process and procedure 1) in the second verification process in the second embodiment are performed as follows, the anonymity of a user when purchasing digital data can be maintained, but when an illegal transaction is discovered, the user responsible for the perpetration of the transaction can be identified.

The embedding process and the verification process performed by the system 200 in FIG. 18 will be specifically described.

[Embedding Process]

1) First, in the second terminal 20, a contract generator 21 provides, for contract information for requesting desired image data, a signature that corresponds to an anonymous public key accompanied by a certificate issued by the certification office 40. Together with the anonymous public key accompanying the certificate, the second terminal 20 transmits the contract information to the first terminal 10.

2) In the first terminal 10, a contract identification unit 11 examines the public key of the second entity by using the public key of the certification office 40. And the contract identification unit 11 identifies the signature for the contract information using the anonymous public key of the second entity, and after the confirmation process is completed, prepares user information U using, at the least, either the contract information or the anonymous public key. An electronic watermark embedding unit 12 embeds, in image data G, the user information U that is prepared by the contract identification unit 11. A first encryption unit 13 performs first encryption E1( ) for the image data G, and transmits the obtained data to the second terminal 20. Thus, the second terminal receives the first encrypted image data E1(G+U).

Since the procedures 3) to 6) are the same as those in the fourth embodiment, no explanation for them will be given here.

[Verification Process]

1) In the second verification process, the first terminal 10 extracts user information from the illegal image data $G_{ww}'$ that is discovered. The first terminal 10 further performs the first encryption for the illegal image data $G_{ww}'$ and extracts signature information therefrom. The first terminal 10 then submits, to the certification office 40, the extracted user information and the anonymous public key that was obtained from the contract information, and requests the name of the second entity that corresponds to the anonymous public key. When the user information is not extracted, it is ascertained that the first entity committed an illegal act.

The procedures 2) and 3) are the same as those in the fourth embodiment.

As is described above, according to the fifth embodiment, when purchasing digital data a user can also maintain his or her anonymity relative to the verification office.

(Sixth Embodiment)

Figure 19:
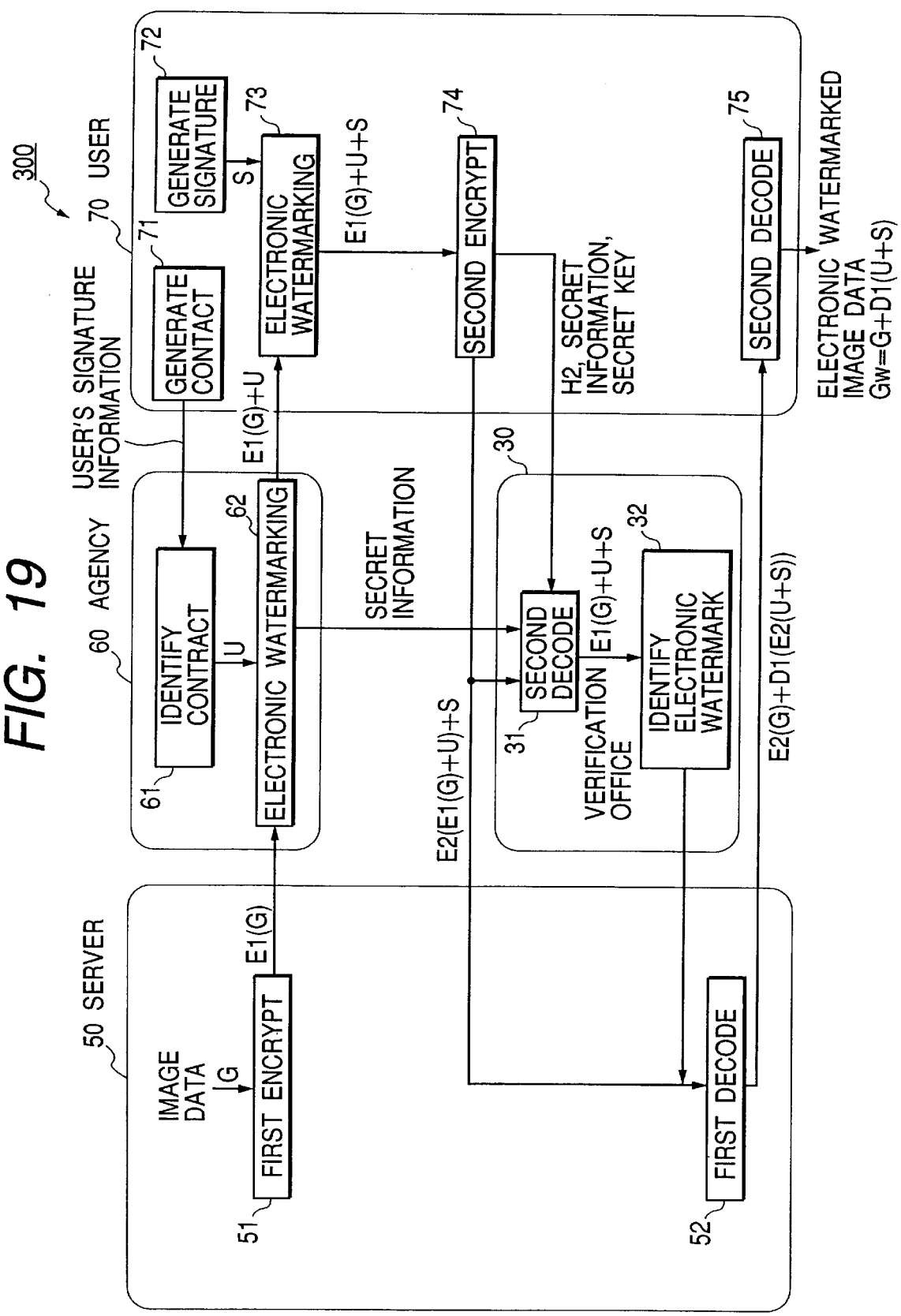
FIG. 19 is a diagram for explaining an electronic watermark system according to a sixth embodiment of the present invention.

In a sixth embodiment, an explanation will be given for the overall processing where the server or the author in FIG. 4 or 5 distributes digital data to the user via the agency. The sixth embodiment of the present invention will be described while referring to FIG. 19. Specifically, an electronic watermark method according to the sixth embodiment is performed by a system 300 shown in FIG. 19, to which the electronic information distribution system of the present invention is applied.

In the sixth embodiment, the system 300 is a network system, which is constituted by multiple entities (not shown) that include a terminal 50 on the server side (hereinafter referred to as a server terminal), a terminal 60 on the agency side (hereinafter referred to as an agency terminal), a terminal 70 on the user side (hereinafter referred to as a user terminal), and a terminal 30 on the verification office side (hereinafter referred to as a verification terminal). The individual entities exchange digital data across the network.

The server terminal 50 comprises: a first encryption unit 51, for receiving, for example, image data (digital data); and a first decryption unit 52, for receiving data from the user terminal 70 and the verification terminal 30. The data from the first encryption unit 51 are transmitted to the agency terminal 60, and the data from the first decryption unit 52 are transmitted to the user terminal 70.

The agency terminal 60 comprises: a contract identification unit 61, for receiving data from the user terminal 70; and an electronic watermark embedding unit 62, for receiving the output of the first encryption unit 51 of the user terminal 50. The data output by the electronic watermark unit 61 are transmitted to the user terminal 70 and the verification terminal 30.

The user terminal 70 comprises: a contract generator 71, for transmitting data to the contract identification unit 61 of the agency terminal 60; a signature generator 72; an electronic watermark embedding unit 73, for receiving data from the signature generator 72 and the electronic watermark embedding unit 62 of the agency terminal 60; a second encryption unit 74, for receiving data from the electronic watermark embedding unit 73; and a second decryption unit 75, for receiving data from the first decryption unit 52 of the server terminal 50. The data from the second decryption unit 75 are transmitted as image data that include an electronic watermark. The data from the second encryption unit 74 are transmitted to the first decryption unit 52 of the server terminal 50 and the verification terminal 30.

The verification terminal 30 comprises: a second decryption unit 31, for receiving data from the electronic watermark embedding unit 62 of the agency terminal 60 and the second encryption unit 74 of the user terminal 70; and an electronic watermark identification unit 32, for receiving data from the second decryption unit 31. The data of the electronic watermark unit 32 are supplied to the first decryption unit 52 of the server terminal 50.

The processing performed by the thus arranged system 300 will now be explained. For the protocol shown in FIG. 19, information concerning the first encryption, such as the method and its secret key, is available only to the server or the author, and information concerning the second encryption is available only to the user. It should be noted, however, that for these encryption processes a property exists whereby regardless of which encryption process is performed first, the encrypted data can be decrypted. While the hierarchical system as shown in FIG. 5 is employed in the following explanation, this explanation can be applied for the system shown in FIG. 4 by replacing the author with the server.

[Embedding Process]

1) First, the user terminal 70 requests that the agency terminal 60 provide it desired image data bearing its signature. The requested data is information (user's signature information) that is generated by the contract generator 71 and that is hereinafter called contract information. In the agency terminal 60, the contract identification unit 61 employs the signature of the user to identify the received contract information, and then forwards a request to the server terminal (author) 50 for image data. Upon receiving this request, the first encryption unit 51 of the server terminal 50 performs the first encryption E1( ) of image data G and transmits the obtained data to the agency terminal 60.

2) In the agency terminal 60, the contract identification unit 61 prepares user information U using the contract information received from the user terminal 70. The electronic watermark embedding unit 62 embeds the user information U, generated by the contract identification unit 61, in the first encrypted image data E1(G) that were transmitted by the server terminal 50. The user terminal 70, therefore, receives the first encrypted image data E1(G)+U with the included user information U.

The electronic watermark embedding unit 62 of the agency terminal 60 transmits, to the verification terminal 30, secret information concerning an electronic watermark. The secret information is information that concerns the embedding position and strength for the detection of an electronic watermark, and that is encrypted by another encryption method that is shared with the verification terminal 30.

3) In the user terminal 70, the signature generator 22 generates signature information S using the secret key of the user. The electronic watermark embedding unit 73 embeds in the first encrypted image data E1(G)+U that have been transmitted (distributed) by the agency terminal 60 the signature information S generated by the signature generator 72. The second encryption unit 74 performs a second encryption for the first encrypted image data E1(G)+U+S in which the signature information S has been embedded by the electronic watermark embedding unit 73, and the obtained image data are then transmitted to the verification terminal 30. Therefore, the verification terminal 30 receives the second encrypted image data E2(E1(G)+U+S).

At this time, the second encryption unit 74 of the user terminal 70 generates a hash value H2 for the second encrypted image data E2(E1(G)+U+S) that are to be transmitted to the verification terminal 30. The second encryption unit 74 then provides a signature for the hash value H2, and together with secret information concerning the electronic watermark and the second encryption secret key, transmits it to the verification terminal 30.

4) The verification terminal 30 identifies the signature accompanying the hash value H2 received from the user terminal 70, and confirms that the hash value H2 matches the hash value for the transmission data. After the confirmation process is completed, the second decryption unit 31 decrypts the second encrypted image data E2(E1(G)+U+S) received from the user terminal 70, and extracts, therefrom, the user information U and the signature information S. The electronic watermark identification unit 32 then examines the user information U and the signature information S, and if the information U and S is correct, the verification information is prepared using the signature of the verification terminal 30. Finally, the verification terminal 30 transmits, to the server terminal 50, the second encrypted image data E2(E1(G)+U+S), and the hash value H2 and its accompanying signature, all of which are received from the user terminal 70, and the verification information for them and its accompanying signature.

5) In the server terminal 50, the author identifies the verification information and its accompanying signature received from the verification terminal 30, and also the second encrypted image data E2(E1(G)+U+S), and the hash value H2 and its accompanying signature. After this confirmation process has been completed, the first decryption unit 52 decrypts the first encrypted portion of the second encrypted image data E2(E1(G)+U+S) to obtain image data E2(G)+D1(E2(U+S)), which in turn is transmitted to the user terminal 70.

6) In the user terminal 70, the second decryption unit 75 decrypts the second encrypted portion of the image data E2(G)+D1(E2(U+S)) received from the server terminal 50, and extracts image data $G_w$ in which is embedded an electronic watermark. Therefore, the image data $G_w$ and the included electronic watermark are represented by $G_w$=G+ D1(U+S). This means that the user information U and the user's signature information S that are affected by the first decryption are embedded as electronic information in the original image data.

If in procedure 4) the verification terminal 30 does not verify that the electronic watermark information is correct, either because the author or the user has committed an illegal act, notifications to that effect are transmitted to the server terminal 50, the agency terminal 60 and the user terminal 70. Since even when trading is halted at this time, none of them experiences a profit or a loss, the commission of an illegal act is senseless. When an illegal copy (illegal image) $G_w$' is discovered, the party who committed the illegal act can be easily identified by performing the following simple verification processing. It should be noted that the image data are not affected by the modification and the deletion of electronic watermark information.

[Verification Process]

1) First, in the server terminal 50, the author performs the first encryption of the illegal image data $G_w$' and extracts the user information U. When the user information U is not extracted, it is ascertained that the author committed an illegal act.

2) When the correct user information U is extracted, signature information is extracted from data obtained by the first encryption of the illegal image data $G_w$'.

3) When the correct signature information is extracted, it is ascertained that the user committed an illegal act. This is because the correct signature information can be prepared only by the user and the author, as the agency can have no knowledge of the signature information.

4) If the correct signature information is not extracted, it is ascertained that the author committed an illegal act.

According to the electronic watermark method according to the sixth embodiment, the encryption of digital data and the embedding process for an electronic watermark are performed by the server terminal 50, the agency terminal 60 and the user terminal 70, and the encryption and the identification of correct electronic watermark information are performed by the verification terminal 30. Therefore, when the author, the agency or the user has individually prepared an illegal copy, the illegal act can be easily detected, and the illegal party can be easily identified. Furthermore, according to this method, since the verification office examines the results of the first embedding process and of the second embedding process, collusion is not effective, so that the collusion of the server or the author with the agency and the user could not occur. Even if such a collusive act should occur, the illegal act could be easily detected. The safety of this process is based on the premise that the verification office is trustworthy.

(Seventh Embodiment)

Figure 20:
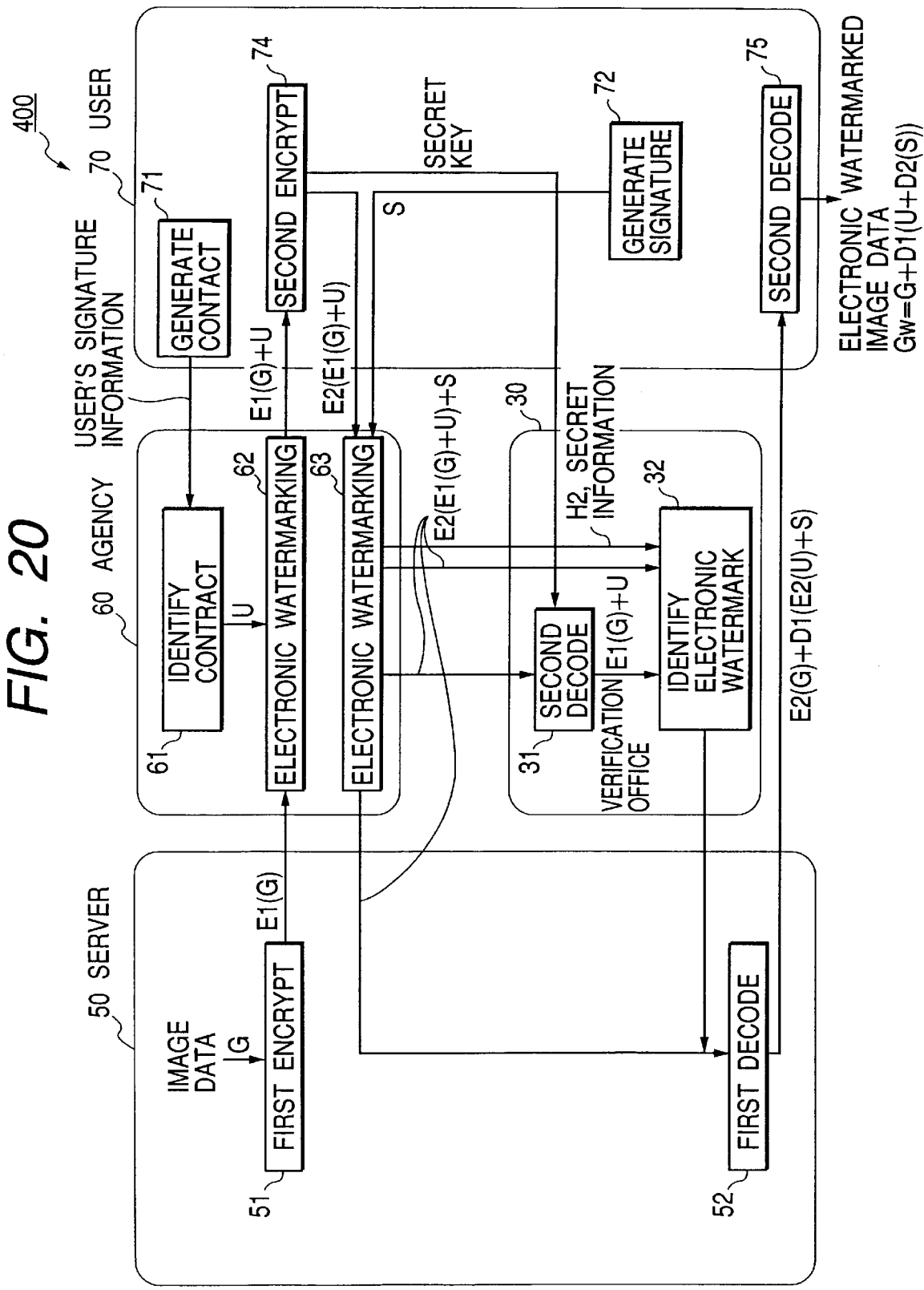
FIG. 20 is a diagram for explaining an electronic watermark system according to a seventh embodiment of the present invention.

In a seventh embodiment as well as in the sixth embodiment, an explanation will be given for the overall processing where the server or the author in FIG. 4 or 5 distributes digital data to the user via the agency. The seventh embodiment of the present invention will be described while referring to FIG. 20. Specifically, an electronic watermark method according to the seventh embodiment is performed by a system 400 shown in FIG. 20, to which the electronic information distribution system of the present invention is applied.

In the seventh embodiment, the system 400 is a network system, which is constituted by multiple entities (not shown) that include a server terminal 50, an agency terminal 60, a user terminal 70 and a verification terminal 30. The individual entities exchange digital data across the network.

The server terminal 50 comprises: a first encryption unit 51, for receiving, for example, image data (digital data); and a first decryption unit 52, for receiving data from the user terminal 70 and the verification terminal 30. The data from the first encryption unit 51 are transmitted to the agency terminal 60, and the data from the first decryption unit 52 are transmitted to the user terminal 70.

The agency terminal 60 comprises: a contract identification unit 61, for receiving data from the user terminal 70; an electronic watermark embedding unit 62, for receiving the output of the contract identification unit 61 and the first encryption unit 51 of the user terminal 50; and an electronic watermark embedding unit 63, for receiving data from the user terminal 70. The data output by the electronic watermark unit 61 are transmitted to the user terminal 70 and the verification terminal 30. Also, the output of the electronic watermark embedding unit 63 are transmitted to the server terminal 50 and the verification terminal 30.

The user terminal 70 comprises: a contract generator 71, for transmitting data to the contract identification unit 61 of the agency terminal 60; a signature generator 72; a second encryption unit 74, for receiving data from the electronic watermark embedding unit 62 of the agency terminal 60; and a second decryption unit 75, for receiving data from the first decryption unit 52 of the server terminal 50. The data from the second decryption unit 75 are transmitted as image data that include an electronic watermark. The data from the second encryption unit 74 are transmitted to the electronic watermark embedding unit 63 of the agency terminal 60 and the verification terminal 30.

The verification terminal 30 comprises: a second decryption unit 31, for receiving data from the electronic watermark embedding unit 63 of the agency terminal 60 and the second encryption unit 74 of the user terminal 70; and an electronic watermark identification unit 32, for receiving data from the second decryption unit 31 and from the electronic watermark embedding unit 63 of the agency terminal 60. The data of the electronic watermark unit 32 are supplied to the first decryption unit 52 of the server terminal 50.

The processing performed by the thus arranged system 400 will now be explained. For the protocol shown in FIG. 20, information concerning the first encryption, such as the method and its secret key, is available only to the server or the author, and information concerning the second encryption is available only to the user. It should be noted, however, that for these encryption processes a property exists whereby regardless of which encryption process is performed first, the encrypted data can be decrypted. While the hierarchical system as shown in FIG. 5 is employed in the following explanation, this explanation can be applied for the system shown in FIG. 4 by replacing the author with the server.

[Embedding Process]

1) First, the user terminal 70 requests that the agency terminal 60 provide it desired image data bearing its signature. The requested data is information (user's signature information) that is generated by the contract generator 71 and that is hereinafter called contract information. In the agency terminal 60, the contract identification unit 61 employs the signature of the user to identify the received contract information, and then forwards a request to the server terminal (author) 50 for image data. Upon receiving this request, the first encryption unit 51 of the server terminal 50 performs the first encryption E1( ) of image data G and transmits the obtained data E1(G) to the agency terminal 60.

2) In the agency terminal 60, the contract identification unit 61 prepares user information U using the contract information received from the user terminal 70. The electronic watermark embedding unit 62 embeds the user information U, generated by the contract identification unit 61, in the first encrypted image data E1(G) that were transmitted by the server terminal 50. The user terminal 70, therefore, receives the first encrypted image data E1(G)+U with the included user information U.

3) In the user terminal 70, the second encryption unit 74 performs the second encryption of the first encrypted image data E1(G)+U received from the agency terminal 60, and transmits to the agency terminal 60 the obtained image data E2(E1(G)+U). The signature generator 72 generates signature information S that only the user can prepare, and, together with the second encrypted image data E2(E1(G)+U), transmits it to the agency terminal 60. Furthermore, the second encryption unit 74 transmits the second encryption secret key to the verification terminal 30.

4) In the agency terminal 60 the electronic watermark embedding unit 63 embeds signature information S in the second encrypted image data E2(E(G)+U), the information in both cases having been received from the user terminal 70, and transmits the obtained image data to the verification terminal 30. Thus, the verification terminal 30 receives the second encrypted image data E2(E1(G)+U)+S and its accompanying signature information.

At this time, the agency terminal 60 generates a hash value H2 for the second encrypted image data E2(E1(G)+U)+S that are to be transmitted to the verification terminal 30. The agency terminal 60 then provides a signature for the hash value H2, and, together with the secret information concerning the electronic watermark and the second encryption secret key, transmits it to the verification terminal 30. The secret information is information that concerns the embedding position and the strength required to detect an electronic watermark, and that is encrypted by another encryption method that is shared with the verification terminal 30.

5) The verification terminal 30 identifies the signature accompanying the hash value H2 received from the agency terminal 60, and confirms that the hash value H2 matches the hash value for the transmission data. After the confirmation process is completed, the electronic watermark identification unit 32 extracts signature information S from the second encrypted image data E2(E1(G)+U)+S, which is received from the agency terminal 60. The second decryption unit 31 decrypts the second encrypted image data E2(E1(G)+U+S) received from the user terminal 70, and extracts the user information U therefrom.

The electronic watermark identification unit 32 examines the user information U and the signature information S. If the information U and S is correct, the verification information is prepared using the signature of the verification terminal 30. Finally, the verification terminal 30 transmits, to the server terminal 50, the second encrypted image data E2(E1(G)+U)+S, and the hash value H2 and its accompanying signature, all of which have been received from the agency terminal 60, and the verification information for them and its signature.

6) In the server terminal 50, the author identifies the verification information, and its accompanying signature, received from the verification terminal 30, and also the second encrypted image data E2(E1(G)+U)+S, and the hash value H2 and its accompanying signature. After this confirmation process has been completed, the first decryption unit 52 decrypts the first encrypted portion of the second encrypted image data E2(E1(G)+U)+S to obtain image data E2(G)+D1(E2(U)+S), which in turn is transmitted to the user terminal 70.

7) In the user terminal 70, the second decryption unit 75 decrypts the second encrypted portion of the image data E2(G)+D1(E2(U)+S) received from the server terminal 50, and extracts image data $G_w$ in which is embedded an electronic watermark. Therefore, the image data $G_w$ that includes the electronic watermark is represented by $G_w$=G+D1(U+D2(S)). This means that the user information U that is affected by the first decryption and the user's signature information S that is affected by both the first and the second decryption are embedded as electronic information in the original image data.

If in procedure 5) the verification terminal 30 does not verify the electronic watermark information, either because the author or the user committed an illegal act, notifications to that effect are transmitted to the server terminal 50, the agency terminal 60 and the user terminal 70. Since even when trading is halted at this time, none of them experiences either a profit or a loss, the commission of an illegal act is senseless. When an illegal copy (illegal image) $G_w'$ is discovered, the party who committed the illegal act can be easily identified by performing the following simple verification process. It should be noted that the image data are not affected by the modification and the deletion of electronic watermark information.

[Verification Process]

1) First, in the server terminal 50, the author performs the first encryption for the illegal image data $G_w'$ and extracts the user information U. When the user information U is not extracted, it is ascertained that the author committed an illegal act.

2) When the correct user information U' is extracted, the server terminal 50 submits, to the verification terminal 30, the first encrypted image data $G_w'$ and the user information U', and requests that they be examined. The verification terminal 30 performs the second encryption for the first encrypted image data $G_w'$ (its encryption function is not shown), and extracts the signature information.

3) When the correct signature information is extracted, it is ascertained that the user committed an illegal act.

4) When the correct signature information is not extracted, it is ascertained that the author committed an illegal act.

According to the electronic watermark method of the seventh embodiment, the encryption of digital data and the embedding process for an electronic watermark are performed by the server terminal 50, the agency terminal 60 and the user terminal 70, and the encryption and the identification of correct electronic watermark information are performed by the verification terminal 30. Therefore, even when the author, the agency or the user individually prepares an illegal copy, the illegal act an be easily detected. In addition, the illegal party can be easily identified. Furthermore, according to this method, since the verification office examines the results of the first embedding process and of the second embedding process, collusion is not effective, so that the collusion of the server or the author with the agency and the user would not occur. Even if such a collusion should occur, an illegal act could be easily detected. The safety of this process is based on the premise that the verification office is trustworthy.

(Eighth Embodiment)

According to an eighth embodiment, in the arrangement for the sixth embodiment shown in FIG. 18, when a user purchases digital data the anonymity of the user can be maintained, as in the fifth embodiment, and when an illegal act, such as the distribution of an illegal image, is discovered the party who committed the illegal act can be identified. This is implemented by using, for example, a system 500 shown in FIG. 21. The system 500 has the same arrangement as that of the system 300 in the sixth embodiment, except that a user terminal 70 receives an anonymous public key certificate from a certification office 40.

In this embodiment, as well as in the fifth embodiment, if the certification office 40 keeps secret the correspondence of public keys and the names of their owners, an owner's name is not entered in a certificate issued for a public key. In procedure 1) of the embedding process of the sixth embodiment, when a user transmits to a server not only contract information, but also a signature for the contract information and an anonymous public key accompanied by a certificate to be used to examine the signature information S, the user can remain anonymous when purchasing digital data.

Therefore, the anonymous public key, accompanied by the certificate, is transmitted to the agency as identification information for the user. Then, when an illegal act is discovered, the anonymous public key, accompanied by the certificate, is transmitted to the certification office 40 and the name of the user that corresponds to the public key is requested in order that the user can be identified. Therefore, when procedure 1) in the embedding process and procedure 1) in the verification process in the sixth embodiment are changed as follows, the anonymity of a user when purchasing digital data can be maintained, while if an illegal act is discovered, the party who committed the illegal act can be identified.

It should be noted that a user can remain anonymous when purchasing digital data, and that when an illegal act is discovered, the party who committed the illegal act can be identified by changing procedure 1) in the embedding process and procedure 1) in the verification process in the seventh embodiment as follows.

Figure 21:
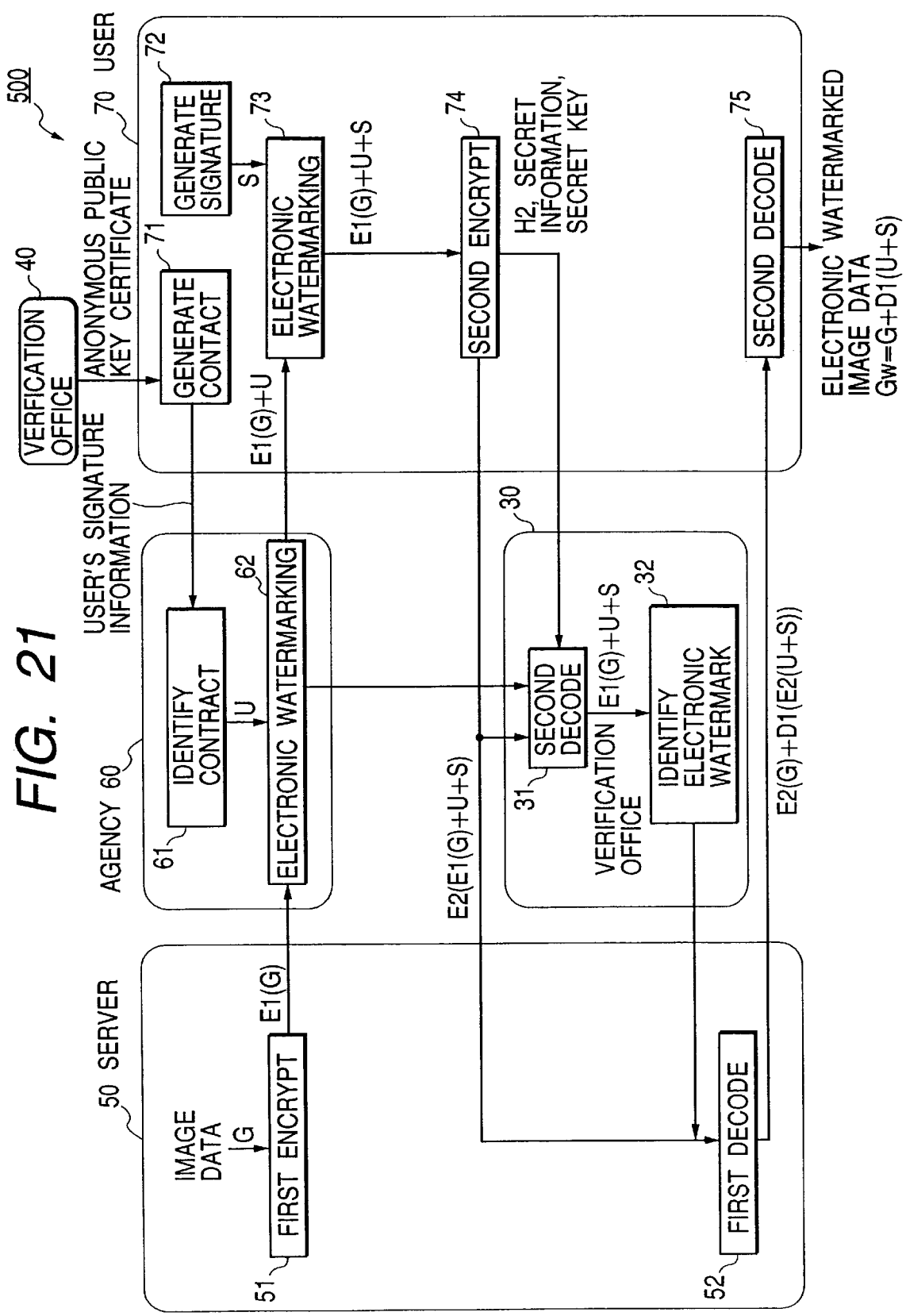
FIG. 21 is a diagram for explaining an electronic watermark system according to an eighth embodiment of the present invention.

The embedding process and the verification process performed by the system 500 in FIG. 21 will now be specifically explained.

[Embedding Process]

1) First, in the user terminal 70, a contract generator 71 provides, for contract information issued to request desired data, a signature that corresponds to an anonymous public key accompanied by a certificate issued by the certification office 40. The contract generator 71 then transmits, to an agency terminal 60, the anonymous public key and the contract information accompanying the signature. In the agency terminal 60, a contract identification unit 61 identifies the received contract information by using the anonymous public key, and then requests the image data from the author. Upon receiving the request, a first encryption unit 51 in a server terminal 50 performs the first encryption E1( ) of image data G, and transmits the obtained image data E1(G) to the agency terminal 60.

Since the procedures 2) to 6) are the same as those in the sixth embodiment, no explanation for them will be given.

[Verification Process]

1) In the server terminal 50, the first encryption unit 51 performs the first encryption of the illegal image data $G_w'$ that is discovered, and extracts user information therefrom. The server terminal 50 submits to the certification office 40 the extracted user information and the anonymous public key identified using the contract information, and requests the user's name that corresponds to the anonymous public key. When the user information is not extracted, it is ascertained that the author committed the illegal act.

Procedures 2) to 4) are the same as those in the sixth embodiment.

As is described above, according to the eighth embodiment, when purchasing digital data a user can remain anonymous relative to the verification office.

Various data, to include image data in the fourth to the eighth embodiments and hash values obtained during the embedding process for electronic watermark information, can be stored using the above described image format. According to the general image format, for example, image data that are transmitted at individual steps can be stored in an image data portion, and a corresponding hash value and its signature can be stored in an image header portion. Furthermore, a hash value and its accompanying signature, which the user must retain, and the second encryption key can be stored in the image header portion, while image data having an electronic watermark can be stored in the image data portion.

In the fourth to the eighth embodiments, electronic watermark information can be embedded using various methods.

Further, the first encryption and the second encryption can also be implemented by employing various methods, such as an encryption system for altering the bit arrangement in consonance with an encryption key. In addition, a hash value and its signature can be provided for all data that are to be transmitted. In these embodiments, the first encryption and the second encryption are performed during the electronic watermark information embedding process in order to prevent the server, the user and the agency from acquiring each other the information stored thereat. However, DES (Data Encryption Standard) cryptography or a hash function may be employed to prevent wiretapping and the alteration of data across a communication path by a third party.

Furthermore, in the fourth to the eighth embodiments, the first entity (the server or the author) is in charge of the detection of illegal data distribution. However, so long as electronic watermark extraction means is provided, any user can detect an illegal data distribution and user information that has been illegally distributed, even though he or she does not know the secret key for the first encryption or the second encryption. When an incidence of illegal data distribution is detected, the user need only notify the first entity for the verification process to be begun. Therefore, the process of detecting illegal distributions is not limited to the first entity.

The first entity or the agency can embed in the image data not only the user information U but also other, needed information, such as copyright information and information concerning an image data distribution condition. In addition, to embed secret information, the first entity need only perform the embedding process following the first encryption, so that in addition to the signature information, information that is affected by the first encryption can be embedded in the image data. The user information U is not always embedded before the first encryption, and may be embedded after the first encryption (in this case, the detection of the user information U can be performed only by the first entity or a person who knows the secret key used for the first encryption).

When the second entity is a user who shares a printer or a terminal, the signature information for the second entity and the second encryption may include the signature information and the encryption system for the printer or terminal that is used in common. The first encrypted information from the first entity may be widely distributed across a network or by using a CD-ROM, even without its distribution being requested by the second entity based on the contract information. The signature information S for the second entity is not necessarily generated by the public key encryption method, but may be information (e.g., a code number) that is defined by the user based on the contract information.

In the United States, to employ encryption for 40 bits or more, a key management office is required to manage an encryption key in order to prevent the unauthorized use of the cryptograph. The verification office 30, therefore, can also serve as a key management office. And when the verification office provides advance management of the secondary encryption key, the verification office can by itself perform the verification processes 1) to 3) by performing the monitoring for an illegal image. The first encryption key of the first entity may be managed either by the same verification office, or by another key management office. And the keys of the first entity and the second entity may be generated and distributed by the key management office.

In addition, instead of a single agency, a plurality of agencies may be provided hierarchically. In this case, a specific agency in charge of the hierarchical structure may perform the processing that the agency is in charge of, or the individual agencies may perform the protocol to specify an agency to be in charge. When only one agency is provided as is shown in FIG. 5, embedding of user information U1 concerning the agency may be omitted.

Further, upon receiving a request, the author has been responsible for transmitting to the agency the first encrypted data E1(G) of the original data G. However, the author may transmit the data E1(G) to the agency in advance.

The agency described in the sixth and the following embodiments does not perform encryption E3( ) and decryption D3( ). However, the data may be encrypted using the encryption process E3( ) after the data have first been received from the author, or the data may be decrypted using the decryption process D3( ) before the data are transmitted to the author.

As is described above, according to the above described electronic watermark embedding method and system, the data encryption process and the electronic watermark embedding process are distributed and processed by a plurality of means or entities. An illegality occurring at least one of the encryption process and the electronic watermark embedding process, which are performed by the means or the entities, is verified by a means or an entity other than the above means and entities. Therefore, when data are illegally copied and distributed across a hierarchical network, the illegal act and the party who committed the illegal act can be precisely identified. As a result, the commission of illegal acts can be prevented, and a safe system that protects against the illegal distribution of data can be provided. In addition, this system can easily be applied for a key management office that maintains the anonymity of a user and prevents the illegal encryption of data.

The ninth to twelfth embodiments of the present invention will now be described while referring to FIGS. 22 to 26.

Figure 22:
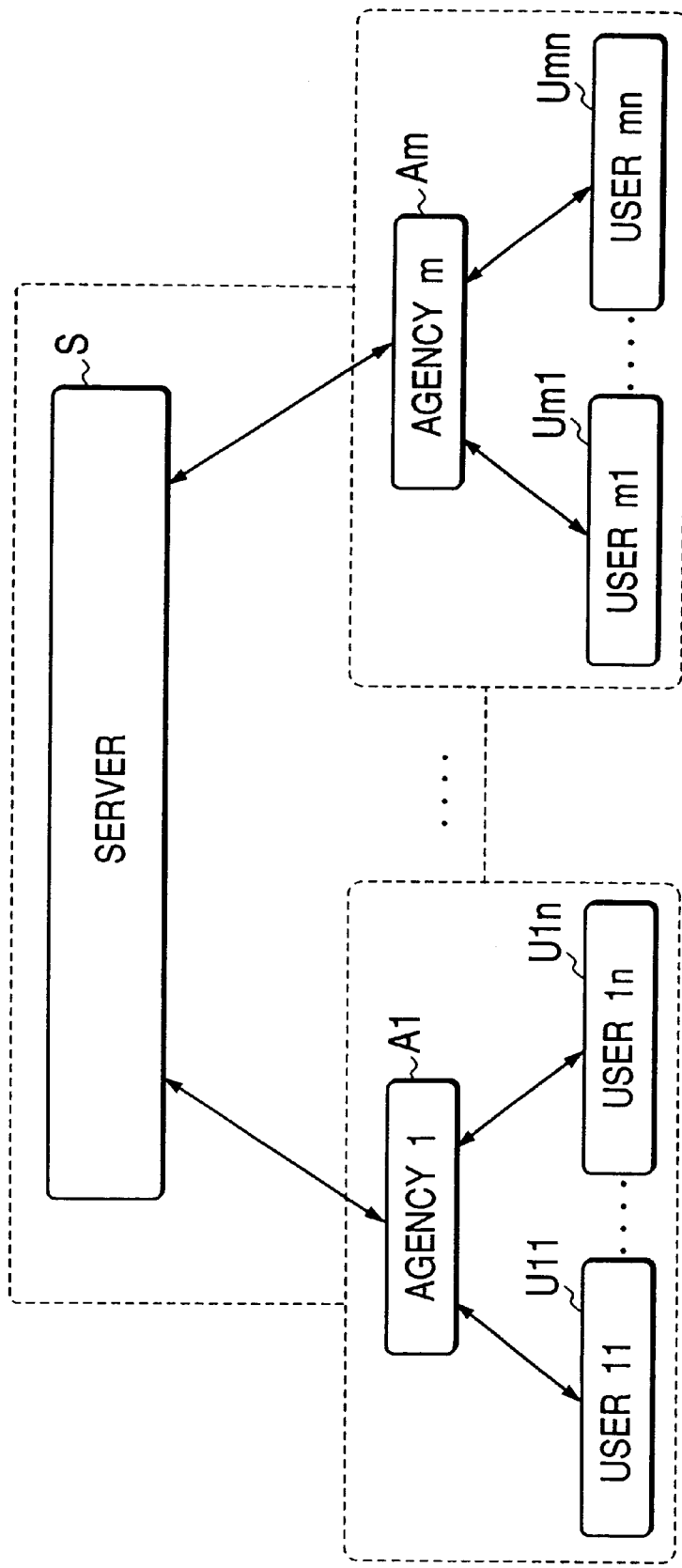
FIG. 22 is a diagram illustrating a system configuration according to embodiment nine through embodiment twelve.

FIG. 22 is a schematic diagram illustrating in its entirety the arrangement of an electronic information distribution system according to a ninth embodiment of the present invention. As its contents, server S holds electronic information, and Agencies A1 to Am make contract with the server S for the distribution of electronic information. The agencies A1 to Am, by issuing requests, obtain from the server S, as electronic information, the data they desire, and store the received data.

Users U11 to U1n make contract with the agency A1 to obtain electronic information servicing. Users submit requests to the agency A1 for the distribution of its stored contents, and upon receiving them, stores them as electronic information. The relationship between the agencies A2 to Am and the users U21 to 2n and Um1 to Umn is the same as that which exists between the agency A1 and the users U11 to U1n.

In this embodiment, the following electronic watermark superimposition method is applied to the system in FIG. 22. The specific embodiments for the electronic watermark superimposition method will now be described while referring to FIGS. 23 to 26.

The processing is broken down into a process 1, wherein the server S in FIG. 22 transmits image data as electronic information to the agencies A1 to Am, and process 2, wherein the agencies Al to Am transmit image data to the users U11 to Umn. In the following embodiments, which employ the electronic watermark superimposition method, the same or substantially the same protocol is employed for processes 1 and 2. Process 1 is performed first, and then process 2 is performed. A specific protocol for processes 1 and 2 will be explained.

(Ninth Embodiment)

The ninth embodiment will now be described while referring to FIG. 23.

The network system includes a first entity, terminal 10, a second entity, terminal 20, and a verification office terminal 30. The first entity, terminal 10 comprises: a contract identification unit 11, for receiving data from the terminal 20; a first electronic watermark embedding unit 12, for receiving, for example, image data (digital data); a first encryption unit 13, for receiving the output of the first electronic watermark embedding unit 12; a first decryption unit 14, for receiving data from the terminal 20; a second electronic watermark embedding unit 15, for receiving data from the terminal 20 and from the first decryption unit 14; and a hash generator 16, for receiving the output of the second electronic watermark embedding unit 15. The outputs of the first encryption unit 13 and the hash generator 16 are transmitted to the terminal 20. And the output of the second electronic watermark embedding unit 15 is transmitted both to the hash generator 16 and to the terminal 20.

The second entity terminal 20 comprises: a contract generator 21, for transmitting data to the contract identification unit 11 of the terminal 10; a signature generator 22; a second encryption unit 24, for receiving data from the first encryption unit 13 of the terminal 10; a second decryption unit 25, for receiving data from the second electronic watermark embedding unit 15 and from the first encryption unit 14 in the terminal 10; and a hash identification unit 27, for receiving data from the second electronic watermark embedding unit 15 and the hash generator 16 of the terminal 10. The data produced by the second decryption unit 25 is output as data that is accompanied by an electronic watermark. The data produced by the second encryption unit 25 are transmitted to the first decryption unit 14 of the terminal 10. The data produced by the signature generator 22 are transmitted to the second electronic watermark unit 15 of the terminal 10.

In the above system, information concerning the first encryption process, such as the method used and a secret key, is only that which is available to the server; information concerning the second encryption process is only that which is available to the second entity. It should be noted, however, that a property of these encryption processes is that regardless of which encryption process is performed first, a message can be deciphered by employing the decryption process.

Hereinafter, the encryption process is represented by "Ei( )," the decryption process is represented by "Di( )" and the embedding process concerning an electronic watermark is represented by "+."

An explanation will now be given for the processing performed by the system in FIG. 23. The electronic watermark embedding process will be explained first.

[Embedding Process]

1) First, the second entity, terminal 20, requests desired image data bearing the user's signature from the terminal 10. The requested data is information (signature information for the second entity) that is generated by the contract generator 21 and that is hereinafter called contract information.

2) In the terminal 10, the contract identification unit 11 identifies the received contract information using the signature for the second entity, and after that, prepares user information U using the contract information. The first electronic watermark embedding unit 12 embeds, in the requested image data G, the user information U that is prepared by the contract identification unit 11. The first encryption unit 13 performs a first encryption process E( ) for image data (G+U), in which the user information U is embedded by the first electronic watermark embedding unit 12, and transmits the resultant image data to the terminal 20. Thus, the terminal 20 receives the first encrypted image data E1(G+U).

3) In the terminal 20, the second encryption unit 24 performs a second encryption process for the first encrypted image data E1(G+U) received from the terminal 10, and transmits the obtained second encrypted image data E2(E1 (G+U)) to the terminal 10.

At this time, in the second entity, the signature generator 22 uses its own secret key to generate signature information S and transmits it to the terminal 10.

4) In the terminal 10, the first decryption unit 14 decrypts the first encrypted portion of the second encrypted image data E2(E1(G+U)) received from the terminal 20. The second electronic watermark embedding unit 15 identifies the signature information S received from the terminal 20. And the second electronic watermark embedding unit 15 embeds the signature information S in the image data E2(G+U) that is generated by the first decryption unit 14, and transmits the obtained image data to the terminal 20. Further, the hash generator 16 generates a hash value H1 for the transmission data E2(G+U)+S), signs it, and, together with the image data E2(G+U)+S, transmits the obtained hash value H1 to the terminal 20. As a result, the terminal 20 receives the image data E2(G+U)+S and the hash value H1, with its accompanying signature.

The hash value is a value obtained by calculating the hash function h( ), and the hash function is a compression function that seldom causes a collision. A collision in this case would mean that for the different values x1 and x2, h(x1)=h(x2). The compression function is a function for converting a bit string having a specific bit length into a bit string having a different bit length. Therefore, the hash function is a function h( ) by which a bit string having a specific bit length is converted into a bit string having a different bit length, and for which values x1 and x2 that satisfy h(x1)=h(x2) are not easily found. Since a value x that satisfies y=h(x) is not easily obtained from an arbitrary value y, accordingly, the hash function is a unidirectional function. Specific examples for the hash function are an MD (Message Digest) 5 or an SHA (Secure Hash Algorithm).

5) The hash identification unit 27 of the terminal 20 identifies the hash value H1 and its accompanying signature that are received from the terminal 10, and confirms that the hash value H1 matches the hash value that is generated using the data E2(G+U)+S). After the confirmation process has been completed, the data E2(G+U)+S and the hash value H1 and its accompanying signature are stored.

The second decryption unit 25 decrypts the second encrypted portion of the data E2(G+U)+S, and extracts image data $G_w$ in which is embedded an electronic watermark. This indicates that the user information U and the second encrypted signature information S are embedded as electronic watermark information in the original image data.

As is described above, according to the electronic watermark embedding method of this embodiment, since the first entity is fully in charge of the embedding of electronic watermark information, basically, the second entity can not commit an illegal act. The first entity receives signature information S directly from the second entity and embeds it as electronic watermark information. However, since through procedure 5) of the embedding process signature information D2(S) obtained by the terminal 20 is affected by the second encryption, which only the second entity can perform, the first entity can not cause the second entity to be accused of a crime by directly embedding signature information D2(S) in the original image.

When the above described embedding process is performed, in process 1 the agency can obtain image data $G_w$ having an electronic watermark wherein his or her signature information is embedded in the original image G of the server or the author. Assuming that the user information and signature information in process 1 are U1 and S1 and that the encryption and decryption performed by the agency are represented as Ea( ) and Da2( ), the image having the electronic watermark obtained by the agency is represented by $G_w$=G+U1+Da2(S1). When in process 2 the same embedding process is performed while the image data $G_w$ of the agency are employed as the original image data, the user can acquire image data having an electronic watermark, $G_{ww}$= G+U1+Da2(S1)+U2+Du2(S2). In this case, assume that the user information and signature information in process 2 are U2 and S2, and the encryption and the decryption performed by the user are Eu2( ) and Du2( ).

When an illegal copy $G_{ww}'$ is discovered, a party who has performed the illegal act is identified by the following verification process. This verification process is broken down into verification 1, which corresponds to process 1 for verifying the server or the author and the agency, and verification 2, for verifying the agency and the user. Verification process 1 is performed first, and then verification process 2 is performed. In verification 1 the user information and the signature information are defined as U1 and S1, and the encryption and decryption performed by the agency are Ea2( ) and Da2( ). In verification 2 the user information and the signature information are defined as U2 and S2, and the encryption and decryption performed by the user are Eu2( ) and Du2( ).

It should be noted that image data are not affected by the modification or the deletion of electronic watermark information.

[Verification Process]

1) First, in verification 1 for the server S and the agency A, the terminal 10 on the server side (the first entity) extracts user information U1' from the illegal image data $_{ww}$'=G+U'+U2'+Da(S1')+Du2(S2'). When the user information U1 can not be extracted, it is ascertained that the server S committed the illegal act.

2) The server S, which is the first entity, submits the illegal image $G_{ww}$' and the extracted user information U1' to the verification office, and requests that the verification office 30 examine agency A, which is the second entity.

3) The verification office 30 requests that the second entity submit the second encryption key stored therein. The verification office 30 performs the second encryption for the illegal image $G_{ww}$' to extract signature information S1'.

4) If the correct signature information S1' is extracted, i.e., if S1'=S1, it is ascertained that the server S, which is the first entity, did not commit the illegal act, and program control moves to verification 2.

5) When correct signature information is not extracted in procedure 4), i.e., when S1' is not equal to S1, the verification office 30 examines the data Ea2(G+U1)+S1, and the hash value H1 and its accompanying signature S1, all of which are transmitted by the server S, which is the first entity, to the agency A, which is the second entity. And the verification office 30 confirms that the hash value H1 matches the hash value obtained from Ea2(G+U1)+S1. Then, the verification office 30 decrypts the data Ea2(G+U1)+S1 using the second encryption key that was submitted by the agency A in procedure 3), and extracts image data $G_w$, in which is embedded an electronic watermark.

6) When the correct image data in which are embedded an electronic watermark can not be extracted, it is ascertained that the agency A committed the illegal act. This means that the second encryption key in procedure 3) is not correct.

7) When the correct image data in which is embedded an electronic watermark can be extracted, it is ascertained that the server S committed the illegal act.

An explanation will now be given for verification 2, which is performed when it is ascertained in procedure 4) that the server S did not commit the illegal act. In verification 2, user information U' is extracted from the illegal image data $G_{ww}$'=G+U1'+U2'+Da2(S1')+Du2(S2'). When the user information U2' is not extracted, it is ascertained that the agency A, which is the first entity, committed the illegal act.

As in procedure 2) above the agency A, which serves as the first entity in verification 2, submits the illegal image data $G_{ww}$' and the extracted user information U2' to the verification office 30, and requests that the verification office 30 examine the user U, which is the second entity. As in procedure 3), the verification office 30 requests that the second entity submit the second encryption key stored therein, and extracts signature information S2' by performing the second encryption for the illegal image data $G_{ww}$'. When the correct signature information S' is extracted, i.e., when S2'=S2, it is ascertained that the user, which is the second entity, committed the illegal act.

When the correct signature information S2' can not be extracted, i.e., when the signature information S2' does not match S2, as in procedure 5) the verification office 30 examines the data Eu2($G_w$+U2)+S2, and the hash value H1' and its accompanying signature S2, all of which are transmitted by the agency A, which is the first entity, to the user U, which is the second entity. The verification office 30 then confirms that the hash value H1' matches the hash value obtained from the data Eu2($G_w$+U2)+S2, and after this, the verification office 30 decrypts the data Eu2($G_w$+U2)+S2 by employing the second encryption key submitted by the user U, and extracts the image data $G_{ww}$ in which is embedded an electronic watermark.

When the correct image data in which is embedded the electronic watermark can not be extracted, it is ascertained, as in procedure 6), that the user U, which is the second entity, committed the illegal act. This means that the second encryption key submitted by the user is not correct. When the correct image data in which is embedded the electronic watermark can be extracted, it is ascertained, as in procedure 7), that the agency A, which is the first entity, committed the illegal act.

As is described above, substantially the same procedures are performed for verification 1 and verification 2, and only the definitions for the first and the second entities need be changed. Also, the party who has committed the illegal act can be identified in the same manner.

As is apparent from the verification process, the terminal of the verification office 30 includes the same functions as does the second encryption unit 24, the second decryption unit 25 and the hash identification unit 27 of the terminal 20.

In the above embodiment, since processes 1 and 2 are independently performed, collusion is senseless. For example, even should the agency collude with the user, the user can not affect the process 1. Furthermore, even should the server collude with the agency, or the server collude with the user, neither the user nor the agency could obtain the final image data that includes an electronic watermark that is affected by the encryption performed by the user or the agency.

There is no need for the verification office 30 until an illegal image is discovered, and no illegal act can be determined to have been performed until an illegal image has been discovered. In addition, so long as the above described verification processing is well known, and the first and the second entities monitor the results of that processing, an illegal act by them can be detected in accordance with the situation, even without the verification office being involved.

(Tenth Embodiment)

Recently, the transfer of money across networks, a fund transfer procedure that is called electronic cash, has come to be employed. Since as with a regular cash payment, the name of the owner of an electronic cash transfer is not identified, anonymity is attained. If the attainment of anonymity were not possible, a seller of a product could obtain from an electronic cash transfer information concerning a purchaser and the use of its product, and the privacy of a user would not be protected. Therefore, the protection of the privacy of a user is as important as is the protection provided for a copyright granted to a creator who uses an electronic watermark.

In a tenth embodiment, therefore, the anonymity of a user is provided for a purchaser, and when an illegal act, such as the illegal distribution of images, is discovered, it is possible to identify an unauthorized distributor, which is the original purpose of an electronic watermark. This is achieved by employing, for example, a system shown in FIG. 24.

The system has the same structure as has the system 100 for the ninth embodiment, while an anonymous public key certificate, which is issued by a certification office 40, is provided for a user terminal 20.

Generally, in order to authenticate signature information, a certificate issued by an organization called a certification office is added to a public key that is used when examining the signature information.

A certification office is an organization that issues certificates for public keys assigned to users to provide public key authentication that is consonant with the requirements of the public key encryption system. That is, a certification office employs its own secret key to provide a signature for a user's public key, or for data concerning the user, and for this purpose prepares and issues a certificate. When a user receives from another user a signature that is accompanied by a certificate, the user examines the certificate using the public key of the certification office to verify the authentication provided by the user who transmitted the public key (or, at the least, the fact that authentication has been provided the user by the certification office). Both VeriSign and CyberTrust are well known organizations that operate such certification offices.

Figure 24:
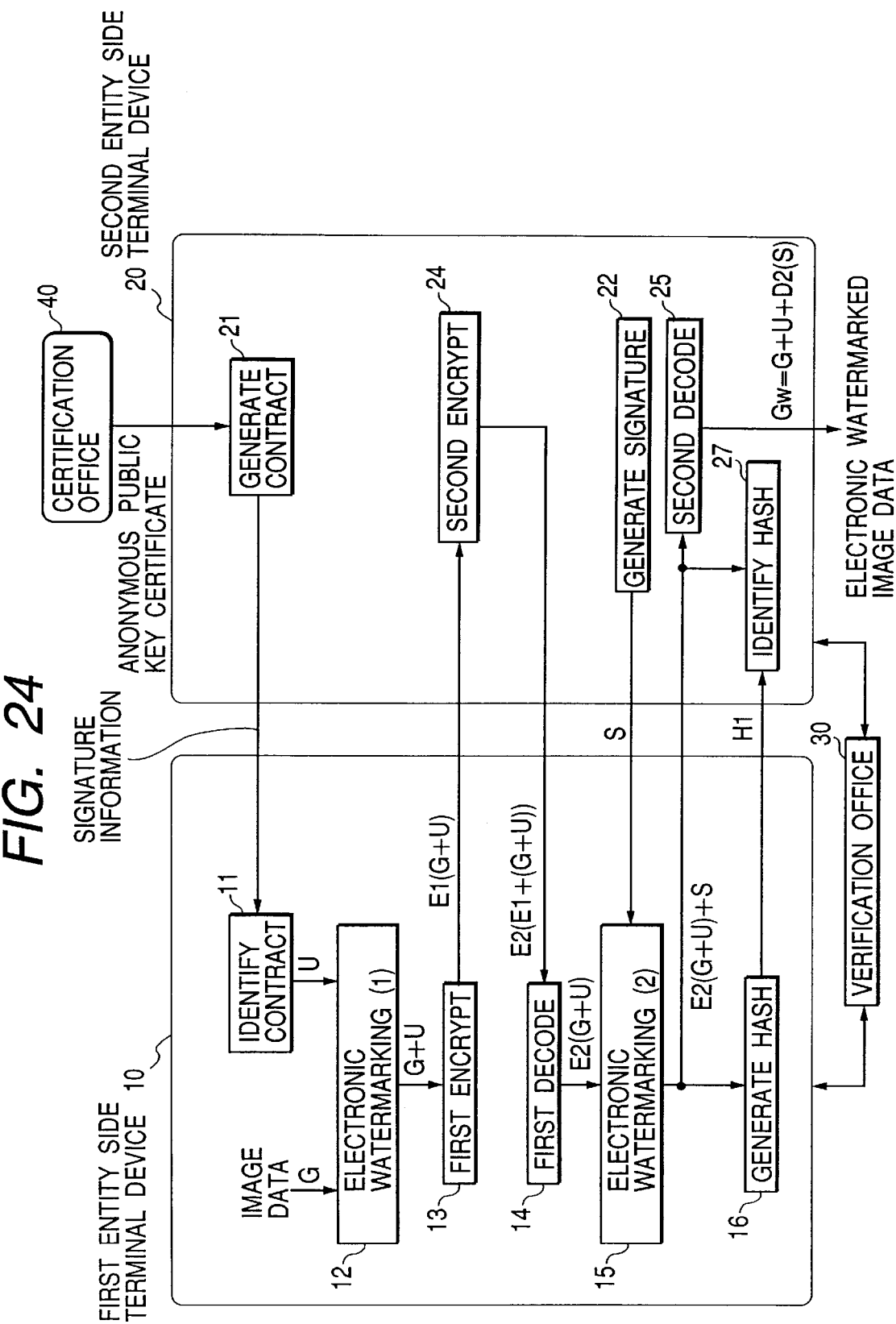
FIG. 24 is a block diagram for explaining the tenth embodiment.

When at procedure 2) of the embedding process in the ninth embodiment a first entity examines a signature to verify the contract information submitted for a user (second entity), the first entity can employ the public key with a signature issued by the certification office 40 in FIG. 24. However, since the name of the owner of the public key is generally written in the certificate, user anonymity is not provided at the time data are purchased.

On the other hand, if the certification office 40 keeps secret the correspondence of public keys and their owners, the name of an owner may not be written in a certificate issued for a public key. An anonymous certificate for a public key is hereinafter called an "anonymous public key certificate," and a public key for which such a certificate is provided is called an "anonymous public key with a certificate." In procedure 1) of the above described embedding process, when a user U transmits to a server not only contract information but also a signature for the contract information and an anonymous public key, accompanied by a certificate, to enable the examination of the signature information S, the user can remain anonymous when purchasing digital data.

Therefore, the anonymous public key, accompanied by the certificate, is transmitted to the agency A as information to be used for verification of the user U. And when an illegal transaction is discovered and the user must be identified, the anonymous public key, accompanied by the certificate, is transmitted to the certification office 40 with a request for the user name which corresponds to that of the owner of the public key. Therefore, when procedures 1) and 2) in the embedding process and procedures 1) and 2) in the verification process in the ninth embodiment are performed as follows, the anonymity of the user U when purchasing digital data can be maintained, but when an illegal transaction is discovered, the user responsible for the perpetration of the transaction can be identified.

The embedding process and the verification process performed by the system in FIG. 24 will be specifically described.

Figure 23:
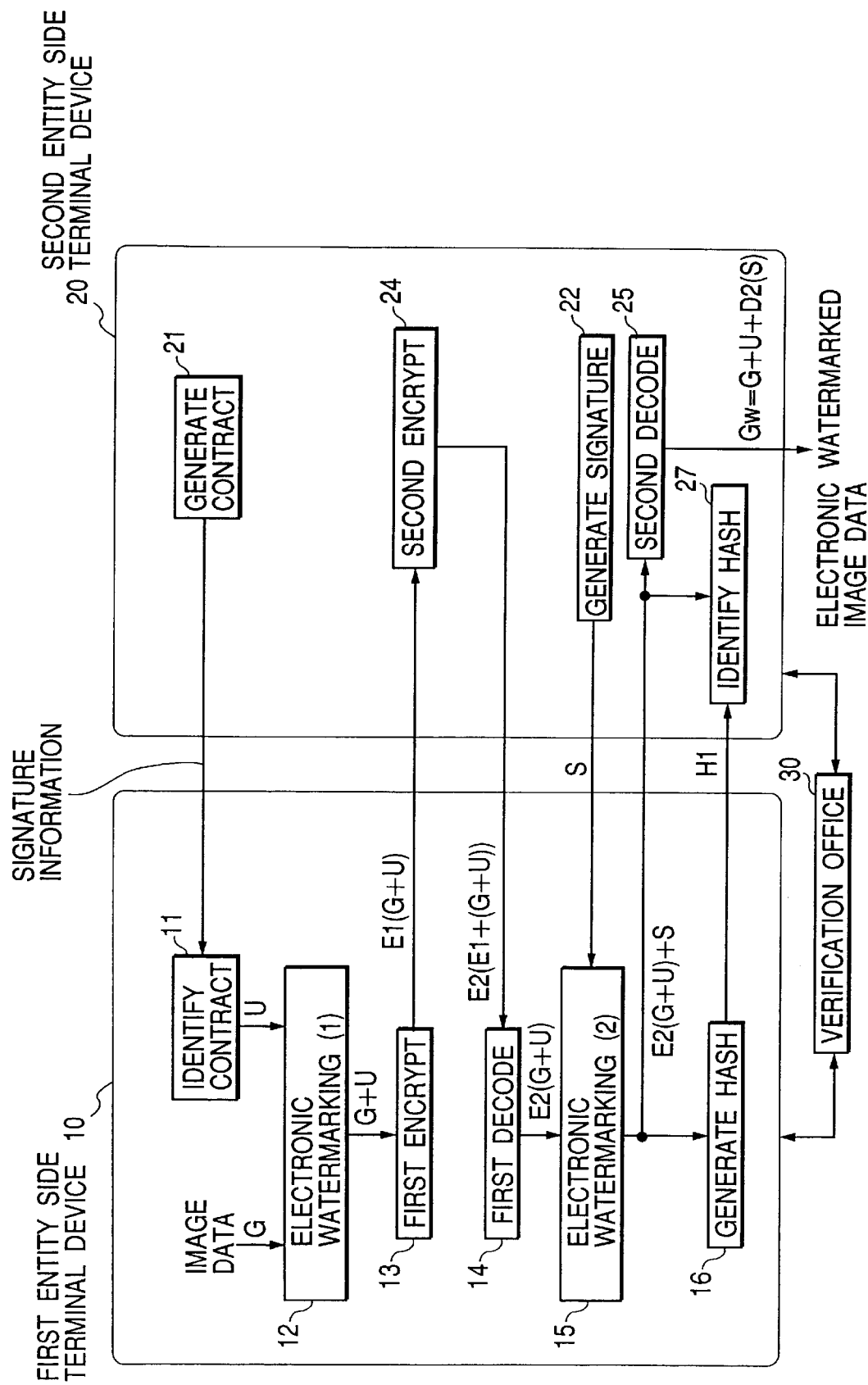
FIG. 23 is a block diagram for explaining the ninth embodiment.

In the system shown in FIG. 24, the same reference numerals as are used in the system in FIG. 23 are also used to denote corresponding components, and a specific explanation is given only for those portions that are different. Since the processing is the same as that for the ninth embodiment, except for procedures 1) and 2) in the embedding process and procedures 1) and 2) in the verification process, no detailed explanation for them will be given.

[Embedding Process]

1) First, in the second entity (user) terminal 20, a contract generator 21 provides, as contract information for requesting desired image data, a signature that corresponds to an anonymous public key that is accompanied by a certificate issued by a certification office 40. Together with the anonymous public key and the accompanying certificate, the second terminal 20 transmits the contract information to the first entity (agency), terminal 10.

2) In the first entity, terminal 10, a contract identification unit 11 examines the public key belonging to the second entity (user) by using the public key of the certification office 40. And the contract identification unit 11 identifies the signature for the contract information using the anonymous public key of the second entity, and after the confirmation process is completed, prepares user information U using at least either the contract information or the anonymous public key. A first electronic watermark embedding unit 12 embeds, in image data G, the user information U that is prepared by the contract identification unit 11. A first encryption unit 13 performs first encryption E1( ) for the image data G, and transmits the obtained data to the second entity, terminal 20. Thus, the second entity, terminal 20, receives the first encrypted image data E1(G+U).

Hereinafter procedures 3) to 5) in the embedding process in the ninth embodiment are performed.

Procedures 1) and 2) in the embedding process in the tenth embodiment an be applied for either or for both of the previously mentioned processes 1 and 2. While generally anonymity is not very important to the agency, to maintain privacy the user's anonymity is very important, and it is more particularly important in this embodiment because the embedding process is employed when the agency distributes its contents as electronic information to the user.

Therefore, as a modification of the embodiment, a hierarchical system is more effective when the system shown the ninth embodiment in FIG. 23 is employed for the distribution of electronic information by the server to the agency, and when the system for the tenth embodiment shown in FIG. 24 is employed for the distribution of electronic information by the agency to the user. That is, in the hierarchical system, the privacy of the user can be protected while the number of requests submitted to the certification office 40 can be held to the minimum possible.

[Verification Process]

The verification process is very effective when it is applied to verification 2 in the ninth embodiment. Therefore, an explanation will be given while assuming that procedures 1) and 2) below are applied to the verification performed by the agency and the user, i.e., verification 2. At this time, it is assumed that it was ascertained in procedure 4) of verification 1 that the server S did not commit an illegal act.

1) First, in verification 2 for the agency A and the server S, the terminal 10 on the agency side (the first entity) extracts user information U2' from the illegal image data $G_{ww}'=G+U1'+U2'+Da2(S1')+Du(S2')$. When the user information U2' can not be extracted, it is ascertained that the agency A committed the illegal act. When the user information U2 is extracted, the extracted user information U2 and the anonymous public key obtained from the contract information are submitted to the certification office 40 to request the user name that corresponds to the public key.

2) The agency A, which is the first entity, submits the illegal image $G_{ww}'$ and the extracted user information U2' to the verification office, and requests the verification office examine the user whose name corresponds to the public key.

The above described procedures 3) to 7) in the verification process in the ninth embodiment are performed.

As is described above, according to the tenth embodiment, when purchasing digital data the user can remain anonymous relative to the verification office.

(Eleventh Embodiment)

Figure 25:
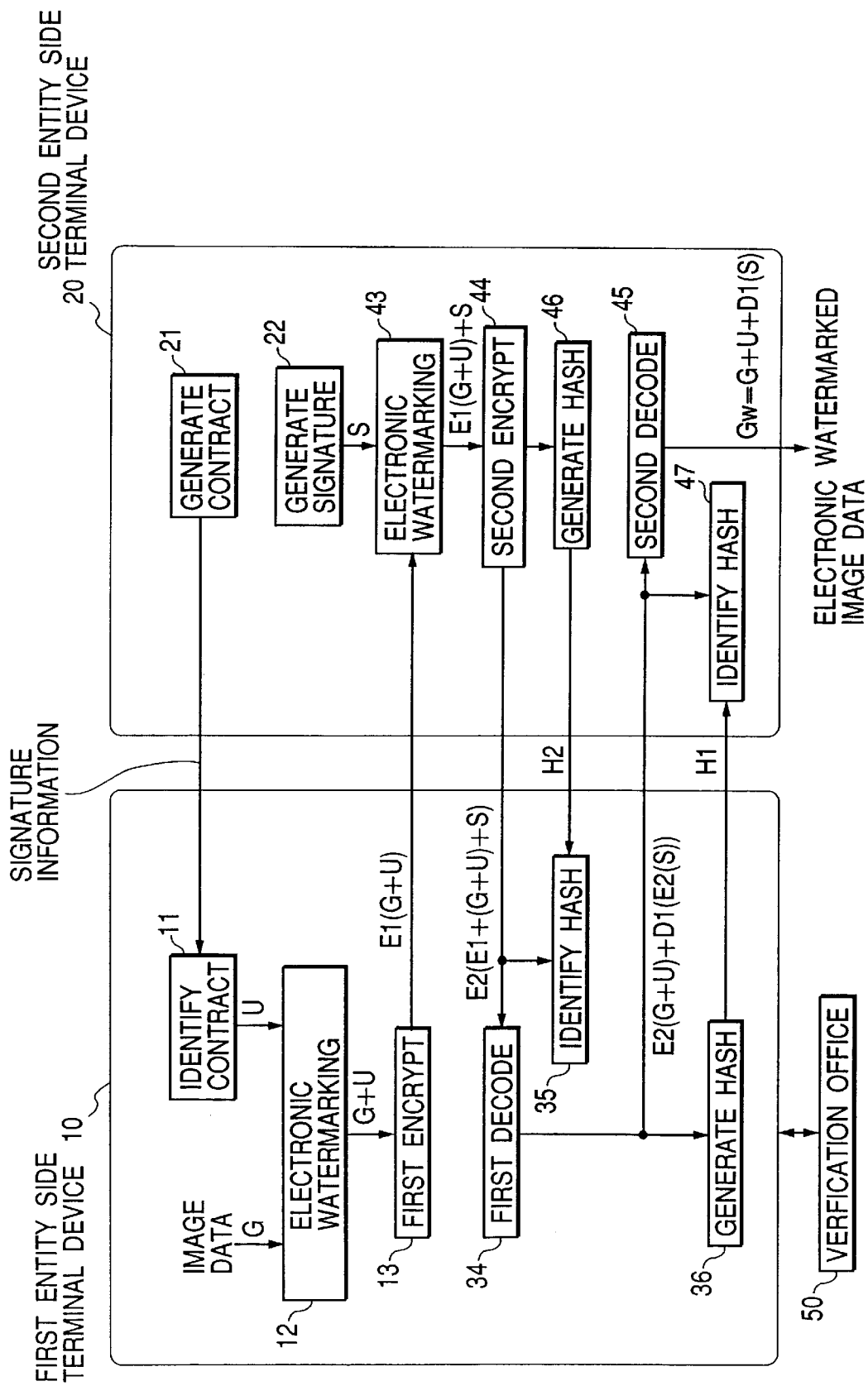
FIG. 25 is a block diagram for explaining the eleventh embodiment.

An eleventh embodiment will now be described while referring to FIG. 25. The eleventh embodiment differs from the ninth embodiment in that the signature information for the second entity is embedded as an electronic watermark by a second entity terminal 20, instead of a first entity terminal 10. The same reference numerals as are used in FIG. 23 are also used to describe corresponding components in FIG. 25. No explanation will be given for processing that is identical to that in the ninth embodiment.

A terminal 10 comprises: a contract identification unit 11, for receiving data from the terminal 20; an electronic watermark embedding unit 12, for receiving, for example, image data (digital data); a first encryption unit 13, for receiving the output of the electronic watermark embedding unit 12; a first decryption unit 14, for receiving data from the terminal 20; a hash identification unit 35, for receiving data from the terminal 20 and from the first decryption unit 34; and a hash generator 36, for receiving the output of the first decryption unit 34. The outputs of the first encryption unit 13 and the hash generator 36 are transmitted to the terminal 20. And the output of the first decryption unit 34 is transmitted both to the hash generator 36 and to the terminal 20.

The second entity terminal 20 comprises: a contract generator 21; for transmitting data to the contract identification unit 11 of the terminal 10; a signature generator 22; an electronic watermark embedding unit 43, for receiving data from the signature generator 22 and from the first encryption unit 13 of the terminal 10; a second encryption unit 44, for receiving data from the electronic watermark embedding unit 43; a hash generator 46, for receiving the output of the second encryption unit 44; and a second decryption unit 45, for receiving data from the first decryption unit 34 of the terminal 10; and a hash identification unit 47, for receiving data from the first decryption unit 34 and the hash generator 36 of the terminal 10. The data produced by the second decryption unit 45 are output as data in which an electronic watermark is embedded.

The data produced by the second encryption unit 44 are transmitted to the first decryption unit 34 and the hash identification unit 35 of the terminal 10. The data produced by the hash generator 36 are transmitted to the hash identification unit 35 of the terminal 10.

The electronic watermark embedding process performed by the system in FIG. 25 will now be described.

[Embedding Process]

Since the procedures 1) and 2) are the same as those for the ninth embodiment, no explanation for them will be given.

3) In the terminal 20, the signature generator 22 generates signature information S using the secret key belonging to the second entity.

The electronic watermark embedding unit 43 embeds the signature information S generated by the signature generator 22 in the first encrypted image data E1(G+U) that have been transmitted (distributed) by the terminal 10.

The second encryption unit 44 performs the second encryption for the first encrypted image data E1(G+U) +S in which the signature information S is embedded by the electronic watermark embedding unit 43. The obtained image data are transmitted to the first entity terminal 10.

The terminal 10, therefore, receives the second encrypted image data E2(E1(G+U)+S).

The hash generator 46 generates a hash value H2 for the second encrypted image data E2(E1(G+U)+S) that are to be transmitted to the terminal 10. The hash generator 46 then provides a signature for the hash value H2, and transmits it to the terminal 10, with secret information, other than the signature information S, concerning the electronic watermark.

The secret information is information that concerns the embedding position and the strength required to detect an electronic watermark that is encrypted by another encryption method that is shared with the terminal 10.

4) In the terminal 10, the hash identification unit 35 identifies the signature for the hash value H2 received from the user terminal 20, and confirms that the hash value H2 matches the hash value of the data to be transmitted. After the confirmation process has been completed, the hash value H2 is stored.

The first decryption unit 34 decrypts the first encrypted portion of the second encrypted image data E2(E1(G+U)+S) received from the terminal 20, and transmits the obtained image data to the terminal 20.

In this manner, the user terminal 20 receives the image data E2(G+U)+D1(E2(S)).

The hash generator 36 generates a hash value H1 for the image data E2(G+U)+D1(E2(S)) that are to be transmitted to the terminal 20. The hash generator 36 then provides a signature for the hash value H1, and transmits it to the terminal 20.

5) In the terminal 20, the hash identification unit 47 identifies the signature for the hash value H1 received from the server terminal 10, and confirms that the hash value H1 matches the hash value of the data to be transmitted. After the confirmation has been completed, the hash value H1 is stored.

The second decryption unit 45 decrypts the second encrypted portion of the image data E2(G+U)+D1(E2(S)) received from the terminal 10, and extracts image data $G_w$ in which is embedded an electronic watermark.

Therefore, the image data $G_w$ in which is embedded an electronic watermark is represented by $G_w$=G+U+D1(S). This means that the electronic watermark (user information) U and the electronic watermark (signature information) that is affected by the first decryption are embedded in the original image data G.

The image data $G_w$ in which is embedded the electronic watermark are stored.

As is described above, the user information U is not affected by the encryption, and the signature information S is affected by the first decryption.

When the above described embedding process is performed, in process 1 the agency can obtain image data $G_w$, in which is embedded an electronic watermark, wherein his or her signature information is embedded in the original image G of the server or the author. Assuming that the user information and the signature information in process 1 are U1 and S1, the encryption and decryption performed by the user are Es1( ) and Ds1( ), the encryption and decryption performed by the agency are represented by as Ea( ) and Da2( ), and the image in which is embedded the electronic watermark obtained by the agency is represented by $G_w$=G+U1+Ds1(S1). When in process 2 the same embedding process is performed while the image data $G_w$ of the agency are employed as the original image data, the user can acquire image data having an electronic watermark, $G_{ww}$=G+U1+Ds1(S1)+U2+Da1(S2), wherein the encryption and decryption performed by the agency are Ea1( ) and Da1( ). In this case, assume that and the user information and the signature information in process 2 are U2 and S2.

When illegal copy $G_{ww}'$ is discovered, as in the ninth embodiment, the verification processing is broken down into verification 1, which corresponds to process 1, for verifying the server or the author and the agency, and verification 2, for verifying the agency and the user. Verification process 1 is performed first, and then verification process 2 is performed. In verification 1 the user information and the signature information are defined as U1 and S1, and the encryption and decryption performed by the server are Es1( ) and Ds1( ). In the verification 2 the user information and the signature information are defined as U2 and S2, and the encryption and decryption performed by the agency are Ea1( ) and Da( ).

It should be noted that image data are not affected by the modification or the deletion of electronic watermark information, as in the ninth and the tenth embodiments.

[Verification Process]

1) First, in verification 1 for the server S and the agency A, the terminal 10 on the server side (the first entity) extracts user information U1' from the illegal image data $G_{ww}$=G+U'+U2'+Ds1(S1')+Da1(S2'). Also, the terminal 20 performs first encryption Es1( ) for the image data $G_{ww}$' and extracts signature information S1'. When the user information U1' can not be extracted, it is ascertained that the server S committed the illegal act.

2) If the correct signature information S1' is extracted, i.e., if S1'=S1, the server S submits the signature information S1' to the verification office 30, i.e., it is ascertained that the server S, which is the first entity, did not commit the illegal act. Program control moves to verification 2.

3) When the correct signature information can not be extracted in procedure 2), i.e., when S1' does not match S1, to request verification the server S, which is the first entity, submits to the verification office 30 the stored hash value for the second encrypted image data Ea2(Es1(G+U1)+S1) and its accompanying signature, the first encryption secret key, and secret information concerning the illegal image data $G_{ww}$'.

4) Upon receiving the request in procedure 3), the verification office 30 ascertains that the correct signature information S1 can not be extracted from the illegal image data $G_{ww}$'. Then, the verification office 30 examines the submitted hash value H2 and its accompanying signature in order to confirm that the hash value of the second encrypted image data Ea2(Es1(G +U1)+S1) matches the hash value H2 that has been submitted.

After the confirmation process has been completed, the verification office 30 decrypts the first encrypted portion of the second encrypted image data Ea2(Es1(G+U1)+S1) and obtains the image data Ea2(G+U1)+Ds1(Ea2(S1)). The verification office 30 confirms that the hash value for the obtained data matches the hash value H1 that is held by the agency A, which is the second entity. At this time, the signature for the hash value H1 is also identified.

5) When in procedure 4) the hash value for the data Ea2(G+U1)+Ds1(Ea2(S1)) does not match the hash value H1, it is ascertained that the server S, which is the first entity, committed the illegal act. This means that-the secret keys for the first encryption in procedure 4) of the embedding process and in procedure 4) of the verification process differ.

6) When the two hash values match, the verification office requests that the agency A, which is the second entity, decrypt the second encrypted portion of the data Ea2(G+U1)+Ds1(Ea2(S1)) that is obtained in procedure 4) of the verification process. And the verification office 30 extracts the signature information S1 from the resultant image data.

7) When the correct signature information S1 is not extracted, i.e., when S1' does not match S1, it is ascertained that the agency A committed the illegal act.

8) When the correct signature information is extracted, it is ascertained that it was not the agency, but the server S that committed the illegal act.

Next, an explanation will be given for verification 2 performed when it is ascertained that the sever S did not commit the illegal act. In verification 2, as in procedure 1), the user information U2' is extracted from the illegal image $G_{ww}$'=G+U1'+U2'+Ds1(S1')+Da1(S2'). Also, the first encryption Ea1( ) is performed for the image data $G_{ww}$' to extract signature information S2'. When the user information U2' can not be extracted, it is ascertained that the agency A committed the illegal act.

When the correct signature information S2' is extracted, as in procedure 2) above, i.e., when S2'=S2, the agency A submits the signature information S2' to the verification office 30 to ascertain whether the user U committed the illegal act.

This is because the signature information S2' is prepared only by the user U, the server S and the agency A having no knowledge of the signature information S2'. It should be noted that the legality of the signature information S2' can be verified by determining whether or not predetermined information, which is defined in advance by the contract information, can be output by employing a public key that corresponds to the secret key the user employs when generating the signature information.

When the correct information S2 is not extracted, as in procedure 3), to request verification, the agency A, which is the first entity, submits to the verification office 30 the hash value H2 for the stored second encrypted image data Eu2 (Ea1(G+U1+U2+Ds1(S1))+S2) and its accompanying signature, the secret key for the first encryption, and the secret information concerning the illegal image $G_{ww}$'.

As in procedure 4), the verification office 30 determines that the correct signature information S2 can not be extracted from the illegal image $G_{ww}$'. The verification office 30 examines the hash value H2 and the signature that are submitted, and confirms that the hash value for the second encrypted image data Eu2(Ea1(G+U1+U2+Ds1(S1))+S2) matches the hash value H2 that has been submitted. After the confirmation process in completed, the verification office 30 decrypts the first encrypted portion of the second encrypted image data Eu2(Ea1(G+U1+U2+Ds1(S1))+S2) and obtains data Eu2(G+U1+U2+Ds1(S1))+Da1(Eu2(S2)). In addition, the verification office 30 confirms that the hash value for the obtained image matches the hash value H1 that was stored by the user U, which is the second entity. At this time, the signature for hash value H1 is identified.

When the hash value for the data Eu2(G+U1+U2+Ds1(s))+Da1(Eu2(S2)) does not match the hash value H1, it is ascertained, as in procedure 5) above, that the agency A, which is the first entity, committed the illegal act. When the two hash values match, as in procedure 6), the verification office 30 requests the user, who is the second entity, to decrypt the second encrypted portion of the data Eu2(G+U1+U2+Ds(S1))+Da1(Eu2(S2)). The signature information S2 is extracted from the decrypted data.

When the correct signature information S2 can not be extracted, it is ascertained that the user, which is the second entity, committed the illegal act. When the correct signature information S2 is extracted, however, it is ascertained that the agency, which is the first entity, committed the illegal act.

As is described above, verification 1 and verification 2 are substantially performed according to the same procedures, and only the definitions of the first and the second entities need be changed. Also, the party that committed the illegal act can be identified in the same manner.

The eleventh embodiment is the same as the ninth embodiment in so far as process 1 and process 2 are independently performed; there is no need for the verification office until an illegal image has been discovered, and no illegal act can be committed until an illegal image has been discovered; and a verification office is not necessarily provided.

(Twelfth Embodiment)

FIG. 26 is a diagram illustrating a twelfth embodiment of the present invention. The same reference numerals as are used in FIGS. 24 and 25 are also to denote components that perform the same processing, and no explanation for them will be given. According to the twelfth embodiment, with the arrangement of the eleventh embodiment, in order for the privacy of a user S to be protected, as in the tenth embodiment, the user S transmits contract information to an agency A, together with a public key accompanied by a certificate that is issued by a certification office 4.

For the embedding process in this embodiment, the procedures 1) and 2) in the eleventh embodiment are replaced by the procedures 1) and 2) in the tenth embodiment, and the following procedures are the same as those in the eleventh embodiment. This embedding process is as effective as that in the tenth embodiment when it is applied for the distribution of electronic information by the agency to the user.

While the verification process in this embodiment is applied to verification 2 in the eleventh embodiment, there is a difference that will now be described. In the twelfth embodiment, as in the tenth embodiment, first, in verification 2 for the agency A and the user U the terminal 10 on the agency side (first entity) extracts user information U2' from the illegal image data $G_{ww}'=G+U1'+U2'+Da2(S1')+Du(S2')$ that has been discovered.

The agency A submits to the certification office 40 the user information U2' and the anonymous public key obtained from the contract information, and requests the user name that corresponds to the public key. When the user information U2' is not extracted, it is ascertained that the agency A committed the illegal act. Further, the first encryption is performed for the illegal image data $G_{ww}'=G+U1'+U2'+Da2(S1')+Du(S2')$, and signature information S2' is extracted. Since the succeeding process is the same as verification 2 in the eleventh embodiment, no further explanation will be given.

When the signature information S2' is not extracted, it is ascertained that the server S committed the illegal act. When the user information U2' is extracted, the agency A submits to the certification office 40 the user information U2' and the anonymous public key obtained from the contract information, and requests the user name that corresponds to the public key. Then, the agency A, which is the first entity, submits to the verification office the illegal image data $G_{ww}'$ and the extracted user information U2' and requests an examination of the user name that corresponds to the public key.

In the above described embodiments, electronic watermark information can be embedded by using various methods, such as the well known methods described in, for example, "Hiding of Static Picture Data Using Pixel Blocks," Shimizu, Numao, Morimoto (IBM, Japan), 53rd Information Processing Institute National Assembly, IN-11, September 1996; or in "Secure Spread Spectrum Watermarking for Multimedia," I. J. Cox, J. Kilian, T. Leighton and T. Shamoon (NEC), NEC Research Institute Technical Report 95-10.

Further, the methods used for the first encryption and the second encryption can also be implemented by employing various methods, such as an encryption method for changing the arrangement of bits in consonance with an encryption key.

In addition, in procedure 2) of the embedding process, the hash value and the signature are not included in the image data E1(G+U) that is to be transmitted to the user terminal 20. However, a hash value and its signature can be provided for the data in order to determine whether or not a communication path has been altered.

Furthermore, the first encryption and the second encryption are performed in the electronic watermark information embedding process in order to prevent both the server and the user from being notified of the information that is stored by the other. However, DES (Data Encryption Standard) cryptography or a hash function may be employed to prevent wiretapping and the alteration of data across a communication path by a third party.

Furthermore, in the individual embodiments, the first entity is in charge of the detection of illegal data distribution. However, so long as electronic watermark extraction means is provided, any user can detect an illegal distribution of data and of user information, even though he or she does not know the secret key for the first encryption or the second encryption. When an illegal distribution of data is detected, the user need only notify the server for the verification process to be begun. Therefore, the detection of illegal distributions is not limited to the first entity.

The terminal 10 of the first entity can embed in the image data not only the user information U but also other information as needed, such as copyright information and information concerning an image data distribution condition. In addition, to embed secret information, the server terminal 10 need only perform the embedding process after the first encryption, so that in addition to the signature information, information that is affected by the first encryption can be embedded in the image data. The user information U is not always embedded before the first encryption, and may be embedded after the first encryption (in this case, the detection of the user information U can be performed only by the server, or by a person who knows the secret key used for the first encryption).

When the terminal 20 of the second entity is an apparatus within which a plurality of users share a printer or a terminal, the signature information and the second encryption for the second entity may include the signature information and the encryption system for the printer or terminal that is used in common.

The first encrypted information from the server terminal 10 may be widely distributed across a network or by using a CD-ROM, even without it being requested by the user terminal 20 based on the contract information.

The signature information S for the second entity is not necessarily generated by the public key encryption method, but may be information (e.g., a code number) that is defined by the user based on the contracted information.

In the United States, to employ encryption for 40 bits or more, a key management office is required to manage an encryption key in order to prevent the unauthorized use of the cryptograph. The verification office, therefore, can also serve as a key management office. And when the verification office provides advance management of the secondary encryption key, the verification office can perform by itself the verification processes 1) to 3) by performing the monitoring for an illegal image. The first encryption key of the first entity may be managed either by the same verification office, or by another key management office. And the keys of the server and the user may be generated and distributed by the key management office.

The same encryption process, or a process employing a different encryption method or a different encryption key, may be performed by the agency for processes 1 and 2.

When an the illegal act is not committed by the server, the server or the author may embed electronic watermark information in image data and distribute it to the agency, and the agency may embed different electronic watermark information and transmit it to the user.

In addition, instead of a single agency, a plurality of agencies may be provided hierarchically. In this case, a specific agency in charge of the hierarchical structure may perform the processing that the agency is in charge of, or the individual agencies may perform the protocol to specify an agency to be in charge.

When only one agency is provided, as is shown in FIG. 5, embedding of the user information U1 concerning the agency can be omitted.

As is described above, according to the electronic watermark superimposition method and the electronic information distribution system in the above embodiments, when dependent electronic information is to be distributed at least among three entities, an illegal act due to collusion between two entities, several combinations of which are available, can be prevented.

What is claimed is:

1. An electronic watermarking method comprising:
   a first step at which a first entity performs a first encryption process for original data;
   a second step at which a second entity, at the least, either manages or distributes said data that are provided by said first encryption and embeds an electronic watermark in said data;
   a third step at which a third entity performs a second encryption process for said data in which said electronic watermark has been embedded; and
   a certification office examining a signature for said third entity using an anonymous key accompanied by a certificate.

2. An electronic watermark method according to claim 1, wherein said first step includes at the least a step of embedding an electronic watermark before or after said first encryption process is performed for said original data.

3. An electronic watermark method according to claim 1, wherein said second step includes at the least a step of performing a third encryption process before or after said electronic watermark is embedded.

4. An electronic watermark method according to claim 1, further comprising the step of:
   distributing data that at the least is affected by said first encryption process or said second encryption process, and in which said electronic watermark is embedded.

5. An electronic watermark method according to claim 1, wherein said second entity includes a plurality of entities.

6. An electronic watermark method according to claim 1, wherein information that is to be embedded by said second entity is either information concerning said third entity or information concerning data to be transmitted.

7. An electronic watermark method according to claim 1, wherein said first step includes a step of embedding an electronic watermark in image data at least before or after said first encryption process is performed for said original data; and wherein information that is to be embedded by an n-th ($n \geq 1$) entity is either information concerning an (n+1)th entity or information concerning data to be transmitted.

8. An electronic watermark method according to claim 1 or 2, wherein said process for embedding said electronic watermark is a process for not embedding information concerning said second entity.

9. An electronic watermark method according to claim 1 or 2, wherein said original data are image data.

10. An image filing apparatus for storing data that are generated at the steps of an electronic watermark embedding method according to one of claims 1 to 4 or 5 to 7.

11. A storage medium on which the steps of an electronic watermark embedding method according to one of claims 1 to 4 or 5 to 7 are stored so that they may be read by a computer.

12. An electronic information distribution system that exchanges data across a network at the least comprising:
   a first entity, including first encryption means, for performing a first encryption process for original data;
   a second entity, including management distribution means for, at the least, either managing or distributing said data that are provided by said first encryption process, and including electronic watermark embedding means for embedding an electronic watermark in said data;
   a third entity, including second encryption means for performing a second encryption of said data in which an electronic watermark is embedded; and
   verification means for examining a signature for said third entity using an anonymous key accompanied by a certificate issued by a certification office.

13. An electronic information distribution system according to claim 12, wherein said first entity includes at the least electronic watermark embedding means for embedding an electronic watermark before or after said first encryption process is performed for said original data.

14. An electronic information distribution system according to claim 12, wherein said second entity includes at the least third encryption means for performing a third encryption process before or after said electronic watermark is embedded.

15. An electronic information distribution system according to claim 12, further comprising:
   distribution means for distributing data that at the least is affected by said first encryption process or said second encryption process, and in which said electronic watermark is embedded.

16. An electronic information distribution system according to claim 12, wherein said second entity includes a plurality of entities.

17. An electronic information distribution system according to claim 12, wherein information that is to be embedded by said second entity is either information concerning said third entity or information concerning data to be transmitted.

18. An electronic information distribution system according to claim 12, wherein said first entity includes electronic watermark embedding means for embedding an electronic watermark in image data at least before or after said first encryption process is performed for said original data; and wherein electronic watermark embedding means of an n-th ($n \geq 1$) entity embeds said information as either information concerning an (n+1)th entity or information concerning data to be transmitted.

19. An electronic information distribution system according to claim 12 or 13, wherein said electronic watermark embedding means does not embed at the least information concerning said second entity.

20. An electronic information distribution system according to claim 12, wherein said original data are image data.

21. An electronic information distribution system, which exchanges digital data across a network system constituted by a plurality of entities, comprising:
   a first entity, including first data encryption means;
   a second entity, including electronic watermark embedding means, for managing and distributing data received from said first entity;

a third entity, including second encryption means, for employing data in which an electronic watermark has been embedded; and a fourth entity for examining the legality of, at the least, either the encryption processing or the electronic watermark embedding process performed by said first to said third entities, wherein said second entity embeds said electronic watermark after verifying a signature for said third entity by using an anonymous key accompanied by a certificate that is issued by a certification office.

22. An electronic information distribution system, which exchanges digital data across a network system constituted by a plurality of entities, comprising:

a first entity, including first data encryption means;

a second entity, including electronic watermark embedding means, for managing and distributing data received from said first entity;

a third entity, including electronic watermark embedding means and second encryption means, for employing date in which an electronic watermark has been embedded; and a fourth entity for examining the legality of, at the least, either the encryption processing or the electronic watermark embedding process performed by said first to said third entities, wherein said electronic watermark information to be embedded by said third entity includes information that only said third entity is capable of preparing.

23. An electronic information distribution system, which exchanges digital data across a network system constituted by a plurality of entities, comprising:

a first entity, including electronic watermark embedding means and first data encryption means;

a second entity, including electronic watermark embedding means, for managing and distributing data received from said first entity;

a third entity, including second encryption means, for employing data in which an electronic watermark has been embedded; and a fourth entity for examining the legality of, at the least, either the encryption processing or the electronic watermark embedding process performed by said first to said third entities, wherein said second entity embeds said electronic watermark after verifying a signature for said third entity by using an anonymous key accompanied by a certificate that is issued by a certification office.

24. An electronic information distribution system, which exchanges digital data across a network system constituted by a plurality of entities, comprising:

a first entity, including electronic watermark embedding means and first data encryption means;

a second entity, including, at the least, one of electronic watermark embedding means, a first encryption means and a second encryption means, for managing and distributing data received from said first entity;

a third entity, including electronic watermark embedding means and second encryption means, for employing data in which an electronic watermark has been embedded; and a fourth entity for examining the legality of, at the least, either the encryption processing or the electronic watermark embedding process performed by said first to said third entities, wherein said electronic watermark information to be embedded by said third entity includes information that only said third entity is capable of preparing.

25. An electronic information distribution system according to one of claims 21 to 24, wherein said fourth entity for performing verification is capable of performing a decryption that corresponds to said second encryption.

26. An electronic information distribution system according to claim 23 or 24, wherein said electronic watermark information to be embedded by said first entity includes information concerning said third entity.

27. An electronic information distribution system according to claim 23 or 24, wherein said electronic watermark information to be embedded by said first entity includes information concerning digital data to be transmitted.

28. An electronic information distribution system according to one of claims 21 to 24, wherein said electronic watermark information to be embedded by said second entity includes information concerning said third entity.

29. An electronic information distribution system according to claim 22 or 24, wherein said second entity embeds said electronic watermark after verifying a signature for said third entity by using an anonymous key accompanied by a certificate that is issued by a certification office.

* * * * *

UNITED STATES PATENT AND TRADEMARK OFFICE
CERTIFICATE OF CORRECTION

PATENT NO. : 6,513,118 B1
DATED : January 28, 2003
INVENTOR(S) : Iwamura

It is certified that error appears in the above-identified patent and that said Letters Patent is hereby corrected as shown below:

Column 9,
Line 50, "is transmitted" should read -- transmitted --.

Column 10,
Lines 19 and 22, "hierarchial" should read -- hierarchical --.

Column 11,
Line 20, "hierarchial" should read -- hierarchical --.

Column 13,
Line 13, "ho," should read -- h( ), --; and
Line 29, "HI" should read -- H1 --.

Column 16,
Line 37, "hierarchial" should read -- hierarchical --.

Column 21,
Line 67, begin a new paragraph at "7') When".

Column 27,
Line 9, "hierarchial" should read -- hierarchical --.

Column 30,
Line 18, "Gw" should read -- Gww --;
Line 44, "D1(S1)" should read -- D1(S') --; and
Line 46, "S1." should read -- S'. --.

Column 31,
Line 2, "an" should read -- can --; and
Line 55, "in." should read -- in --.

Column 39,
Line 1, "an" should read -- can --.

Column 48,
Line 24, "an" should read -- can --.

UNITED STATES PATENT AND TRADEMARK OFFICE
CERTIFICATE OF CORRECTION

PATENT NO. : 6,513,118 B1
DATED : January 28, 2003
INVENTOR(S) : Iwamura

It is certified that error appears in the above-identified patent and that said Letters Patent is hereby corrected as shown below:

Column 50,
Line 63, "that and" should read -- and --.

Column 51,
Line 16, "$G_{ww}$= G+" should read -- $G_{ww}'$= G+ --; and
Line 53, "that-the" should read -- that the --.

Column 52,
Line 2, "sever" should read -- server --.

Column 55,
Line 1, "an the" should read -- an --;
Lines 36, 40, 44, 49, 51, 55, 62 and 66, "watermark" should read -- watermarking --.

Column 56,
Line 3, "1 to 4 or 5 to 7" should read -- 1 to 7 --;
Lines 5-6, "1 to 4 or 5 to 7" should read -- 1 to 7 --.

Column 57,
Line 31, "date" should read -- data --.

Signed and Sealed this

Seventh Day of October, 2003

JAMES E. ROGAN
*Director of the United States Patent and Trademark Office*